United States Patent
Loomis et al.

(10) Patent No.: US 10,101,465 B2
(45) Date of Patent: Oct. 16, 2018

(54) ELECTRONIC TAPE MEASURE ON A CELLPHONE

(71) Applicant: Trimble Inc., Sunnyvale, CA (US)

(72) Inventors: Peter Van Wyck Loomis, Sunnyvale, CA (US); Gregory Craig Wallace, Arvada, CO (US); Shawn D. Weisenburger, Denver, CO (US); Nicholas C. Talbot, Ashburton (AU); James M. Janky, Los Altos, CA (US)

(73) Assignee: Trimble Inc., Sunnyvale, CA (US)

( * ) Notice: Subject to any disclaimer, the term of this patent is extended or adjusted under 35 U.S.C. 154(b) by 423 days.

(21) Appl. No.: 14/849,456

(22) Filed: Sep. 9, 2015

(65) Prior Publication Data

US 2016/0003948 A1    Jan. 7, 2016

Related U.S. Application Data

(63) Continuation-in-part of application No. 14/304,822, filed on Jun. 13, 2014, now Pat. No. 9,835,729, which
(Continued)

(51) Int. Cl.
*G01S 19/43* (2010.01)
*G01S 19/41* (2010.01)
*G01S 19/00* (2010.01)

(52) U.S. Cl.
CPC .............. *G01S 19/43* (2013.01); *G01S 19/41* (2013.01)

(58) Field of Classification Search
CPC ................................ G01S 19/43; G01S 19/41
See application file for complete search history.

(56) References Cited

U.S. PATENT DOCUMENTS

| | | |
|---|---|---|
| 5,225,842 A | 7/1993 | Brown et al. |
| 5,345,244 A | 9/1994 | Gildea et al. |

(Continued)

FOREIGN PATENT DOCUMENTS

| | | |
|---|---|---|
| EP | 0508405 | 10/1992 |
| EP | 1729145 A1 | 12/2006 |

(Continued)

OTHER PUBLICATIONS

International Search Report of the International Searching Authority for PCT Application No. PCT/US2015/052370 dated Jan. 8, 2016, 6 pages.

(Continued)

*Primary Examiner* — Bernarr E Gregory
(74) *Attorney, Agent, or Firm* — Kilpatrick Townsend & Stockton LLP

(57) ABSTRACT

A radio frequency component receives and digitizes a first plurality of L1 Global Navigation Satellite System (GNSS) signals and a second plurality of L2C GNSS signals from a plurality of GNSS satellites. A software defined GNSS receiver operating on a processor of a cellular telephone separate from the radio frequency component derives carrier phase measurements from the first plurality of L1 GNSS signals and the second plurality of L2C GNSS signals during an epoch. A wireless message from a communication device located at a base location is received conveying pseudorange and carrier measurements derived from the first plurality of L1 GNSS signals from said plurality of GNSS satellites during the epoch. The cellular telephone determines a distance from the base location to said first location.

20 Claims, 36 Drawing Sheets

Related U.S. Application Data is a continuation-in-part of application No. 14/134,437, filed on Dec. 19, 2013, now Pat. No. 9,612,341, which is a continuation-in-part of application No. 14/035,884, filed on Sep. 24, 2013, now Pat. No. 9,369,843, which is a continuation-in-part of application No. 13/842,447, filed on Mar. 15, 2013, now Pat. No. 9,429,640.

(60) Provisional application No. 61/746,916, filed on Dec. 28, 2012.

(56) References Cited

U.S. PATENT DOCUMENTS

| | | | |
|---|---|---|---|
| 5,379,224 A | 1/1995 | Brown et al. | |
| 5,471,217 A | 11/1995 | Hatch et al. | |
| 5,477,228 A | 12/1995 | Tiwari et al. | |
| 5,523,761 A | 6/1996 | Gildea | |
| 5,594,454 A | 1/1997 | Devereux et al. | |
| 5,621,416 A | 4/1997 | Lennen | |
| 5,644,318 A * | 7/1997 | Janky et al. | G01S 19/41 |
| 5,740,048 A | 4/1998 | Abel et al. | |
| 5,786,790 A * | 7/1998 | Abbott | G01S 19/41 |
| 5,805,108 A | 9/1998 | Lennen | |
| 5,862,501 A | 1/1999 | Talbot et al. | |
| 5,899,957 A | 5/1999 | Loomis | |
| 5,903,235 A | 5/1999 | Nichols | |
| 5,913,170 A | 6/1999 | Wortham | |
| 5,928,306 A * | 7/1999 | France et al. | G06S 19/41 |
| 6,067,046 A | 5/2000 | Nichols | |
| 6,072,431 A | 6/2000 | Froeberg | |
| 6,249,245 B1 | 6/2001 | Waiters et al. | |
| 6,289,279 B1 * | 9/2001 | Ito et al. | G01S 19/41 |
| 6,304,211 B1 * | 10/2001 | Boman | A63B 24/0021 |
| | | | 342/357.34 |
| 6,324,473 B1 | 11/2001 | Eschenbach | |
| 6,408,178 B1 | 6/2002 | Wickstrom et al. | |
| 6,429,808 B1 | 8/2002 | King et al. | |
| 6,430,503 B1 | 8/2002 | McBurney et al. | |
| 6,473,030 B1 | 10/2002 | McBurney et al. | |
| 6,507,738 B1 | 1/2003 | Allison et al. | |
| 6,510,387 B2 | 1/2003 | Fuchs et al. | |
| 6,565,144 B1 | 5/2003 | Crean | |
| 6,590,525 B2 | 7/2003 | Yule et al. | |
| 6,711,293 B1 | 3/2004 | Lowe | |
| 6,853,909 B2 | 2/2005 | Scherzinger | |
| 6,901,260 B1 * | 5/2005 | Xin | G01S 19/41 |
| 7,003,112 B1 | 2/2006 | Froeberg | |
| 7,043,364 B2 | 5/2006 | Scherzinger | |
| 7,151,489 B2 | 12/2006 | Pande et al. | |
| 7,191,097 B1 | 3/2007 | Lee et al. | |
| 7,336,814 B2 | 2/2008 | Boca et al. | |
| 7,480,511 B2 | 1/2009 | O'Meagher | |
| 7,541,974 B2 | 6/2009 | Scherzinger | |
| 7,570,204 B1 | 8/2009 | McGraw et al. | |
| 7,908,106 B2 | 3/2011 | Cho et al. | |
| 7,961,141 B2 | 6/2011 | Dai et al. | |
| 8,024,144 B2 | 9/2011 | Kludas et al. | |
| 8,032,152 B2 | 10/2011 | Manson et al. | |
| 8,044,852 B2 | 10/2011 | Green et al. | |
| 8,068,848 B2 | 11/2011 | Manson et al. | |
| 8,068,849 B2 | 11/2011 | Manson et al. | |
| 8,078,192 B2 | 12/2011 | Wirola et al. | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,085,196 B2 | 12/2011 | Whitehead | |
| 8,085,387 B2 | 12/2011 | Kludas et al. | |
| 8,095,149 B2 | 1/2012 | Manson et al. | |
| 8,134,497 B2 | 3/2012 | Janky et al. | |
| 8,136,545 B2 | 3/2012 | Jablonski | |
| 8,242,956 B2 | 8/2012 | Lamance et al. | |
| 8,339,311 B2 | 12/2012 | Walley et al. | |
| 8,368,875 B2 | 2/2013 | Kludas et al. | |
| 8,447,519 B2 | 5/2013 | Basnayake et al. | |
| 8,699,409 B2 | 4/2014 | Aryan et al. | |
| 8,719,188 B2 | 5/2014 | Kuhn et al. | |
| 9,037,527 B2 | 5/2015 | Kuhn et al. | |
| 2001/0017599 A1 | 8/2001 | Yule et al. | |
| 2002/0044086 A1 * | 4/2002 | Boman | A63B 24/0021 |
| | | | 342/357.34 |
| 2002/0072854 A1 | 6/2002 | Fuchs et al. | |
| 2002/0186180 A1 | 12/2002 | Duda | |
| 2003/0083804 A1 | 5/2003 | Pilley et al. | |
| 2003/0114984 A1 | 6/2003 | Scherzinger | |
| 2005/0064878 A1 | 3/2005 | O'Meagher et al. | |
| 2005/0104774 A1 | 5/2005 | Pande et al. | |
| 2006/0146136 A1 | 7/2006 | Cho et al. | |
| 2007/0139262 A1 | 6/2007 | Scherzinger | |
| 2008/0263097 A1 | 10/2008 | Manson et al. | |
| 2008/0319664 A1 | 12/2008 | Kremin et al. | |
| 2009/0024325 A1 | 1/2009 | Scherzinger | |
| 2009/0083430 A1 | 3/2009 | Edge et al. | |
| 2009/0093959 A1 | 4/2009 | Scherzinger et al. | |
| 2009/0189804 A1 | 7/2009 | Ashjaee et al. | |
| 2009/0262016 A1 | 10/2009 | Wirola et al. | |
| 2010/0057359 A1 | 3/2010 | Caballero et al. | |
| 2010/0063733 A1 | 3/2010 | Yunck | |
| 2010/0079333 A1 | 4/2010 | Janky et al. | |
| 2010/0117884 A1 * | 5/2010 | Ahmed et al. | G01S 19/41 |
| 2010/0141510 A1 | 6/2010 | Dai et al. | |
| 2010/0231443 A1 | 9/2010 | Whitehead | |
| 2010/0260150 A1 | 10/2010 | Aryan et al. | |
| 2011/0018761 A1 | 1/2011 | Walley et al. | |
| 2011/0064312 A1 | 3/2011 | Janky et al. | |
| 2011/0163914 A1 | 7/2011 | Seymour et al. | |
| 2011/0187590 A1 | 8/2011 | Leandro | |
| 2011/0195687 A1 | 8/2011 | Das et al. | |
| 2011/0267230 A1 | 11/2011 | Lamance et al. | |
| 2011/0285587 A1 | 11/2011 | Vollath et al. | |
| 2012/0116676 A1 | 5/2012 | Basnayake et al. | |
| 2012/0163656 A1 | 6/2012 | Wang et al. | |
| 2012/0166137 A1 | 6/2012 | Grässer et al. | |
| 2012/0330601 A1 | 12/2012 | Soubra et al. | |
| 2013/0027246 A1 | 1/2013 | Hadef et al. | |
| 2013/0243250 A1 | 9/2013 | France et al. | |
| 2014/0081571 A1 | 3/2014 | Briggs et al. | |
| 2014/0184442 A1 | 7/2014 | Large et al. | |
| 2014/0187193 A1 | 7/2014 | Rudow et al. | |
| 2014/0240170 A1 | 8/2014 | Rudow et al. | |
| 2014/0253375 A1 | 9/2014 | Rudow et al. | |
| 2014/0292569 A1 | 10/2014 | Wallace et al. | |
| 2014/0292570 A1 | 10/2014 | Wallace et al. | |
| 2014/0375493 A1 | 12/2014 | Weisenburger et al. | |
| 2014/0378170 A1 | 12/2014 | Rudow et al. | |
| 2014/0378171 A1 | 12/2014 | Rudow et al. | |
| 2015/0009067 A1 | 1/2015 | Rudow et al. | |
| 2015/0043012 A1 | 2/2015 | Rudow et al. | |
| 2015/0045058 A1 | 2/2015 | Rudow et al. | |
| 2015/0045059 A1 | 2/2015 | Rudow et al. | |
| 2015/0050907 A1 | 2/2015 | Rudow et al. | |
| 2015/0057028 A1 | 2/2015 | Rudow et al. | |
| 2015/0289097 A1 | 10/2015 | Rudow et al. | |

FOREIGN PATENT DOCUMENTS

| | | | |
|---|---|---|---|
| EP | 2275778 A1 | 1/2011 | |
| EP | 2 722 647 A1 | 4/2014 | |
| FR | 2772928 A1 * | 6/1999 | G01S 19/41 |
| KR | 20110085744 | 7/2011 | |
| KR | 101241171 B1 | 3/2013 | |
| WO | 2005/045458 | 5/2005 | |
| WO | 2008089792 A1 | 7/2008 | |
| WO | 2009074654 A1 | 6/2009 | |
| WO | 2011120141 A1 | 10/2011 | |

OTHER PUBLICATIONS

International Written Opinion of the International Searching Authority for PCT Application No. PCT/US2015/052370 dated Jan. 8, 2016, 7 pages.

(56) References Cited

OTHER PUBLICATIONS

Hatch, "The Synergism of GPS Code and Carrier Measurements", Proceedings of the Third International Geodetic Symposium on Satellite Doppler Positioning, 1982, 1213-1232.

Landau, et al., "Virtual Reference Stations Versus Broadcast Solutions in Network RTK", GNSS 2003, Graz, Austria, Apr. 2003, 15 pages.

Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.

"PCT/US2015/035328 International Search Report", dated Oct. 15, 2015, pp. 1-13.

"PCT/US2015/035346 International Search Report", dated Oct. 13, 2015, pp. 1-12.

Afzal, "Design Methodology for a Dual Frequency Configurable GPS Receiver", Proceedings of the 23rd International Technical Meeting of the Satellite Division of the Institute of Navigation (ION GNSS 2010), Sep. 24, 2010, pp. 2892-2900.

Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.

Haak, "A Multi-Purpose Software GNSS Receiver for Automotive Applications", Proceedings of the 23rd International Technical Meeting of the Satellite Division of the Institute of Navigation (ION GNSS 2010), Sep. 24, 2010, pp. 1869-1874.

Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.

"Comparison of Photogrammetry Software", http://en.wikipedia.org/wiki/Comparison_of_photogrammetry_software, Jul. 8, 2015, 4 pages.

"DS00 Laser Range Finder—Product Maunal Revision 0", www.lightware.com, 2012, 45 Pages.

"PCT/US2013/078125 International Search Report and Written Opinion", dated Apr. 23, 2014, 25 pages.

"Photogrammetry", http://en.wikipedia.org/wiki/Photogrammetry, Jun. 25, 2015, 5 pages.

"Pi Pelican Imaging: Life in 3D", http://www.pelicanimaging.com, 2015, 3 pages.

"Spirit Level with bubble", https://play.google.com/store/apps/details?id=com.zabaanapps.android.level, Mar. 25, 2014, 2 Pages.

"Technical Tips from Inland GPS", Trimble TSC2—RTK over internet—establishing IP Connection, Jun. 14, 2011, 8 pages.

"Theodolite", Hunter Research & Technology, Mar. 24, 2014, 1 Page.

"Tilt Measurement Using a Low-G 3-Axis Accelerometer", AN3182 Application Note. DOC ID 17289 Rev 1, Apr. 2010, 18 Pages.

"Trimble S8 Total Station Datasheet", Trimble Navigation Limited, 2013, 4 Pages.

"Wireless RTK Bridge—Cellular User Guide", Revision 1.4, 2009, 47 pages.

Afzal, "Design Methodology for Dual Frequency Configurable GPD Receiver", ION GNSS 2010, Session E5, Portland, OR, Sep. 21-24, 2010, 9 Pages.

Brown, "TIDGET Mayday System for Motorists", Presented at IEEE Position Location and Navigation Symposium (PLANS) '94 Las Vegas, NV, Apr. 1994, 7 pages.

Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.

Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.

Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.

Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.

\* cited by examiner

1500

```
┌─────────────────────────────────────────────────┐
│   PERFORM LEAST SQUARES ESTIMATION OF POSITION FIX │
│                      1510                        │
└─────────────────────────────────────────────────┘
                        │
                        ▼
┌─────────────────────────────────────────────────┐
│              PERFORM INTEGER SEARCH              │
│                      1520                        │
└─────────────────────────────────────────────────┘
                        │
                        ▼
┌─────────────────────────────────────────────────┐
│    PERFORM INTEGER VALIDATION OR INTEGER AVERAGING │
│                      1530                        │
└─────────────────────────────────────────────────┘
```

```
ROV2 DISPLAYS THE DISTANCE FROM REF1 USING THE ELECTRONIC TAPE
MEASURE OPERATING SYSTEM
1816
```

```
ROV2 CALCULATES ITS POSITION FROM THE SINGLE DIFFERENCING OPERATION
TO DETERMINE ITS LOCATION RELATIVE TO THE REF1 LOCATION
(OPTIONAL)
1817
```

FIG. 18C

ELECTRONIC TAPE MEASURE ON A CELLPHONE

CROSS-REFERENCE TO RELATED APPLICATIONS (CONTINUATION-IN-PART)

This application claims priority and is a continuation-in-part of U.S. patent application Ser. No. 14/304,822, filed on Jun. 13, 2014, now U.S. Pat. No. 9,838,729, entitled, "GLOBAL NAVIGATION SATELLITE SYSTEM RECEIVER SYSTEM WITH RADIO FREQUENCY HARDWARE COMPONENT," by Wallace et al., and assigned to the assignee of the present application.

Application Ser. No. 14/304,822, filed on Jun. 13, 2014, now U.S. Pat. No. 9,835,729, claims priority and is a continuation-in-part application of U.S. patent application Ser. No. 14/134,437, filed on Dec. 19, 2013, now U.S. Pat. No. 9,612,341, entitled, "GNSS RECEIVER POSITIONING SYSTEM," by Rudow et al., and assigned to the assignee of the present application.

Application Ser. No. 14/134,437, filed Dec. 19, 2013, now U.S. Pat. No. 9,612,341, claims priority and is a continuation-in-part application of U.S. patent application Ser. No. 14/035,884, filed on Sep. 24, 2013, now U.S. Pat. No. 9,369,843, entitled, "EXTRACTING PSEUDORANGE INFORMATION USING A CELLULAR DEVICE" by Rudow et al., and assigned to the assignee of the present application and to the extent not repeated herein.

Application Ser. No. 14/134,437, filed on Dec. 19, 2013, U.S. Pat. No. 9,612,341, also claims priority to and benefit of U.S. Provisional Patent Application No. 61/746,916, filed on Dec. 28, 2012 entitled, "IMPROVED GPS/GNSS ACCURACY FOR A CELL PHONE" by Rudow et al.

Application Ser. No. 14/035,884,filed on Sep. 24, 2013, now U.S. Pat. No. 9,369,843, claims priority to and is a continuation-in-part to patent application Ser. No. 13/842,447, filed on Mar. 15, 2013, now U.S. Pat. No. 9,429,640, entitled "OBTAINING PSEUDORANGE INFORMATION USING A CELLULAR DEVICE," by Richard Rudow et al., and assigned to the assignee of the present application.

BACKGROUND

The Global Positioning System (GPS) and its extensions in the Global Navigation Satellite Systems (GNSS) have become thoroughly pervasive in all parts of human society, worldwide. GPS and GNSS receivers in the form of chipsets have become widely incorporated into cell phones and other types of cellular devices with cellular-based communications equipment.

Typically, many communication devices such as cellular devices, tablet computers, and two-way radios, include highly integrated GNSS chipsets. In some instances these integrated GNSS chipsets are designed to work with the E-911 service primarily. In most instances these integrated GNSS chipsets are not designed to provide anywhere near a full range of features and outputs that may be available in special purpose GNSS receiver. Furthermore, when communication devices implementing integrated GNSS capabilities are used, they can exhibit reduced performance in positioning accuracy for a variety of reasons.

SUMMARY

Various embodiments herein describe systems and methods of implementing an electronic tape measure. In one method embodiment of implementing an electronic tape measure, at a first location a first plurality of L1 Global Navigation Satellite System (GNSS) signals from a plurality of GNSS satellites during an epoch is received, and the first plurality of L1 GNSS signals is digitized. At the first location a second plurality of L2C GNSS signals from the plurality of GNSS satellites during the epoch is received, and the second plurality of L2C GNSS signals is digitized. A software defined GNSS receiver operating on a processor of a first communication device is used to derive pseudorange and carrier measurements from the first plurality of L1 GNSS signals and pseudorange and carrier measurements from the second plurality of L2C GNSS signals. A wireless message is received from another communication device located at a base location conveying pseudorange and carrier measurements derived from the first plurality of L1 GNSS signals from the plurality of GNSS satellites during the epoch. The first communication device then determines a distance from the base location to the first location.

In some embodiments, first communication device comprises a cellular telephone (i.e., a "cellphone"), and the processor of the first communication device is located outside of a GNSS receiver chipset of the first communication device. In some embodiments, the second plurality of L2C GNSS signals is not continuously tracked by the processor of the first communication device, and the frequency of the L2C signal is subtracted from the frequency of the L1 signal to create a third frequency, and the third frequency is then used to resolve integer ambiguity of the L2C signal.

In some embodiments, first communication device performs a single-differencing operation wherein pseudorange measurements of an L1 GNSS signal from a first GNSS satellite received by the other communication device are subtracted from pseudorange measurements of the L1 GNSS signal from the first GNSS satellite received by the first communication device to derive a first residual value and determine the distance from the base location to the first location.

In some embodiments the first communication device performs a double-differencing operation wherein pseudorange measurements of an L1 GNSS signal from a second GNSS satellite received by the other communication device are subtracted from pseudorange measurements of the L1 GNSS signal from the second GNSS satellite received by the first communication device to derive a second residual value, and wherein the first communication device subtracts the first residual value from the second residual value to determine the distance from the base location to the first location.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

FIG. 15 is a flowchart of an example ambiguity resolution procedure in accordance with at least one embodiment.

FIGS. 18A, 18B, and 18C are a flowchart of operations performed in a single-differencing electronic tape measure distance determination in accordance with at least one embodiment.

DESCRIPTION OF EMBODIMENTS

Figure 1A:
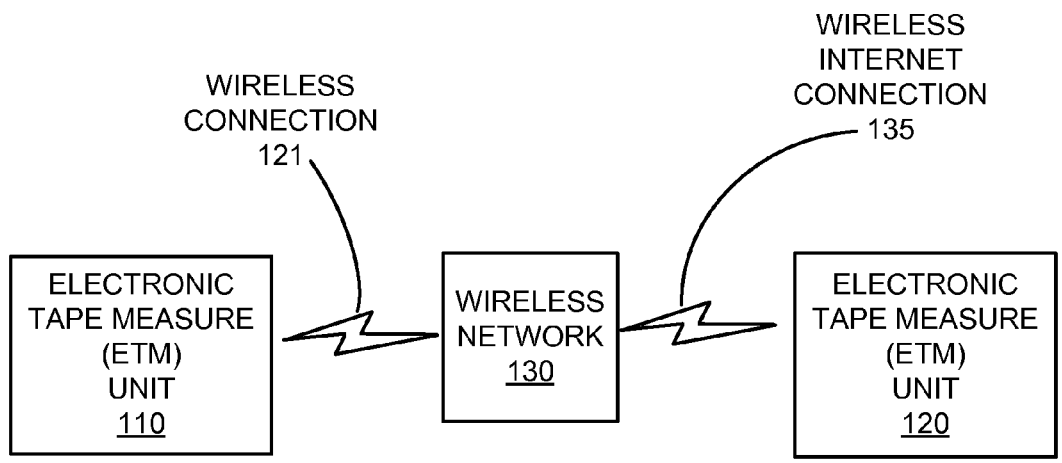
FIG. 1A shows components used in an electronic tape measure system in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "receiving," "using," "determining," "digitizing," "utilizing" and "sending" refer to the actions and processes used to transform the state of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview

Communication devices include electronic devices such as cellular devices, tablet computers, and two-way radios. They may be vehicle based, hand-holdable by a human, or in some instances may be wearable, such as embedded all or partially in human headwear, clothing, or accessories (eyewear, rings, jewelry, or the like). Many of these communications devices have imbedded GNSS receivers, which have inherent limitations on their performance due to being very low-end receivers, being capable of receiving only a limited set of signals over-the-air, and/or being unable to process corrections to the signals that are received. Some of these communication devices do not have imbedded GNSS receivers. These communications devices have other processors such as central/host processors, microprocessors, digital signal processors and/or graphics processors for running other functions; and none of these are not involved in the internal operations of the GNSS chipset (if present). Herein, an electronic tape measure (ETM) is described. In various embodiments, the ETM comprises a radio frequency hardware component which may be integrated with a communication device or may be a stand-alone radio frequency hardware component that can be removably communicatively coupled with communication device. For example, the coupling may be via a universal serial bus or other protocol suitable for coupling digitized information over an extremely short distance of that is less that approximately 7 meters and often less than three centimeters. The radio frequency hardware component includes a plurality of antennas that are used to receive at least an L1 and an L2C GNSS signal and then transmit them to a communications device via a digitizer. The communication device is configured with a software defined GNSS receiver (Soft GNSS receiver) that runs as software on a processor which is not a part of a GNSS chipset. The Soft GNSS receiver running on the processor derives pseudorange and carrier measurements from the L1 and/or L2C GNSS signals to each GNSS satellite in view from a first location. The communication device receives, via a wireless connection, pseudorange(s) and carrier (s) measurements derived from the L1 and/or L2C signals at the same epoch from a second device at a second location. In one embodiment, the Soft GNSS receiver running on the processor also then determines a distance from the second location to said first location.

Example Electronic Tape Measure System

FIG. 1A shows components used in an electronic tape measure system 100 in accordance with various embodiments. In FIG. 1A, a first electronic tape measure (ETM) 110 receives radio frequency signals from a plurality of GNSS satellites. As will be described in greater detail below, a RTK reference station is typically situated at known, typically surveyed, positions and transmits its location together with the pseudorange and carrier phase measurements at frequencies L1 and/or L2C for all in-view satellites on an epoch-by-epoch basis. In accordance with at least one embodiment, at least one pseudorange and carrier phase to at least one satellite is determined and is timestamped and associated with the satellite. Typically, an RTK reference station will broadcast this information using UHF or spread spectrum radio transmitters, although other radio-frequency broadcast mediums are used in various embodiments.

In accordance with various embodiments, ETM 110 comprises a GNSS receiver system 300 which, in one embodiment, is a mobile device as is described in greater detail below with reference to FIGS. 3A-3E and 4A-4H. In accordance with various embodiments, ETM 110 is placed at a location, which may or may not be a previously surveyed position, and receives radio frequency signals from a plurality of GNSS satellites. ETM 110 is configured to determine pseudorange and carrier phase measurements on the received L1 and/or L2C signals from the GNSS satellites in view and to determine pseudorange and carrier phase measurements to at least four satellites in view for at least L1 or L2C signals in order to derive its geographical position. ETM 110 may determine its position fix from the data collected in order to better perform integer ambiguity resolution. ETM 110 performs integer ambiguity resolution to get the best estimate of distance from ETM 110 to at least one satellite. In an embodiment, ETM 110 sends at least one pseudorange and carrier measurement from one satellite to a second ETM 120 via a wireless link associated with the cellphone of ETM 110. In accordance with various embodiments, the term "carrier measurements" is defined in the paper "Compact Data Transmission Standard for High-Precision GPS," presented at the Proceedings of the 9th International Technical Meeting of the Satellite Division of The Institute of Navigation (ION GPS 1996), pp 861-871, Sep. 17-20 1996, at Kansas City, Mo. In Table A.4 titled "Observables Block Contents", the parameter "Carrier-Code" refers to a subtraction of the code phase measurement from the carrier phase measurement for the L1 signal. It is noted that Table A.5 titled "L2 Data Block Contents" shows that a similar subtraction of the L1 code phase measurement from the L2 carrier phase measurement can also be performed. In accordance with various embodiments, subtraction of the L1 code phase measurement from the L2C and/or L5 carrier phase measurement can similarly be performed as shown in the parameter titled "L2Carrier—L1 Code". Furthermore, it is noted that the L1 code phase can be reconstructed using the L1/L2C/L5 carrier phase measurement and the carrier—code data conveyed in the Compact Measurement Report. Additionally, other similar methods of sending data compactly can be used in accordance with various embodiments so that it can be reconstructed into full pseudoranges and carrier phases. In accordance with various embodiments, the measurements are timestamped and associated with a particular satellite. These measurements are sent on an epoch-by-epoch basis to a second ETM 120 via a wireless network 130. As shown in FIG. 1A, in at least one embodiment, ETM 110 communicates wirelessly (e.g., via a wireless Internet connection, a cellular telephone call, a Short Message Service (SMS) message, or the like) with wireless network 130 as shown in FIG. 1A via wireless connection 121. It is noted that unlike a typical RTK reference station there is no necessity for ETM 110 to transmit its geographical position. In accordance with various embodiments, ETM 110 does not need to transmit its geographical location. Additionally, ETM 110 can send a plurality of timestamped pseudorange and carrier phase measurements from a plurality of satellites to ETM 120.

In FIG. 1A, wireless network 130 conveys the at least one pseudorange measurement and carrier phase measurement for the L1 and/or L2C signals of the respective GNSS satellites in view to a second ETM 120 via a wireless connection 135. As with ETM 110, ETM 120 comprises a GNSS receiver system 300 which is a mobile device as is described in greater detail below with reference to FIGS. 3A-3E and 4A-4H. In accordance with various embodiments, ETM 120 is configured to use the pseudorange and carrier phase measurements received via wireless Internet connection 135 and pseudorange and carrier phase measurements it has received from at least the one satellite identified in the message from ETM 110 in view of ETM 110 during the same epochs. Using this information, ETM 120 is configured to generate a distance (e.g., 220 of FIG. 1B) from ETM 110 to ETM 120. Thus, when ETM 120 receives pseudorange and carrier phase information from ETM 110, it will determine a distance from ETM 110 to ETM 120. It is noted that in accordance with various embodiments, there is no requirement for ETM 110 to send information such as a position fix of the location at which it is situated. Similarly, in accordance with various embodiments, there is no requirement for ETM 120 to generate a position fix when determining the distance to ETM 110. Instead, when the pseudorange and carrier phase measurements from ETM 110 to at least one of GNSS satellites are subtracted from the pseudorange and carrier phase measurements from ETM 120 to the same GNSS satellite, the residual value is a distance from ETM 110 to ETM 120. Similarly, in accordance with various embodiments, there is no requirement for ETM 120 to generate a position fix when determining the distance from ETM 110 to measurement location 205. In other words, the exchange or use of geographical coordinates of either of ETM 110 and/or ETM 120 is not necessary to generate the distance (e.g., 220 of FIG. 1B) from ETM 110 to ETM 120 in accordance with various embodiments. As stated above, in accordance with various embodiments, ETM 110 can send a plurality of pseudoranges and carrier phases (e.g., four pseudoranges and carrier phases to four respective GNSS satellites) to ETM 120. In one embodiment, ETM 120 uses the pseudorange and carrier phase measurements received via wireless Internet connection 135 with pseudorange and carrier phase measurements it has received from the same plurality of GNSS satellites identified in the message from ETM 110 in view of ETM 110 during the same epochs. Using this information, ETM 120 is configured to generate a vector from ETM 110 to ETM 120 which not only tells the distance 220 from ETM 110 to ETM 120, but the direction as well. It is noted that it is not necessary to derive a position fix for ETM 120 when determining a vector from ETM 110 to ETM 120. It is necessary to estimate the pseudoranges, but the further calculations of location based on the pseudoranges is not required.

Thus, in accordance with various embodiments, ETM 110 collects GNSS observables (e.g., code phase information and carrier phase information for each respective GNSS satellite in view of ETM 110) and determines pseudoranges and carrier measurements to each respective GNSS satellite from which signals are received. ETM 110 will use RTK methods described below to invoke integer ambiguity resolution based upon the carrier phase information it has derived to improve the precision of determining the pseudorange and carrier phase to each respective GNSS satellite in view. ETM 120 will also perform these operations upon each respective GNSS signal it receives from GNSS satellites in view of ETM 120. ETM 120 will then initiate a handshake procedure with ETM 110 wherein ETM 120 conveys to ETM 110 which GNSS satellites are in view and which it is tracking to generate respective pseudoranges. In accordance with various embodiments, ETM 110 will determine which GNSS satellites it is tracking which is in common with the list of GNSS satellites being tracked by ETM 120. ETM 110 will then transmit at least one timestamped pseudorange to ETM 120 describing the distance from ETM 110 to a GNSS satellite which is also being tracked by ETM 120. In accordance with various embodiments, ETM 110 will also transmit the carrier phase measurements to the GNSS satellite as well to further refine the precision in determining the distance from ETM 110 to ETM 120. ETM 120 will then subtract the timestamped pseudorange it receives from ETM 110 from a pseudorange to the same GNSS satellite which it derived for the same time epoch. This results in a distance estimate expressed in a transit time between ETM 110 and ETM 120. ETM 120 then multiplies this residual (e.g., the transit time between ETM 110 and ETM 120) by the speed of light to derive a distance from ETM 110 to ETM 120 which is expressed in meters or feet. ETM 120 then displays this distance to a user. In accordance with various embodiments, ETM 120 will store the timestamped pseudorange and carrier phase measurements it received from ETM 110, along with the corresponding pseudorange and carrier phase measurement it derived autonomously for the same epoch, for later analysis. In accordance with various embodiments, ETM 120 can also derive a position fix based upon the pseudoranges and carrier phase measurements it derived. This position fix may further be refined based upon pseudoranges and carrier phase measurements it receives from ETM 110 using RTK methods discussed below.

Figure 1B:
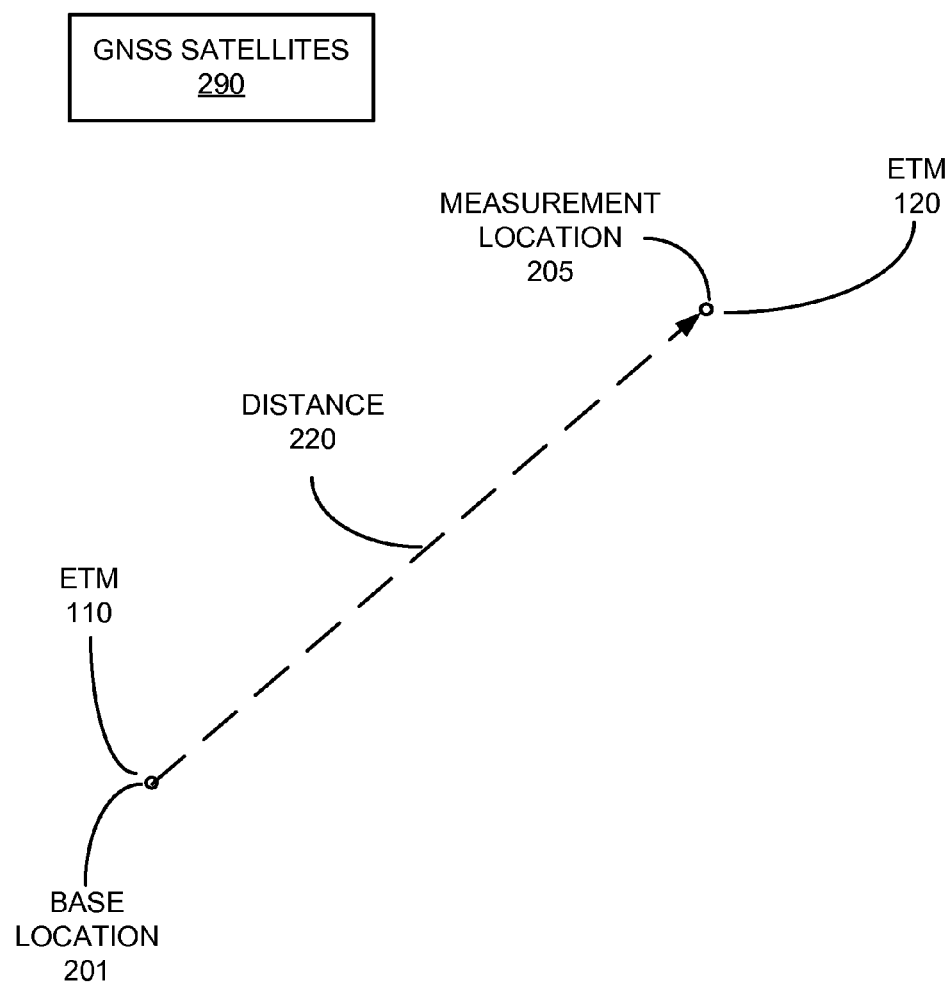
FIG. 1B shows the operation of an electronic tape measure system in accordance with one embodiment.

FIG. 1B shows the operation of an electronic tape measure system 100 in accordance with one embodiment. In FIG. 1B, electronic tape measure system 100 comprises an ETM 110 which is located at a base location 201 and ETM 120 which is located at a measurement location 205. In FIG. 1B, ETM 110 is located at a base location 201. In accordance with at least one embodiment, base location 201 comprises a known location. In other words, the coordinates in latitude and longitude have been determined (e.g., by surveying the coordinates of base location 201), and are known. In accordance with various embodiments, the elevation of base location 201 is also known. As described above, in accordance with various embodiments, ETM 110 comprises a mobile device (e.g., ETM 120 as described below) which can be carried by a user and placed at base location 201. In one embodiment, a user can enter the coordinates and elevation of base location 201 into ETM 110 to facilitate providing this information to ETM 120. As an example, if a user will re-use a particular location (e.g., base location 201), the user can have that location surveyed. When the user wants to use electronic tape measure system 100, the user can simply enter those coordinates, or select them from a menu of locations, and place ETM 110 at base location 201. As an example, this could be a cradle, docking station, or other device expressly designed to hold ETM 110, and located in a desired spot, which could be as simple as the top of a fence post or pole. The user can select an option for ETM 110 to operate in a mode in which it will provide data via wireless network 130 which facilitates ETM 120 determining a distance (e.g., 220 of FIG. 1B) from ETM 110 to the current location of ETM 120. Alternatively, ETM 110 can simply be placed in operation at base location 201. In accordance with various embodiments, a GNSS receiver such as is implemented with ETM 110 and ETM 120 is able, over time, to refine its estimated position fix to less than 10 cm, especially if GNSS corrections are received and applied at ETM 110.

In accordance with various embodiments, ETM 110 will process L1 and/or L2C GNSS signals received from GNSS satellites 290. ETM 110 will then determine pseudorange and carrier phase measurements for the L1 and/or L2C signals from each satellite in view of ETM 110 and with this data go on to determine a position fix and estimate the integer ambiguity, resulting in an accurate distance estimate to the satellite. This pseudorange and carrier phase information is timestamped by ETM 110 so that it can be provided to ETM 120 on an epoch-by-epoch basis. In other words, upon receiving a request from ETM 120 for pseudorange and carrier phase measurements for a given epoch, ETM 110 can determine which time intervals contain the information needed by ETM 120. In accordance with various embodiments, the request for pseudorange and carrier phase measurements from ETM 120 can include which satellites are in view of ETM 120 to reduce the data set searched by ETM 110 and the amount of data sent via wireless network 130. Alternatively, ETM 110 can continuously post via the Internet the pseudorange and carrier phase measurements of the L1 and/or L2C signals it receives on an epoch-by-epoch basis. This information can, for example, be conveyed directly to ETM 120 such as via a virtual private network (VPN), or posted at a website which is accessed by ETM 120. In accordance with at least one embodiment, the website at which ETM 110 posts the pseudoranges and carrier phase measurements comprises a searchable database which is accessed by ETM 120. ETM 120 can then enter search parameters such as which epochs it is seeking pseudoranges and carrier phase measurement for, which satellites are in view, etc. It is noted that in accordance with various embodiments, reference station 1310 can format pseudorange measurements using the Compressed Measurement Record (CMR), or the Compressed Measurement Record-Extended (CMRx) formats, or other data formats. It is noted that in accordance with various embodiments, while ETM 110 can send pseudorange and carrier phase measurements for both the L1 and L2C signals, there is not a requirement for ETM 110 to send pseudorange and carrier phase measurements for both the L1 and the L2C signals. In other words, in at least one embodiment ETM 110 can send pseudorange and/or carrier phase measurements for either the L1 signals, or the L2C signals, but not necessarily both.

In FIG. 1B, ETM 120 is located at a measurement location 205. In response to an indication to initiate the tape measure functionality (e.g., a user selection of a drop-down menu, or other interaction with a user interface), ETM 120 will determine pseudorange and carrier phase measurements of the L1 and/or L2C signals from each satellite in view while at measurement location 205. Again, this information is timestamped by ETM 120 so that it can be compared on an epoch-by-epoch basis with corresponding L1 and/or L2C pseudorange and carrier phase measurements from the same GNSS satellites 290 which are in view of both ETM 110 and ETM 120 at a first time $T_1$. Again, upon receiving a request from ETM 120 for pseudorange and carrier phase measurements for a given epoch (e.g., $T_1$), ETM 110 can determine which time intervals contain the information needed by ETM 120. As discussed above, ETM 120 receives this information over wireless network 130 via wireless Internet connection 135. Using this information, ETM 120 determines a first distance (e.g., distance 220 of FIG. 1B) from ETM 110 to ETM 120, or from ETM 120 to ETM 110. In at least one embodiment, there is no requirement for ETM 120 to utilize positioning information (e.g., latitude, longitude, and elevation) from ETM 110 in determining a first distance (e.g., distance 220 of FIG. 1B). In other words, the information sent from ETM 110 is not configured for use in refining a position determining operation of ETM 120 in at least one embodiment. Alternatively, ETM 110 can provide positioning information to ETM 120 when that information is available. In accordance with various embodiments, ETM 120 then determines a distance or vector from ETM 110 (e.g., from base location 201) to measurement location 205 at which ETM 120 is located. In accordance with at least one embodiment, when the position information of ETM 110 is not utilized, it is assigned a default location of (0:0:0) which respectively corresponds to coordinates in an X:Y:Z coordinate system. As will be discussed in greater detail below, ETM 120 compares the pseudorange and carrier phase measurements of the L1 and/or L2C signals from the satellites of GNSS satellites that are in view of both ETM 110 and ETM 120 at time $T_1$ to determine a first distance (e.g., distance 220 of FIG. 1B) which has a set of coordinates ($X_1$, $Y_1$, and $Z_1$) in the coordinate system.

As discussed above, if ETM sends a plurality of pseudorange and carrier phase measurements from each satellite in view, ETM 120 can determine a vector from ETM 110 to ETM 120. In accordance with various embodiments, when a user moves ETM 120 to second location (not shown) and again initiates the electronic tape measure functionality, ETM 120 will again determine pseudorange and carrier phase measurements of the L1 and/or L2C signals from each satellite in view while at the second location. Again, this information is timestamped by ETM 120 so that it can be compared on an epoch-by-epoch basis with corresponding L1 and/or L2C pseudorange and carrier phase measurements from the same GNSS satellites 290 which are in view of both ETM 110 and ETM 120 at a second time $T_2$. Again, upon receiving a request from ETM 120 for pseudorange and carrier phase measurements for a given epoch (e.g., $T_2$), ETM 110 can determine which time intervals contain the information needed by ETM 120 during this second epoch and send that information via wireless network 130 to ETM 120. As described above, ETM 120 uses this information to determine a second distance or vector from base location 201 to the second location. As will be discussed in greater detail below, ETM 120 compares the pseudorange and carrier phase measurements of the L1 and/or L2C signals from the satellites of GNSS satellites that are in view of both ETM 110 and ETM 120 at time $T_2$ to determine second distance which has a set of coordinates ($X_2$, $Y_2$, and $Z_2$) in the coordinate system. In accordance with at least one embodiment, ETM 120 can determine a vector (not shown) which connects the terminal ends of a first vector (e.g., distance 220 of FIG. 1B) and the second vector to determine a distance between measurement location 205 and the second location. In accordance with at least one embodiment, an operation (e.g. finding the square root of the sum of the squares of the differences between the pseudorange vectors as estimated from a commonly in view satellite to each receivers), is expressed as:

$$\sqrt{(X1-X2)^2+(Y1-Y2)^2+(Z1-Z2)^2}$$

is performed by ETM 120 which yields a distance from the terminal end of a first vector (e.g., the end of distance 220 of FIG. 1B proximate to measurement location 205) to the terminal end of the second vector (e.g., the end of the second vector proximate to the second location).

Alternatively, a vector addition operation can be performed to determine a vector from the terminal end of the first vector (e.g., measurement location 205 of FIG. 1B) to the second location. In so doing, a user can quickly determine the distance and direction between points using ETM 120 and a base location (e.g., ETM 110) without the necessity of expensive infrastructure or equipment. It is noted that in accordance with various embodiments, rather than using an ETM 110, an RTK reference station (e.g., 1310 of FIG. 13) may perform the functions described above with reference to ETM 110. Again, the RTK reference station can send the L1 and/or L2C pseudorange and carrier phase measurements from the same GNSS satellites 290 which are in view of the RTK reference station and ETM 120 at a given epoch. This can be in response to a request from ETM 120 for the pseudorange and carrier phase measurements for a given epoch. Additionally, the RTK reference station can provide pseudorange and carrier phase measurements for a selected set of satellites in view of ETM 120.

Global Navigation Satellite Systems

A Global Navigation Satellite System (GNSS) is a navigation system that makes use of a constellation of satellites orbiting the earth to provide signals to a receiver, such as ETM 120A, 300B, 300C, and 300D of FIGS. 3A, 3B, 3C, 3D, and 3E respectively, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, the BeiDou Satellite Navigation System currently deployed by China, and the GALILEO system currently being deployed by the European Union (EU). As will be discussed in greater detail below, ETM 110 and ETM 120 are implementations of GNSS receiver systems 300A, 300B, 300C, and 300D in accordance with various embodiments. Table 1 below shows frequency bands of various satellite navigation systems which are equivalent to the L1 and L2C discussed above with reference to various embodiments. Thus, while various embodiments specifically cite the L1 and L2C GPS signals, equivalent GLONASS L1 and L2 signals can be used in various embodiments. Similarly, for the Galileo satellite navigation system, the E5 and E1 signals can be used in various embodiments. Also, for the BeiDou satellite navigation system, the B1 and B2 signals can be used in various embodiments.

TABLE 1

| System | GPS | GLONASS | BeiDou | Galileo |
|---|---|---|---|---|
| Owner | United States | Russian Federation | China | European Union |
| Frequency | 1.57542 GHz (L1 signal) 1.2276 GHz (L2/L2C signal) | Around 1.602 GHz (SP) Around 1.246 GHz (SP) | 1.561098 GHz (B1) 1.589742 GHz (B1-2) 1.20714 GHz (B2) 1.26852 GHz (B3) | 1.164-1.215 GHz (E5a and E5b) 1.260-1.300 GHz (E6) 1.559-1.592 GHz (E2-L1-E11) |

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequencies, a pseudo-random number (PRN) code, and satellite navigation data. Recently, a second civilian GPS signal, the L2C signal, has been added to provide greater precision in determining positions in commercial applications. Like the L2 signal, the L2C is also broadcast in the 1227.60 MHz frequency band. As a result, civilian users having dual-frequency GNSS receivers can benefit from faster acquisition, enhanced reliability, greater operating range, and greater precision.

Two different PRN codes are transmitted by each satellite: A coarse acquisition (C/A) code and a precision (P/Y) code which is encrypted for use by authorized users. A receiver, such as GNSS receiver systems 300A-D, designed for precision positioning contains multiple channels, each of which can track the signals on both L1 and L2C frequencies from a GPS satellite in view above the horizon at the receiver antenna, and from these computes the observables for that satellite comprising the L1 pseudorange, possibly the L2C pseudorange and the coherent L1 and L2C carrier phases. The term "pseudorange" refers to the range from each satellite to the antenna of a GNSS receiver (e.g., 232 of FIG. 2) which is derived from difference of the timing signal conveyed via the L1 and L2C signals and a corresponding internal clock signal of the GNSS receiver. The pseudorange differs the true satellite-receiver range (e.g., the true distance from the satellite(s) to the receiver's antenna) due to a variety of error contributions including: satellite clock error, receiver clock error, satellite orbital position error, ionospheric delay error, tropospheric delay error, multipath error, etc. Coherent phase tracking implies that the carrier phases from two channels assigned to the same satellite and frequency will differ only by an integer number of cycles. It is noted that in accordance with various embodiments, continuous tracking of the L2C signal is not necessary.

Each GLONASS satellite conventionally transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz respectively. The code and carrier signal structure is similar to that of NAVSTAR. A GNSS receiver designed for precision positioning contains multiple channels each of which can track the signals from both GPS and GLONASS satellites on their respective L1, L2, L2C frequencies, and generate pseudorange and carrier phase observables from these. Future generations of GNSS receivers will include the ability to track signals from all deployed GNSSs. It should be noted that in the near future a modernized L1 Glonass signal will be added that is centered at 1575.42 MHz, the same center frequency as L1 GPS. Additionally, this modernized Glonass signal will be in a code division multiple access (CDMA) format rather than in a frequency division multiple access (FDMA) like its conventional counterpart that is centered at 1602.0 MHz.

The basic accuracy in determining a position fix of a GPS receiver that processes only the code phase information without any further corrections is on the order of several-to-many meters. This is partially due to the inherent level of accuracy available via code phase, plus many more kinds of error contributions to the GPS signal. Since GPS is at its core a timing system, the resolution of a time-based measurement available with the fundamental GPS signal using only code phase is on the order of 10 nanoseconds at best, which translates to 10 feet of uncertainty with a resulting position fix error of a similar magnitude. Time ranging using the C/A Code phase has an inherent uncertainty related to the wavelength of the C/A code, which is about 300 meters (e.g., 1 sec/(1023000)=1000 nanoseconds, or a thousand feet of radio wave propagation). Current resolution methods only can achieve about 1/100 of the code phase wavelength, or approximately 3 meters. Additionally, external error sources can greatly increase this level of uncertainty such as ionospheric and tropospheric delay, receiver clock errors, satellite clock errors, and satellite orbital position errors.

However, the GPS radio signal wavelength is 19 cm (wavelength=c/f, or $3 \times 10^{\wedge}8/1.57542 \times 10^{\wedge}9$). Ideally, if one could determine the exact number of wavelengths between receiver and each satellite, the error can be reduced to some fraction of a wavelength, which is on the order of a few centimeters. By measuring the phase of the carrier frequency, sub-centimeter accuracies may be obtained. If the carrier phase can be measured to within a few degrees, such as 5 degrees, then the accuracy is improved to 19×5/360, or 0.263 cm, which is much less than any of the other error contributions after correction. So measuring carrier phase is among the most important of the GPS receiver performance enhancements yet developed. The exact number of wavelengths of the GPS signal between the receiver and the various satellites is desired, plus the fraction of a wavelength as measured by the carrier phase.

Unfortunately, knowing the precise number of wavelengths to each satellite is difficult (cf. "Integer Ambiguity Resolution on Undifferenced GPS phase measurements and its application to PPP and satellite precise orbit determination", D. Laurichesse et al., NAVIGATION, Vol. 56, No. 2, Summer 2009). However, there are well-known techniques that can easily and quickly infer the precise number of wavelengths between two receivers commonly referred to as the RTK process, and thus lead to a determination of their relative position. Determining the number of wavelengths between two receivers is referred to as the "integer ambiguity resolution process," so named because the integer number of wavelengths is not knowable from just carrier phase measurements directly, since it can only determine a specific portion of a single wavelength.

One method of resolving integer ambiguity in accordance with various embodiments is described in U.S. Pat. No. 5,442,363 to Benjamin Remondi. The method originally was used to determine the coordinates of a receiver using received L1 and L2 GNSS signals and is described in U.S. Pat. No. 5,442,363. The method determines the relative position of a remote GPS receiver/antenna with respect to the location of a reference GPS receiver/antenna. GPS code and carrier range measurements made by both the reference and the remote receivers are used in the ambiguity resolution process. After the lane ambiguities are resolved, only double differenced carrier phase measurements are used in the computation of the precise (e.g., centimeter level) positions. Both carrier measurements and code measurements are used to determine centimeter-level-accuracy positions.

The major steps performed are: (1) the meter-level differential GPS initial approximate solution, (2) establishing the grid for candidates, and (3) the resolution of the carrier range integer ambiguities. Although the method can use just L1 code and carrier and has been demonstrated using L1 code and carrier plus codeless L2-squared carrier measurements, the preferred observation set for the invention is full-wavelength L1 and L2/L2C carrier ranges and at least one code range (usually L1 C/A code). Improved performance is achieved with additional code ranges. For simplicity the ambiguity resolution step will be described assuming only these three observation types. In practice more observation types can be used when available. Additionally, lane resolution using single frequency can be used by the invention's method, L2/L2C-squared and full-wavelength L2/L2C modes are typically the preferred modes. By determining the number of carrier-phase wavelengths between a GNSS antenna (e.g., 232 of FIG. 2) and the satellite sending the signal, the time of flight of the signal is determined. This is multiplied by the speed of light to derive a satellite-receiver distance.

Achieving the desired reduction in error or uncertainty in the path length between the satellites and the receiver has been the main goal of a variety of improvement techniques. There are two basic ways to improve accuracy. The first method is to perform carrier phase tracking of the GPS signal, which improves the timing resolution over the code phase results by several orders of magnitude and could get to a centimeter level estimate of the distance between a receiver and the satellites, if the integer ambiguity issue is resolved, and if there were no other kinds of errors. In another process, known as "wide-laning", the L2C signal (e.g., 1227.60 MHz) is subtracted from the L1 signal (e.g., 1575.42 MHz) which results in a third signal with a frequency of 347.82 MHz. This lower frequency signal has a correspondingly longer wavelength. As a result, it is easier to narrow the field of candidate code phase phases which are then processed to determine the corresponding carrier phase. In accordance with various embodiments, wide-laning is used to expedite re-acquisition the L1 carrier phase signal. It is noted that both the L2C and/or L5 signals are both candidate carrier frequencies for performing wide-laning operations. Another method is to eliminate known errors that corrupt the estimate of the distance to the satellites, by various processing techniques. One method of error correction to eliminate known errors is known as Differential GPS, but this method only gets to meter-level accuracy, and cannot get to centimeter level accuracy. Another kind of error correction to eliminate known errors employs specific, different types of correction schemes in the pair of cellphone receivers of ETM 110 and ETM 120, and does not rely on any other external correction methods. This method has become known as, and is referred to herein, as the Real Time Kinematic method.

A third kind of error correction to eliminate known errors makes use of the GPS satellite system's network-wide corrections determined by a network of observation stations which are used to synthesize a broadcast correction data set that provides corrections for satellite clock and orbital position errors, along with other items. This is referred to herein as a Precise Positioning Point (PPP) correction system, such as the RTX system from Trimble Navigation Limited, and the data is available as a service to subscribers in select parts of the world, usually under a license agreement. Operation of the RTK method together with a PPP correction system may yield the best performance. However, implementing the RTK method alone has the advantage of no fees, licenses, or other additional costs. Additionally, RTK implementation is much more widespread and may achieve 2-5 cm accuracy or better. In accordance with various embodiments, both ETM 110 and ETM 120 implement a PPP correction system which provides precise orbital and clock data for each GNSS satellite in view of ETM 110 and/or ETM 120.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as GNSS receiver systems 300A-D which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a rover unit which can use this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the rover unit receiving the broadcast error correction the more useful the DGPS corrections from that reference station will be.

The system is called DGPS when GPS is the only constellation used for Differential GNSS. DGPS provides an accuracy on the order of 1 meter or 1 sigma for users in a range that is approximately in a few tens of kilometers (kms) from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method.

Real-Time Kinematic System

An improvement to DGPS methods is referred to as Real-time Kinematic (RTK). As in the DGPS method, the RTK method, utilizes a reference station located at a determined or surveyed point. The reference station collects data from the same set of satellites in view by the GNSS receiver systems 300A-D in the area. Measurements of GPS signal errors taken at the reference station (e.g., dual-frequency pseudorange signal errors) and broadcast to one or more GNSS receiver systems 300A-D working in the area. The one or more GNSS receiver systems 300A-D combine the reference station data with locally collected position measurements to estimate local carrier-phase ambiguities, thus allowing a more precise determination of the position of GNSS receiver systems 300A-D. The RTK method is different from DGPS methods in that the vector from a reference station 110 to one of GNSS receiver systems 300A-D is determined (e.g., using the single differences or double differences methods). In DGPS methods, reference stations are used to calculate the changes needed in each pseudorange for a given satellite in view of the reference station, and the GNSS receiver systems 300A-D, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to a receiver of the GNSS receiver systems 300A-D, or pseudo range) changes significantly for separation distances beyond 70 km. This is because the ionosphere is typically not homogeneous in its density of electrons, and because the electron density may change based on, for example, the sun's position and therefore time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

In an example implementation of using reference station data, inputs to ETM 120 are reference station network, or VRS, corrections, GNSS pseudorange plus carrier phase information from the radio frequency data component 310. Reference corrections and data from radio frequency data component 310 are synchronized and corrections are applied to the GNSS data for atmospheric models and so on. The output is synchronized GNSS data. Carrier phase ambiguities in floating point, and nuisance parameters are estimated. The output is user position plus carrier phase ambiguities in floating point. Improved user-position estimates are generated based upon the above output using the integer-nature of carrier phase ambiguities. In a typical implementation to determine a position of ETM 120 with greater precision, this results in the output of an RTK position solution, which can be used according to various embodiments.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the ETM 120 with the means to estimate the ionospheric path delay from each satellite in view from ETM 120, and to take account other error contributions for those same satellites at the current instant in time for the ETM 120's location.

The ETM 120 is configured to initiate a call to the control center to make a connection with the processing computer when it is determined that the VRS process is to be activated.

The ETM 120 sends its approximate position, based on raw GPS data from the satellites in view without any corrections, to the control center. Typically, this approximate position is accurate to approximately 4-7 meters. The user then requests a set of "modeled observables" for the specific location of the ETM 120. The control center performs a series of calculations and creates a set of correction models that provide the ETM 120 with the means to estimate the ionospheric path delay from each satellite in view from the ETM 120, and to take into account other error contributions for those same satellites at the current instant in time for the ETM 120's location. In other words, the corrections for a specific ETM 120 at a specific location are determined on command by the central processor at the control center and a corrected data stream is sent from the control center to the ETM 120. Alternatively, the control center may instead send atmospheric and ephemeris corrections to the ETM 120 which then uses that information to determine its position more precisely.

These corrections are now sufficiently precise that the high performance position accuracy standard of 2-3 cm may be determined, in real time, for any arbitrary ETM 120's position. Thus a GPS enabled ETM 120's raw GPS data fix can be corrected to a degree that makes it behave as if it were a surveyed reference location; hence the terminology "virtual reference station."

An example of a network RTK system is described in U.S. Pat. No. 5,899,957, entitled "Carrier Phase Differential GPS Corrections Network," by Peter Loomis, assigned to the assignee of the present application.

The Virtual Reference Station method extends the allowable distance from any reference station to the ETM 120. Reference stations may now be located hundreds of miles apart, and corrections can be generated for any point within an area surrounded by reference stations. However, there are many construction projects where cellular coverage is not available over the entire physical area under construction and survey.

Virtual Reference Stations

To achieve very accurate positioning (to several centimeters or less) of a terrestrial mobile platform of an ETM 120, relative or differential positioning methods are commonly employed. These methods use a GNSS reference receiver located at a known position, in addition to the data from a GNSS receiver (e.g., ETM 120) on a mobile platform, to compute the estimated position of the mobile platform relative to the reference receiver.

The most accurate known method uses relative GNSS carrier phase interferometry between the ETM 120's receiver and GNSS reference receiver antennas plus resolution of integer wavelength ambiguities in the differential phases to achieve centimeter-level positioning accuracies. These differential GNSS methods are predicated on the near exact correlation of several common errors in the ETM 120 and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the ETM 120 and reference receivers are almost exactly the same. Furthermore, these errors are consistent and repeatable when ETM 120 is moved from one position to another to record the position of various features which are being measured for some short period of time, typically less than 1 hour for less precise distance measurement, or a few minutes for a more precise (e.g., centimeter level precision) measurement of distance. These atmospheric delay errors therefore cancel in the ETM 120's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the ETM 120 and reference receiver antennas become increasingly different, so that their presence in the ETM 120's-reference differential GNSS observables and their influence on the ambiguity resolution process increases. Ambiguity resolution on single ETM 120's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of an ETM 120's antenna(s) (e.g., 311, 312, and 318 of FIGS. 3A-3E and 4A-4H) using reference observables from three or more reference receivers that approximately surround the ETM 120's receiver trajectory. This implies that the ETM 120's receiver trajectory is mostly contained by a closed polygon whose vertices are the reference receiver antennas. The ETM 120 can move a few kilometers outside this polygon without significant loss of positioning accuracy. A network GNSS algorithm calibrates the ionosphere and troposphere signal delays at each reference receiver position and then interpolates and possibly extrapolates these to the ETM 120's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the ETM 120 and reference receivers so as to establish a relative phase interferometry position of the ETM 120's antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the ETM 120 and reference receivers result in the cancellation of all common mode range errors except the integer ambiguities. An ambiguity resolution algorithm uses redundant carrier phase observables from the ETM 120 and reference receivers, and the known reference antenna position, to estimate and thereby resolve these ambiguities.

Once the integer cycle ambiguities are known, the ETM 120's GNSS receiver 107 can compute its antenna position with accuracies generally on the order of a few centimeters, provided that the ETM 120 and reference antennas are not separated by more than 10 kilometers. This method of precise positioning performed in real-time is commonly referred to as real-time kinematic (RTK) positioning. The separation between an ETM 120 and reference antennas shall be referred to as "cellular device reference separation."

The reason for the cellular device-reference separation constraint is that KAR positioning relies on near exact correlation of atmospheric signal delay errors between the ETM 120 and reference receiver observables, so that they cancel in the ETM 120's reference observables combinations (for example, differences between ETM 120 and reference observables per satellite). The largest error in carrier-phase positioning solutions is introduced by the ionosphere, a layer of free electrons from the components of the atmosphere caused by solar radiation, surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatial-temporal correlations of the ionosphere and troposphere to correct for these non-geometric influences.

When the ETM 120 reference separation exceeds 10 kilometers, as maybe the case when the ETM 120 has a GNSS receiver that is a LEO satellite receiver, the atmospheric delay errors become de-correlated and do not cancel exactly. The residual errors can now interfere with the ambiguity resolution process and thereby make correct ambiguity resolution and precise positioning less reliable.

The ETM 120's reference separation constraint has made KAR positioning with a single reference receiver unsuitable for certain mobile positioning applications where the mission of the mobile platform of the ETM 120 will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the ETM 120's receiver, so that the ETM 120's receiver can perform reliable ambiguity resolution on combinations of carrier phase observables from the ETM 120 and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of ETM 120's position accuracy improvement. A VRS network method comprises a VRS corrections generator and a single-baseline differential GNSS position generator such as a GNSS receiver 107 with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the ETM 120 and reference receiver observables to cancel atmospheric delay errors and other common mode errors such as orbital and satellite clock errors. The VRS position is usually specified to be close to or the same as the roving receiver's estimated position so that the actual atmospheric errors in the ETM 120 receiver observables approximately cancel the estimated atmospheric errors in the VRS observables in the rovers reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Navstar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the ETM 120's receiver. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-cellular-device-bi-directional data communication channels. Each server-cellular device bi-directional communication channel serves one ETM 120. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the ETM 120.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va., 22209. The synthetic observables are the observables that a reference receiver located at the VRS position would measure. The VRS position is selected to be close to the ETM 120's estimated position so that the ETM 120's VRS separation is less than a maximum separation considered acceptable for the application. Consequently, the ETM 120 must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., Virtual Reference Stations versus Broadcast Solutions in Network RTK, GNSS 2003 Proceedings, Graz, Austria (2003).

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Positioning Point (PPP)

Descriptions of a Precise Point Positioning (PPP) technique are provided in U.S. Pat. No. 8,587,475, of Leandro, which is assigned to Trimble Navigation Limited. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Ltd. Hence, the term "PPP" is used in this document merely to facilitate description and is used without derogation to any trademark rights of Trimble Navigation Ltd. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 107, in the field (conventionally by satellite service or cellular link) Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices that include WAAS-enabled GPS receivers can receive the broadcasted WAAS corrections. According to one embodiment, the ETM 120 is a WAAS-enabled GPS receiver. The WAAS corrections can be used to improve the accuracy of the positions of receiver such as ETM 120, for example, by applying the WAAS corrections to extracted pseudoranges. WAAS operation and implementation is well known in the art.

Example GNSS Receiver

Figure 2:
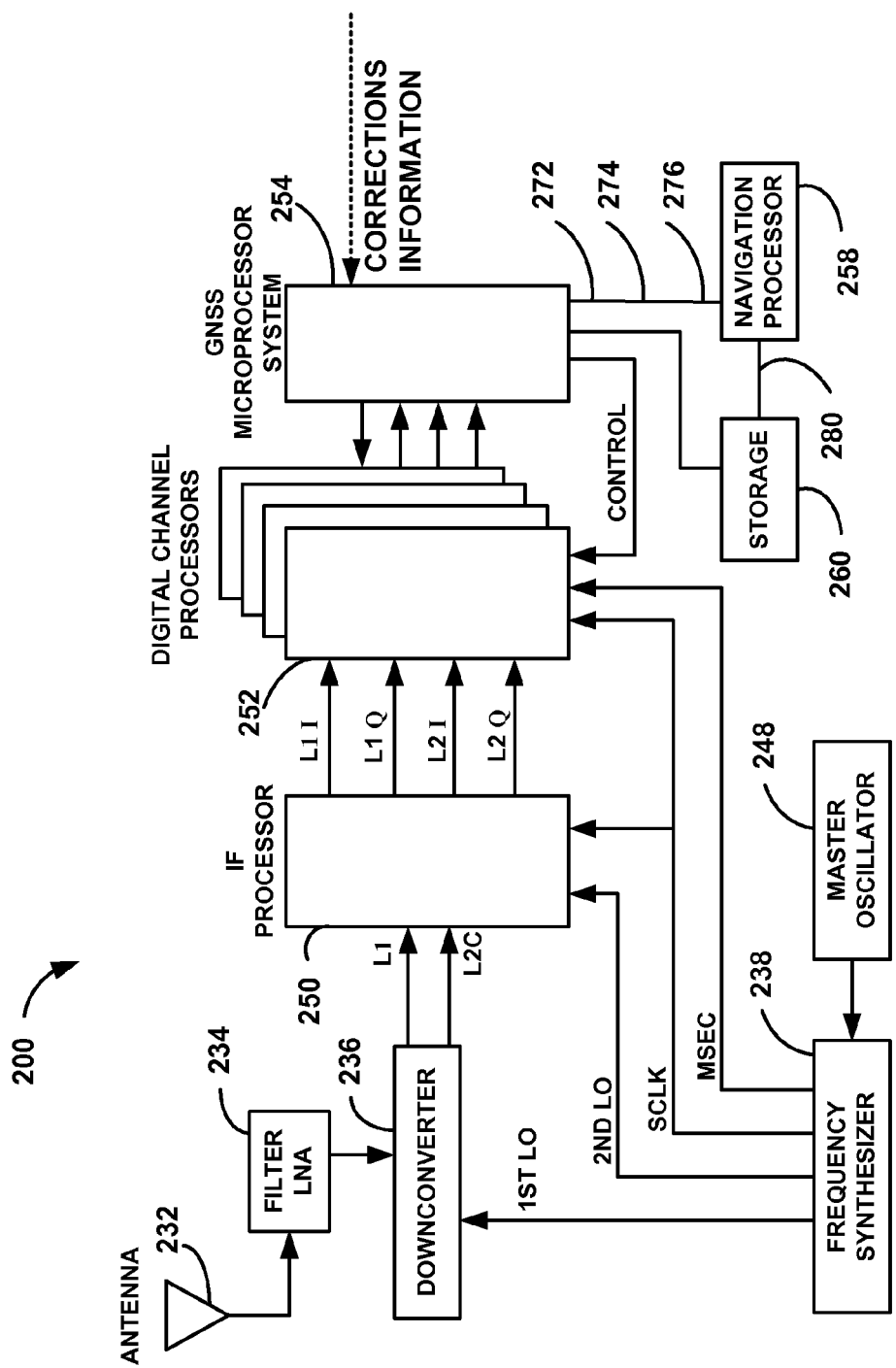
FIG. 2 depicts a block diagram of a GNSS receiver, according to one embodiment.

With reference now to FIG. 2, a block diagram is shown of an embodiment of an example GNSS receiver 200 which may be used in accordance with various embodiments described herein. In particular, FIG. 2 illustrates a block diagram of a GNSS receiver 200 in the form of a GPS receiver capable of demodulation of the L1 and/or L2 signal(s) received from one or more GPS satellites. A more detailed discussion of the function of a receiver such as the GPS receiver depicted in FIG. 2 can be found in U.S. Pat. No. 5,621,416, by Gary R. Lennen, is titled "Optimized processing of signals for enhanced cross-correlation in a satellite positioning system receiver," and includes a GPS receiver very similar to GNSS receiver 200 of FIG. 2.

In FIG. 2, received L1 and L2/L2C signals are generated by at least one GPS satellite. Each GPS satellite generates different signal L1 and L2/L2C signals and they are processed by different digital channel processors 252 which operate in the same way as one another. FIG. 2 shows GPS signals (L1=1575.42 MHz, L2/L2C=1227.60 MHz) entering GNSS receiver 200 through a dual frequency antenna 232. Antenna 232 may be a magnetically mountable model commercially available from Trimble Navigation of Sunnyvale, Calif. Master oscillator 248 provides the reference oscillator which drives all other clocks in the system. Frequency synthesizer 238 takes the output of master oscillator 248 and generates important clock and local oscillator frequencies used throughout the system. For example, in one embodiment frequency synthesizer 238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 234 performs filtering and low noise amplification of both L1 and L2/L2C signals. The noise figure of GNSS receiver 200 is dictated by the performance of the filter/LNA combination. The downconvertor 236 mixes both L1 and L2/L2C signals in frequency down to approximately 175 MHz and outputs the analog form L1 and L2/L2C signals into an IF (intermediate frequency) processor 250. IF processor 250 takes the analog form L1 and L2/L2C signals at approximately 175 MHz and converts them into digitally sampled L1 and L2/L2C in-phase (L1 I and L2 I) and quadrature signals (L1 Q and L2 Q) at carrier frequencies 420 KHz for L1 and at 2.6 MHz for L2/L2C signals respectively.

At least one digital channel processor 252 inputs the digitally sampled L1 and L2/L2C in-phase and quadrature signals. All digital channel processors 252 are typically are identical by design and typically operate on identical input samples. Each digital channel processor 252 is designed to digitally track the L1 and L2/L2C signals produced by one satellite by tracking code and carrier signals and pseudorange measurements in conjunction with the GNSS microprocessor system 254. One digital channel processor 252 is capable of tracking one satellite in both L1 and L2/L2C channels. In accordance with various embodiments, microprocessor system 254 is implemented by a processor 331 of FIGS. 3A-3E which facilitates tracking and measurements processes, providing pseudorange and carrier phase measurements for a determining position fix logic 258. In one embodiment, microprocessor system 254 provides signals to control the operation of one or more digital channel processors 252. According to one embodiment, the GNSS microprocessor system 254 provides one or more of pseudorange information 272, Doppler Shift information 274, and real Carrier Phase Information 276 to the determining position fix logic 258. One or more of pseudorange information 272, Doppler Shift information 274, and real Carrier Phase Information 276 can also be obtained from storage 260. One or more of the signals 272, 274, 276 can be conveyed to a processor 331 that is external to the GNSS chipset 337 (FIGS. 3A-3E) in accordance with at least one embodiment. Determining position fix logic 258 performs the higher level function of combining measurements in such a way as to produce position, velocity and time information for the differential and surveying functions, for example, in the form of a position fix 280. Storage 260 is coupled with determining position fix logic 258 and microprocessor system 254. It is appreciated that storage 260 may comprise a volatile or non-volatile storage such as a RAM or ROM, or some other computer readable memory device or media. In some embodiments, determining position fix logic 258 performs one or more of the methods of position correction described herein.

In some embodiments, microprocessor 254 and/or determining position fix logic 258 receive additional inputs for use in receiving corrections information. According to one embodiment, an example of the corrections information is WAAS corrections. According to one embodiment, examples of corrections information are differential GPS corrections, RTK corrections, signals used by the previously referenced Enge-Talbot method, and wide area augmentation system (WAAS) corrections among others.

Although FIG. 2 depicts a GNSS receiver 200 with navigation signals L1I, L1Q, L2I, L2Q, various embodiments are well suited different combinations of navigational signals. For example, according to one embodiment, the GNSS receiver 200 may only have an L1I navigational signal. According to one embodiment, the GNSS receiver 110 may only have L1I, L1Q and L2I.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments described herein are realized, in some instances, as a series of computer readable instructions (e.g., software program) that reside within non-transitory computer readable storage memory of an ETM 120 (FIGS. 3A-3E and 4A-4H) and are executed by a hardware processor of the ETM 120. When executed, the instructions cause a computer system to implement the functionality of various embodiments described herein. For example, the instructions can be executed by a central processing unit associated with the ETM 120. According to one embodiment, the non-transitory computer readable storage medium is tangible.

Figure 12:
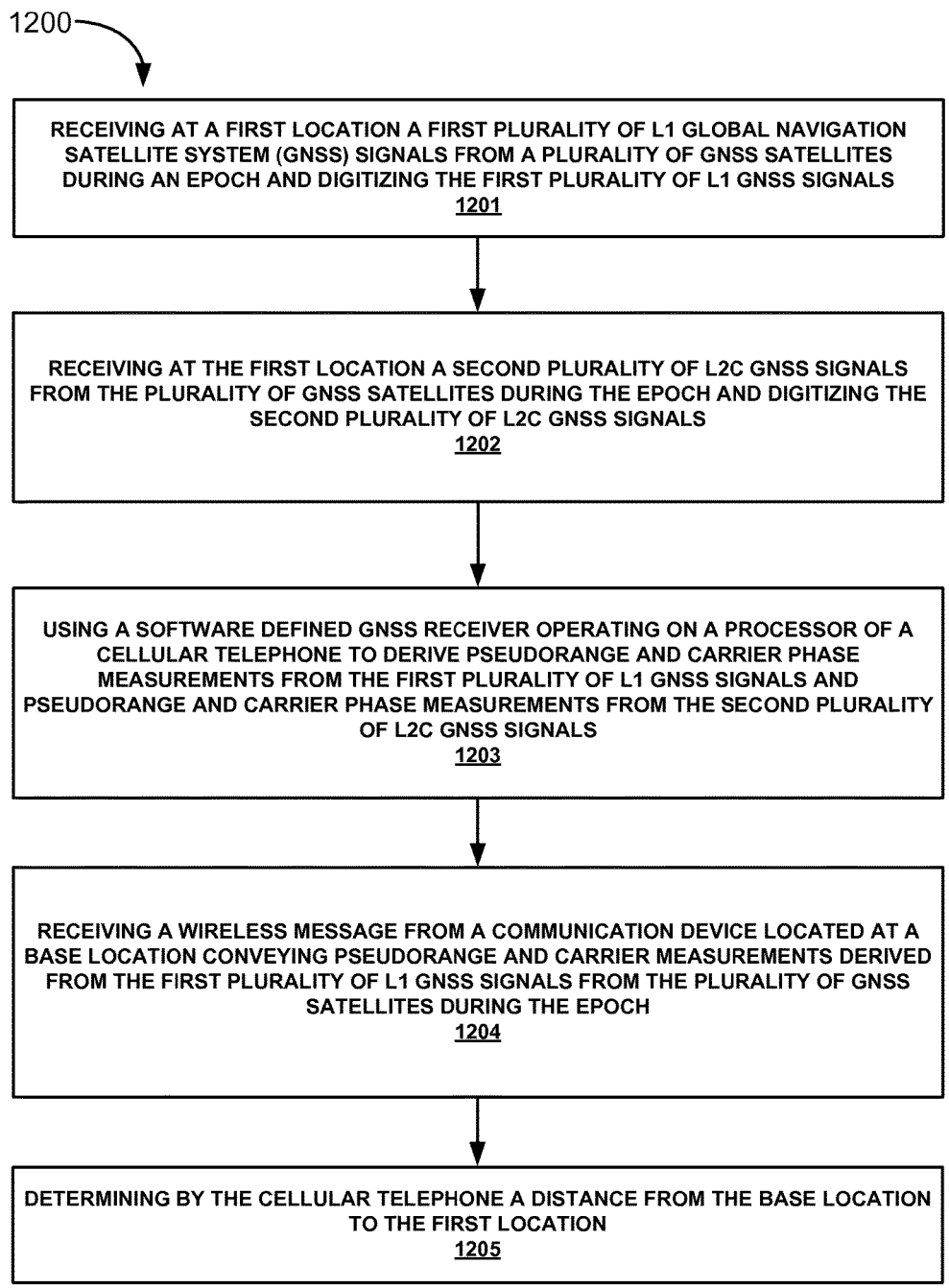
FIG. 12 is a flowchart of a method 1200 of implementing an electronic tape measure in accordance with one embodiment.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause GNSS receiver system(s) 300 to implement the functionality of various embodiments. For example, according to one embodiment, the soft GNSS receiver 333 and the operations of the flowchart 1200 depicted in FIG. 12 are implemented with computer readable instructions that are stored on computer readable storage medium, which can be tangible or non-transitory or a combination thereof, and can be executed by a hardware processor 331 of an ETM 120. According to one embodiment, the non-transitory computer readable storage medium is tangible.

GNSS Receiver System with Radio Frequency (RF) Hardware Component

Figure 3A:
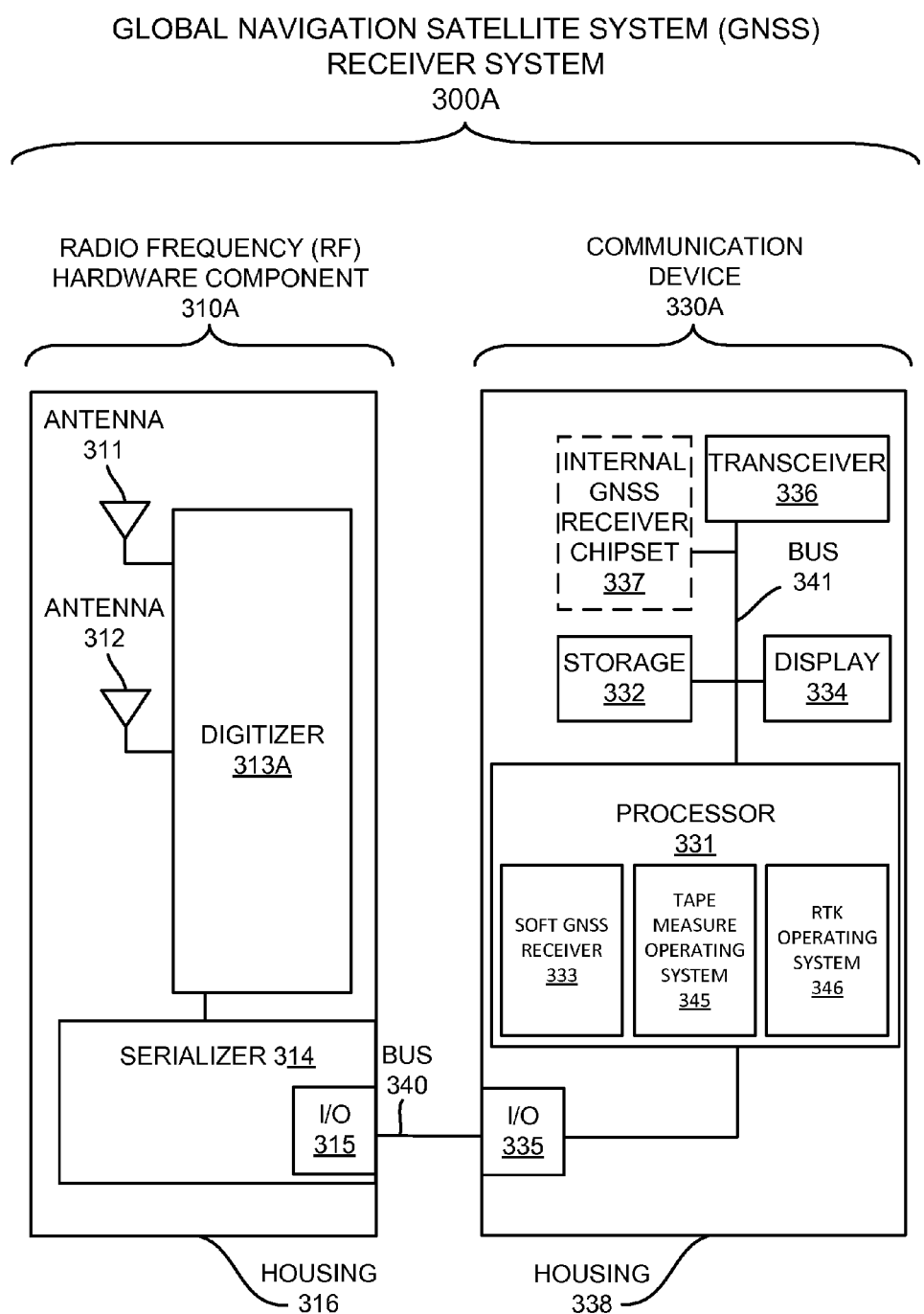
FIG. 3A is a block diagram of a GNSS receiver system, according to various embodiments.

FIG. 3A is a block diagram of an ETM 120A, according to various embodiments. In accordance with various embodiments, ETM 120A comprises a mobile device(s) and is implemented as ETM 110 and ETM 120 described above. ETM 120A comprises an RF hardware component 310A and a communication device 330A, which are communicatively coupled to one another. Bus 340 is illustrated as the communicative coupling between RF hardware component 310A and a communication device 330A; however, other wireline and short-range wireless communicative couplings may be utilized.

In some stand-alone embodiments, a stand-alone radio frequency hardware component 310A is disposed inside of a housing 316, as depicted. In some embodiments, RF hardware component 310A includes: a first antenna 311, a second antenna 312, a digitizer 313, a serializer 314, and an input/output (I/O) 315. In some embodiments, where RF hardware component 310A and communication device 330A are more highly integrated allowing serializer 314, I/O 315, bus 340, and I/O 335 to be omitted from the communication path between RF hardware component 310A and communication device 330A. Thus, in various embodiments RF hardware component 310A and communication device 330A may be stand-alone physical entities that are removably communicatively coupled by wireline or else wirelessly communicatively coupled, one or both may not have a housing, or may they may be integrated with one another.

Housing 316 may take any form, but in some embodiments is designed to act as a sleeve which includes a receiving cavity into which a portion of particular communication device 330A snugly fits. In this manner, housing 316 is paired in a convenient form factor with a communication device 330A to which it provides GNSS signals, and also serves a dual-purpose of providing an external protective covering for some portions of the communication device 330A. In other embodiments, housing 316 may take on the form factor of headwear (e.g., disposed in or as part of a helmet, cap, hardhat, or other head wear in the manner previously depicted herein). In yet other embodiments, housing 316 may take on other form factors.

First antenna 311 is a narrow band antenna, and may take any suitable form such including that of a patch antenna or a helical antenna. For example, in accordance with at least one embodiment first antenna 311 comprises a circularly polarized (CP) GNSS antenna typically realized in a flat "patch" configuration, but may also be realized in a quadrifiler helix configuration. There are a variety of antenna designs which can be implemented as first antenna 311 in accordance with various embodiments such as, but not limited to, patch antennas, quadrifiler helix antennas, and planar quadrifiler antennas. First antenna 311 is configured, in one embodiment, for receiving, over-the-air, analog form L2C Global Positioning System (GPS) signals in the 1217-1237 MHz frequency range.

Second antenna 312 is a narrow band antenna, and may take any suitable form including that of a patch antenna or a helical antenna. Again, in accordance with at least one embodiment second antenna 312 comprises a circularly polarized (CP) GNSS antenna typically realized in a flat "patch" configuration, but may also be realized in a quadrifiler helix configuration. There are a variety of antenna designs which can be implemented as second antenna 312 in accordance with various embodiments such as, but not limited to, patch antennas, quadrifiler helix antennas, and planar quadrifiler antennas. Second antenna 312 is configured for receiving, over-the-air, analog form L1 GNSS signals in the 1525-1614 MHz frequency range. In various embodiments, the L1 signals may be analog form L1 GPS signals, or analog form L1 GPS signals and one or more of analog form L1 Galileo signals and analog form pseudolite transmitted GNSS signals in the L1 band. Any received pseudolite signals will be in code division multiple access (CDMA) format like the GPS and Galileo L1 signals (and like the modernized BeiDou and Glonass L1 signals which will be centered 1575.42 MHz). In some embodiments, the first antenna 311 is configured to be able to receive either or both of these modernized BeiDou and Glonass signals when they are available. In some embodiments, first antenna 311 and second antenna 312 may share a common phase center with one another. In other embodiments, first antenna 311 and second antenna 312 may be separated by a known distance between their respective phase centers which is compensated for during position determination.

Digitizer 313A operates to amplify and down-convert the L2C and L1 signals received respectively from antennas 311 and 312, and then perform an analog to digital conversion by digitally sampling the down-converted L1 and L2C signals. The outputs of digitizer 313A are a digitized version of the down-converted L1 signals and a digitized version of the down-converted L2C signals that have been received.

Serializer 314 operates to form the digitized L1 signals and the digitized L2C signals into a serialized output signal which is then output from a stand-alone embodiment of RF hardware component 310A. For example, as illustrated, the serialized output signal can be output via input/output 315 which may be a USB port or some other type of port.

Bus 340 (e.g., a USB cable) coupled to I/O 315 communicatively couples the serialized output signal to an I/O 335 of communication device 330A. Bus 340 illustrates a serial bus, which may comply with a Universal Serial Bus (e.g., USB 2.0 standard) or other communication protocol. In some embodiments, bus 340 is a separate component that is not a part of either RF hardware component 310A or communication device 330A. It is appreciated that other wireline or wireless means for exchanging data over a short distance (less that approximately 7 meters), besides bus 340, may be employed in various embodiments. In some embodiments, bus 340 provides power from communication device 330A to components of an RF hardware component 310; while in other embodiments the RF hardware component 310 uses other internal or external sources of power.

Communication device 330A is disposed inside a housing 338 and, in some embodiments, includes: one or more processors 331, a software defined GNSS ("soft GNSS") receiver 333 as an application running on at least one processor 331, a tape measure operating system 345 running on at least one processor 331, an RTK operating system 346 operating on at least one processor 331, storage 332 (e.g., one or more of random access memory, read only memory, optical storage, and magnetic storage), a display 334, an I/O 335, and a wireless communication transceiver 336 (e.g., a cellular transceiver, Wi-Fi transceiver, digital two-way radio transceiver, an L-band satellite receiver, or other RF transceiver). In some embodiments communication device 330A further includes an internal GNSS receiver chipset 337. Storage 332 may hold computer-executable instructions that can be executed by processor 331 to implement the soft GNSS receiver application. In some embodiment where RF hardware component 310A and communication device 330A are integrated they may share a single housing and input/output 315 may be omitted from the communications path between RF hardware component 310A and communication device 330A (and may also be omitted from communication device 330A in some embodiments). In some embodiments, one or more of storage 332, display 334, wireless communication transceiver 336, and internal GNSS receiver chipset 337 (when included) are communicatively coupled with processor(s) 331, such as via bus 341. In accordance with various embodiments, tape measure operating system 345 is configured for coordinating communications between communication device 330 and other devices such as ETM 110 and/or ETM 120 of FIG. 1, reference station 1310 of FIG. 13 and/or website 1350 of FIG. 13. Tape measure operating system 345 also provides a user interface for a user to operate and configure electronic tape measure operations. For example, a user interface generated by tape measure operating system 345 is used to indicate positions at which a user desires measurements of the GNSS signals from a plurality of GNSS satellites to be recorded. Tape measure operating system 345 can initiate storing and timestamping of the received GNSS signals for later processing. Tape measure operating system 345 can also generate instructions to RTK operating system 346 causing it to begin processing of the received GNSS signals including, but not limited to, deriving code phase and carrier phase information and pseudorange information from each of the received GNSS signals, performing single-differencing operations, and performing double-differencing operations. In accordance with various embodiments, RTK operating system 346 is configured for resolving integer ambiguity of carrier and code signal phase, ionospheric effects, tropospheric effects, satellite and receive clock error, and satellite orbit errors. Additionally, RTK operating system 346 is configured to derive a distance (e.g., distance 220 of FIG. 1B) between a given first location and a second location. It is noted that the deriving of the distance does not require generating or displaying a position fix in accordance with various embodiments.

Processor 331 is external to any GNSS chipset of communication device 330A. In some embodiments, processor 331 is a central or host processor of communication device 330A. In other embodiments, processor 331 is a graphics processing unit (GPU), a digital signal processor (DSP), or other microprocessor of a communications device 330A.

Communication device 330A is a device that is capable of two-way RF communication and may be a device such as, but not limited to, a cellular telephone (also referred to herein as a "cellphone"), a tablet computer, a two-way non-cellular radio, a dedicated short range communication (DSRC) radio, or a software defined radio. In one embodiment, the DSRC radio complies with Institute of Electrical and Electronics Engineers (IEEE) 802.11p standards. In one embodiment, the DSRC radio may be implemented as a software defined radio compliant with IEEE 802.11p standard and running on one or more processors of communication device 330A.

Housing 338 may take many sizes shapes and forms, many of which are hand-holdable by a human or wearable by a human. Some forms include the form factor of a cellular telephone, the form factor of a tablet computer, the form factor of a phablet computer (an in-between size between that of a smart phone and a tablet computer), the form factor of headwear (e.g., disposed in or as part of a helmet, cap, hardhat, or other head wear), and the form of eyewear (e.g., Google Glass or similar head-up eyewear communication devices).

Software defined GNSS receiver 333 utilizes L1 and/or L2C signals received via I/O 335 to perform position determination. For example, software defined GNSS receiver 333 decodes first information (e.g., L2C signals) from the first digitized GNSS signal that is included in the serialized output signal from RF hardware component 310A. Software defined GNSS receiver 333 also decodes second information (e.g., L1 I and L1 Q signals) from the second digitized GNSS signal that has been serialized into the serialized output signal from RF hardware component 310A. A combination of the first information and the second information (e.g., L2C GPS signals and L1 GPS signals) is used to perform carrier phase interferometry to correct the carrier phase of the L1 signals for perturbations caused by ionospheric interference. The corrected L1 GPS signals are then used by software defined GNSS receiver 333 to perform position determination. They can be used alone or in combination with other L1 signals that have been decoded from the second digitized GNSS signal that has been serialized into the serialized output signal from RF hardware component 310A. These other L1 signals include one or more of L1 Galileo signals, L1 BeiDou signals, L1 Glonass signals, and L1 pseudolite signals. In some embodiments, the software defined GNSS receiver 333 also receives over its own communication means (e.g., wireless communication transceiver 336) one or more of WAAS, DGPS, PPP, RTX, RTK, SBAS, and VRS corrections that can be applied while performing the position determination.

Figure 3B:
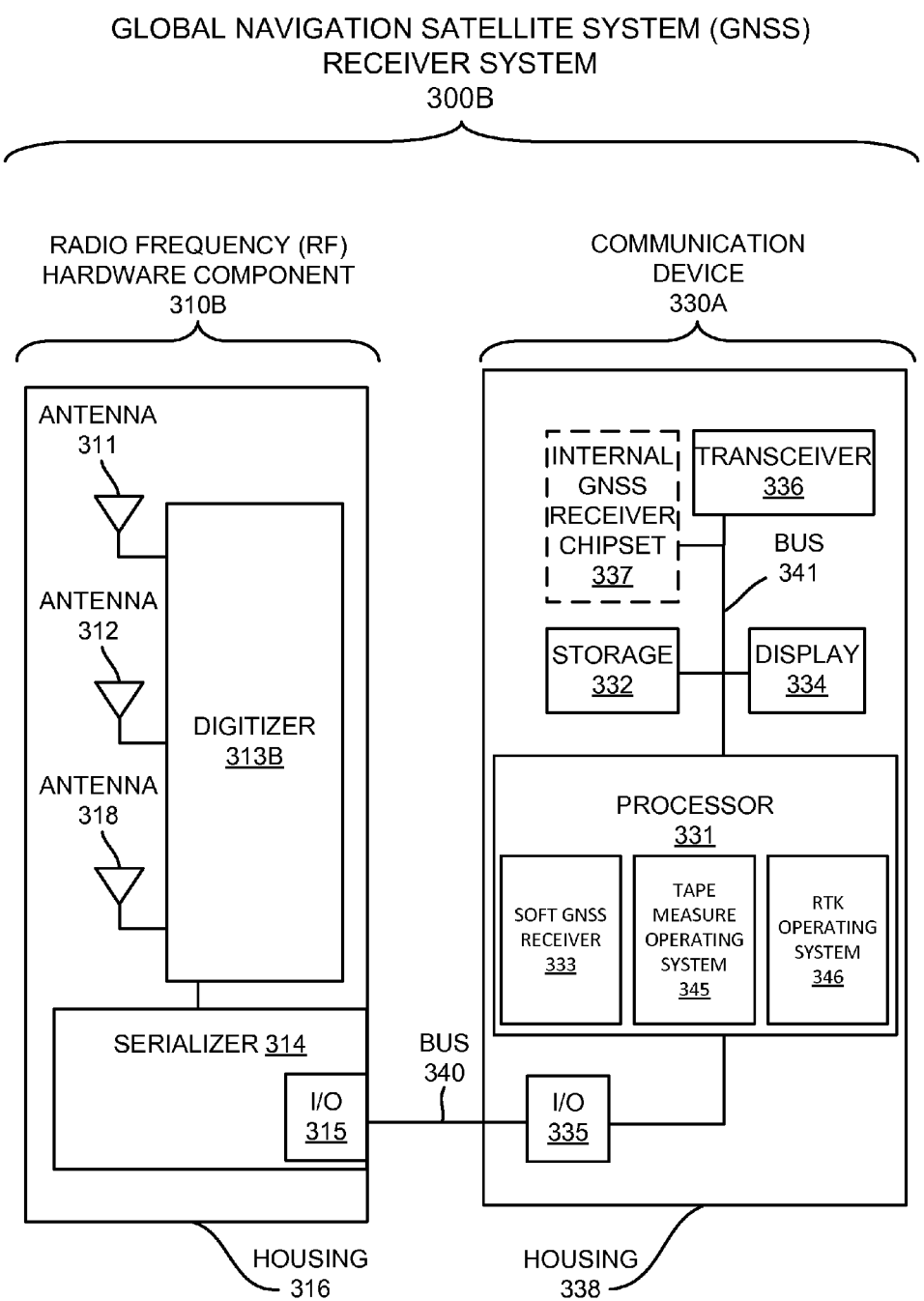
FIG. 3B is a block diagram of a GNSS receiver system, according to various embodiments.

FIG. 3B is a block diagram of an ETM 120B, according to various embodiments. In accordance with various embodiments, ETM 120B comprises a mobile device(s) and is implemented as ETM 110 and ETM 120 described above. ETM 120B operates in the same fashion as ETM 120A, except for the inclusion of a third antenna, antenna 318, as a portion of RF hardware component 310B (as compared to RF hardware component 310A which includes only two antennas). Third antenna 318 is a narrow band antenna, and may be implemented in any suitable form including as a patch antenna or as a helical antenna. For example, in accordance with at least one embodiment third antenna 318 comprises a circularly polarized (CP) GNSS antenna typically realized in a flat "patch" configuration, but may also be realized in a quadrifiler helix configuration. There are a variety of antenna designs which can be implemented as third antenna 318 in accordance with various embodiments such as, but not limited to, patch antennas, quadrifiler helix antennas, and planar quadrifiler antennas. In one embodiment, third antenna 318 is configured for receiving, over-the-air, L1 GNSS signals which are centered in the 1217-1237 MHz frequency range. In various embodiments, third antenna 318 receives BeiDou L1 signals that are centered at 1561.098 MHz, Glonass L1 signals that are in Frequency Division Multiple Access (FDMA) format and centered at 1602 MHz, and/or L1 signals transmitted by terrestrial pseudolite(s) in the FDMA format. In one embodiment, third antenna 318 is configured for receiving, over-the-air, L5 GNSS signals which are centered in the 1164-1189 MHz frequency range. In various embodiments, the L5 signals may be GPS L5 signals, Galileo L5 signals, BeiDou L5 signals, Glonass L5 signals, or L5 signals transmitted by terrestrial pseudolite(s) in the Frequency Division Multiple Access format. It is appreciated that, in some embodiments, third antenna 318 may be configured to receive, over-the-air, satellite based augmentation system (SBAS) signals that are transmitted from satellites on one or more bands. In one embodiment, third antenna 318 is configured for receiving, over-the-air, Mobile Satellite Services band signals (e.g., from OmniSTAR satellites), which are centered in the 1525-1559 MHz range and provide GNSS corrections. In one embodiment, third antenna 318 is configured for receiving, over-the-air, S-band signals (e.g., IRNSS (Indian Regional Navigation Satellite System) signals or other satellite system signals), which are centered in the 2000-4000 MHz range and provide GNSS corrections. In one embodiment, third antenna 318 shares a common phase center with both of antennas 311 and 312. In one embodiment, one or more of antennas 311, 312, and 318 has a distinct phase center that is not co-located with the phase center of either of the other two antennas. In ETM 120B, as with ETM 120A, RF hardware component 310B and communication device 330A may be stand-alone physical entities that are removably communicatively coupled by wireline or else wirelessly communicatively coupled, or may they may be integrated with one another. In an integrated embodiment, serializer 314, I/O 315, bus 340, and I/O 335 may be omitted from the communication path between RF hardware component 310B and communication device 330A (and may be omitted entirely in some embodiments).

Digitizer 313B operates similarly to digitizer 313A to amplify and down-convert the L2C and L1 signals received respectively from antennas 311 and 312, and then perform an analog to digital conversion by digitally sampling the down-converted L1 and L2C signals. Digitizer 313B additionally operates to amplify and down-convert the GNSS signals received from antenna 318, and then perform an analog to digital conversion by digitally sampling the down-converted GNSS signals. The outputs of digitizer 313B are digitized versions of the down-converted L1 signals, a digitized version of the down-converted L2C signals, and a digitized version of the down-converted signals from antenna 318.

Serializer 314, when included, operates to form the digitized versions of the signals received via antennas 311, 312, and 318 into a serialized output signal which is then output from RF hardware component 310B. For example, as illustrated, the serialized output signal can be output via input/output 315 which may be a USB port or some other type of port. A bus 340 (e.g., a USB cable) coupled to I/O 315 communicatively couples the serialized output signal to an I/O 335 of communication device 330A.

Software defined GNSS receiver 333 utilizes L1 and/or L2C signals received via I/O 335 to perform position determination in the manner previously described above except that software defined GNSS receiver 333 may additionally utilize L1 or L5 signals received via antenna 318 to assist in performing position determination. As previously described, in some embodiments, the software defined GNSS receiver 333 also receives, over its own communication means, (e.g., wireless communication transceiver 336) one or more of WAAS, DGPS, PPP, RTX, RTK, SBAS, and VRS corrections that can be applied while performing the position determination.

Figure 3C:
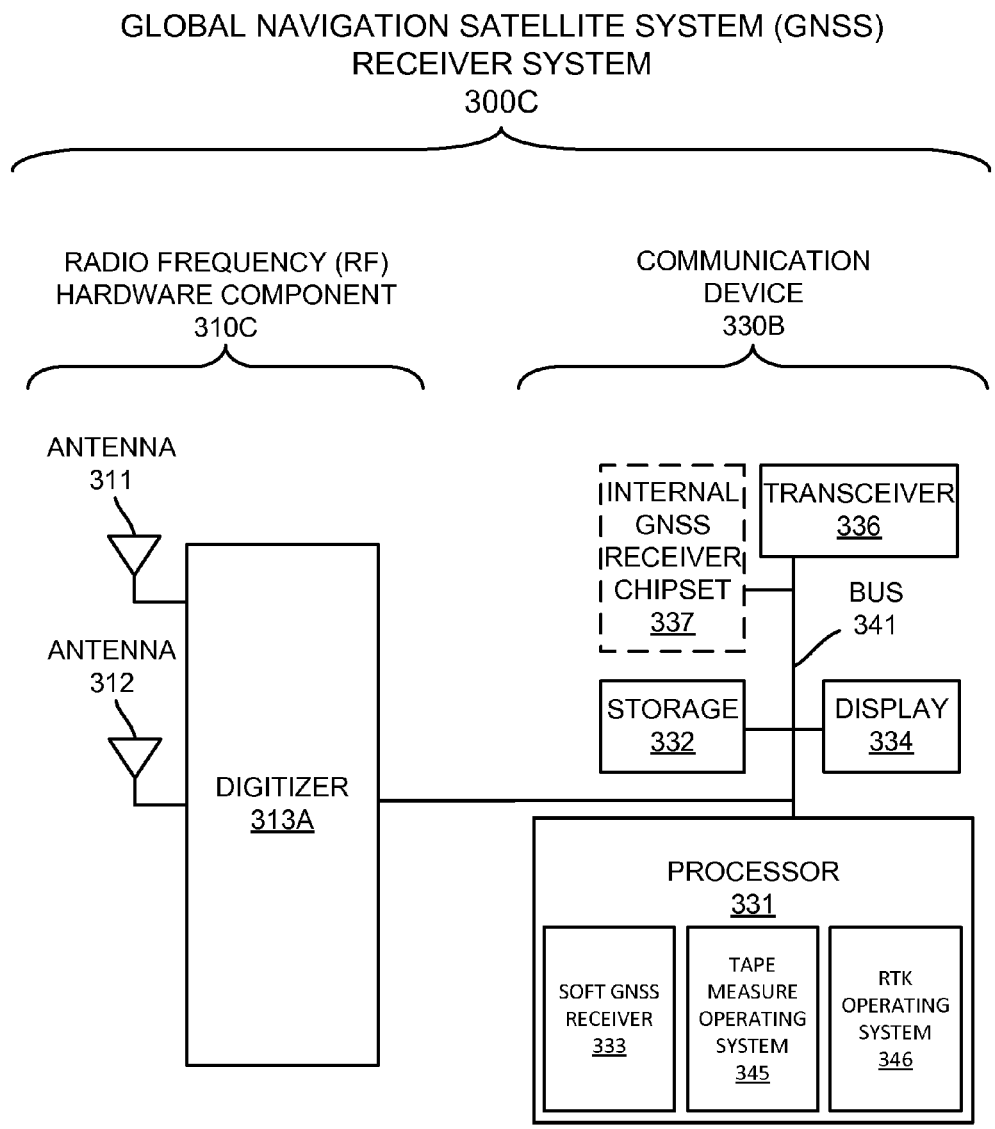
FIG. 3C is a block diagram of a GNSS receiver system, according to various embodiments.

FIG. 3C is a block diagram of an ETM 120C, according to various embodiments. In accordance with various embodiments, ETM 120C comprises a mobile device(s) and is implemented as ETM 110 and ETM 120 described above. ETM 120C is similar to ETM 120A except that through a higher level of integration, digitized GNSS signals from antennas 311 and 312 are provided via bus 341 to processor 331 and soft GNSS receiver 333. RF hardware component 310C is similar to RF hardware component 310A, except that serializer 314, I/O 315, and housing 316 are omitted. Communication device 330B is similar to communication device 330A except that I/O 335 and housing 338 have been omitted. In some embodiments communication device 330 may be a vehicle subsystem such as a navigation subsystem, a safety subsystem, an infotainment subsystem or the like. In some embodiments, the communication device 330B includes a processor 331 which is operating a software defined DSRC radio (in compliance with IEEE 802.11p standards) and the same processor is also used to implement software defined GNSS receiver 333. Processor 331 is external to any GNSS chipset of communication device 330B. In some embodiments, processor 331 is a central or host processor of communication device 330B. In other embodiments, processor 331 is a graphics processing unit (GPU), a digital signal processor, or other microprocessor of a communications device 330B. In some embodiments, bus 341 provides power from communication device 330 to components of an RF hardware component 310; while in other embodiments the RF hardware component 310 uses other internal or external sources of power.

Figure 3D:
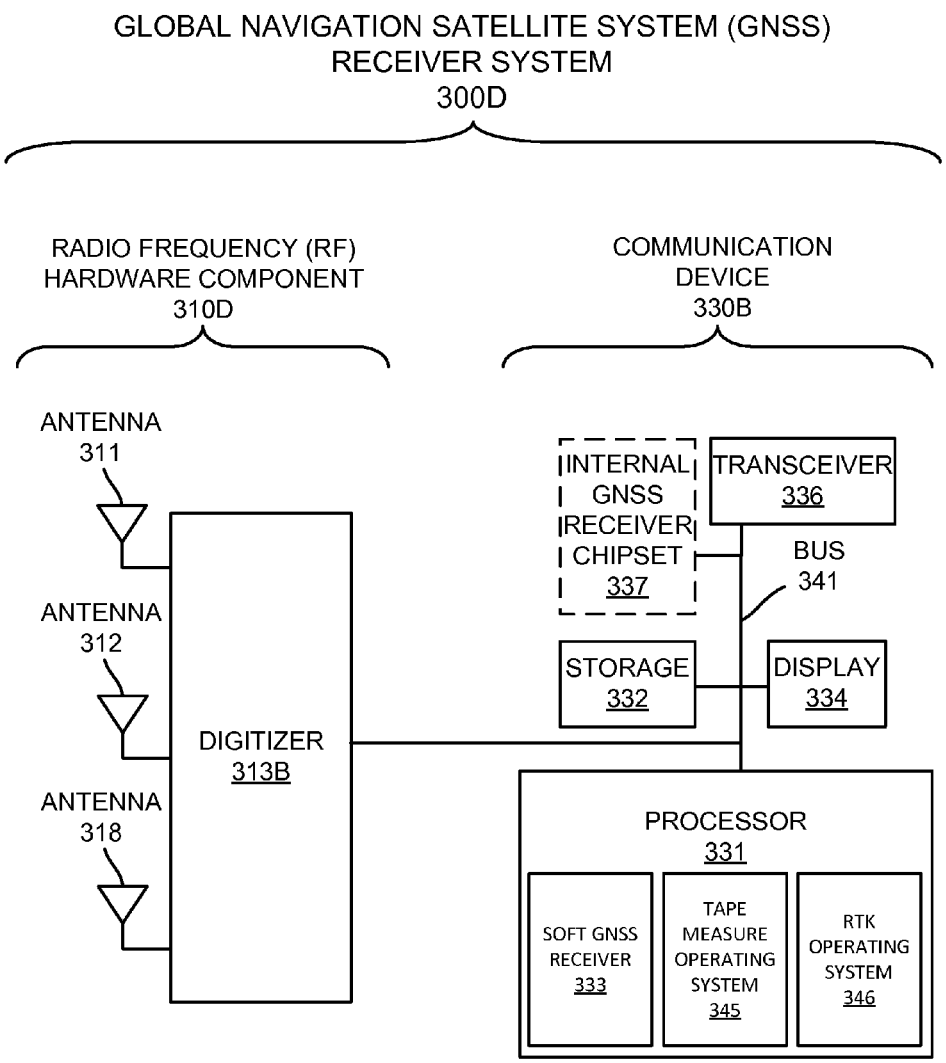
FIG. 3D is a block diagram of a GNSS receiver system, according to various embodiments.

FIG. 3D is a block diagram of an ETM 120D, according to various embodiments. In accordance with various embodiments, ETM 120D comprises a mobile device(s) and is implemented as ETM 110 and ETM 120 described above. ETM 120D is similar to ETM 120B except that through a higher level of integration, digitized GNSS signals from antennas 311 and 312 are provided via bus 341 to processor 331 and soft GNSS receiver 333. RF hardware component 310D is similar to RF hardware component 310B, except that serializer 314, I/O 315, and housing 316 are omitted. Communication device 330B is similar to communication device 330A except that I/O 335 and housing 338 have been omitted. In some embodiments communication device 330 may be a vehicle subsystem such as a navigation subsystem, a safety subsystem, an infotainment subsystem or the like. In some embodiments, the communication device 330B includes a processor 331 which is operating a software defined DSRC radio (in compliance with IEEE 802.11p standards) and the same processor is also used to implement software defined GNSS receiver 333. Processor 331 is external to any GNSS chipset of communication device 330B. In some embodiments, processor 331 is a central or host processor of communication device 330B. In other embodiments, processor 331 is a graphics processing unit (GPU), a digital signal processor, or other microprocessor of a communications device 330B.

Figure 3E:
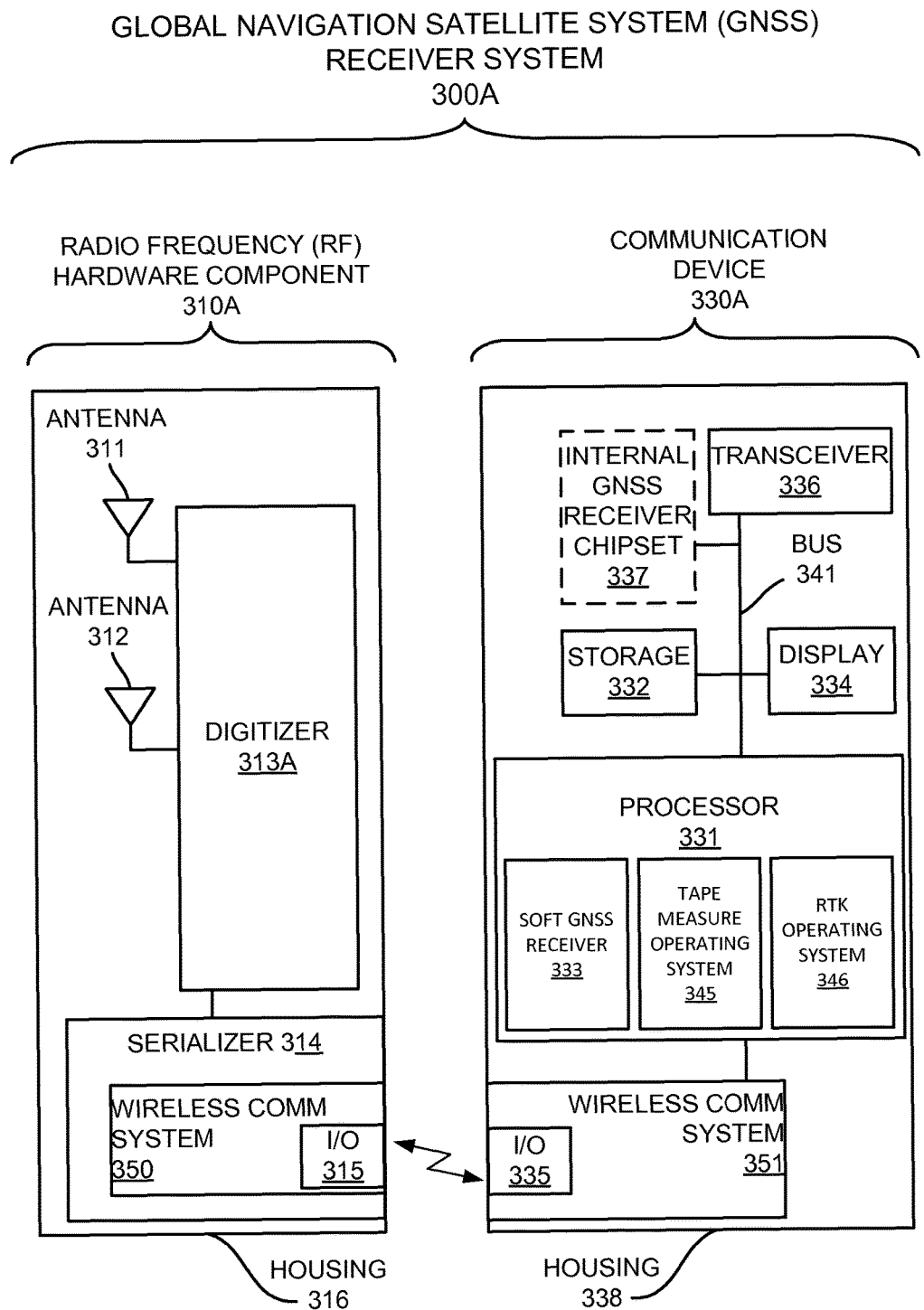
FIG. 3E is a block diagram of a GNSS receiver system, according to various embodiments.

FIG. 3E depicts an embodiment of GNSS receiver system 300E. GNSS receiver system 300E is similar to GNSS receiver system 300A, as described in detail herein. For instance, GNSS receiver system 300E includes RF hardware component 310A which bi-directionally communicates with communication device 330A.

However, RF hardware component 310A includes wireless communication system 350 which wirelessly communicates with wireless communication system 351 of communication device 330A.

In particular, wireless communication system 350 is utilized as a wireless transmitter for wirelessly transmitting digitized GNSS signals, as a serialized output signal, from RF hardware component 310A to communication device 330A.

Moreover, wireless communication system 350 is utilized as a wireless receiver for wirelessly receiving transmitted digitized GNSS signals, as a serialized output signal, from RF hardware component 310A to communication device 330A.

As depicted, serializer 314 includes wireless communication system 350. However, wireless communication system 350 may be separate from serializer 314.

Wireless communication system 350 and wireless communication system 351, in one embodiment, are wireless transceivers (e.g., wirelessly transmit data and wirelessly receive data) that operate under the same wireless communication protocol. For example, serialized output data is wirelessly transmitted via I/O 315 of wireless communication system 350, in accordance to a wireless protocol, and is received at I/O 335 of communication device 330A. It is noted that the embodiments shown in FIGS. 3B, 3C, and 3D can similarly be configured to communicate using wireless communication devices 350 and 351 rather than bus 340 in accordance with various embodiments.

Figure 4A:
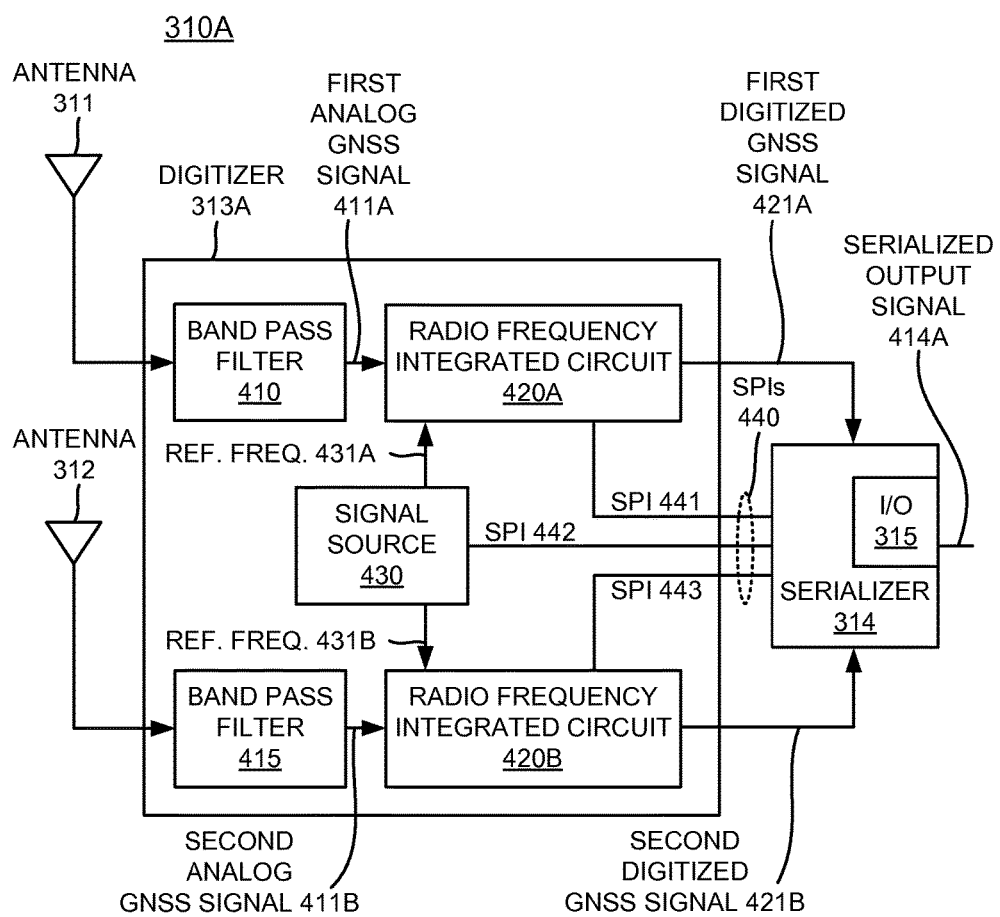
FIG. 4A is a block diagram of a radio frequency hardware component, according to various embodiments.

FIG. 4A is a block diagram of a radio frequency hardware component 310A, according to various embodiments. RF hardware component 310A is shown here with greater detail of digitizer 313A to illustrate signal flow through digitizer 313A according to one embodiment. In one embodiment, digitizer 313A includes a first band pass filter 410, a second band pass filter 415, a first radio frequency integrated circuit (RFIC) 420A, a second RFIC 420B, and an internal signal source 430.

In operation, in one embodiment, antenna 311 receives L2C GNSS signals over-the-air. Band pass filter 410 operates to pass the band of the L2C signals. In some embodiments, band pass filter 410 is configurable to a particular frequency band and width of frequency passed. In many embodiments, band pass filter 410 is configured to have a frequency width that is similar to or the same as the same sampling rate used for analog-to-digital conversion by RFIC 420A. For example, since the chipping rate of an L2C signal is 1.023 MHz, it may be sampled for analog-to-digital conversion at approximately 2 MHz or twice the chipping rate. In one embodiment, band pass filter 410 may thus be configured to pass a 2 MHz band, with 1 MHz being on each side of the L2C center frequency of 1,227.60 MHz. Band pass filter 410 outputs a first analog GNSS signal 411A (e.g., a filtered L2C signal that has been received over-the-air) to RFIC 420A. RFIC 420A utilizes a reference frequency 431A supplied by signal source 430 (e.g., a fixed frequency or configurable temperature controlled crystal oscillator) to down-convert first analog GNSS signal 411A. The down-converted version of first analog GNSS signal 411A is then sampled, digitized, and output to serializer 314 as a first digitized GNSS signal 421A.

In operation, in one embodiment, antenna 312 receives L1 GNSS signals over-the-air. Band pass filter 415 operates to pass the band of the L1 signals. In some embodiments, band pass filter 415 is configurable to a particular frequency band and width of frequency passed. In many embodiments, band pass filter 415 is configured to have a frequency width that is similar to or the same as the same sampling rate used for analog-to-digital conversion by RFIC 420B. For example, since the chipping rate of an L1 GPS signal is 1.023 MHz, it may be sampled for analog-to-digital conversion at approximately 2 MHz or twice the chipping rate. In one embodiment, band pass filter 415 may thus be configured to pass a 2 MHz band, with 1 MHz being on each side of the L1 GPS center frequency of 1,575.42 MHz. Band pass filter 415 outputs a second analog GNSS signal 411B (e.g., a filtered L1 GPS signal that has been received over-the-air) to RFIC 420B. RFIC 420B utilizes a reference frequency 431B supplied by signal source 430 to down-convert second analog GNSS signal 411B. The down-converted version of second analog GNSS signal 411B is then sampled, digitized, and output to serializer 314 as a second digitized GNSS signal 421B.

Serializer 314 operates to serialize the second digitized GNSS signal 421B (i.e., digitized L1 GPS signals) and the first digitized GNSS signal 421A (i.e., digitized L2C signals) into a serialized output signal 414 which is then output from RF hardware component 310A.

I/O 315 and serializer 314 also operate as a serial periphery interface (SPI), in some embodiments, to receive configuration commands from processor 331 of communication device 330A. SPIs 440 includes SPI 441 which provides configuration to RFIC 420A, SPI 442 which provides configuration instruction to signal source 430, and SPI 443 which provides configuration to RFIC 420B. In integrated embodiments where I/O 315 and serializer 314 are not utilized SPIs 440 may be replaced by other communication paths with processor 331.

Figure 4B:
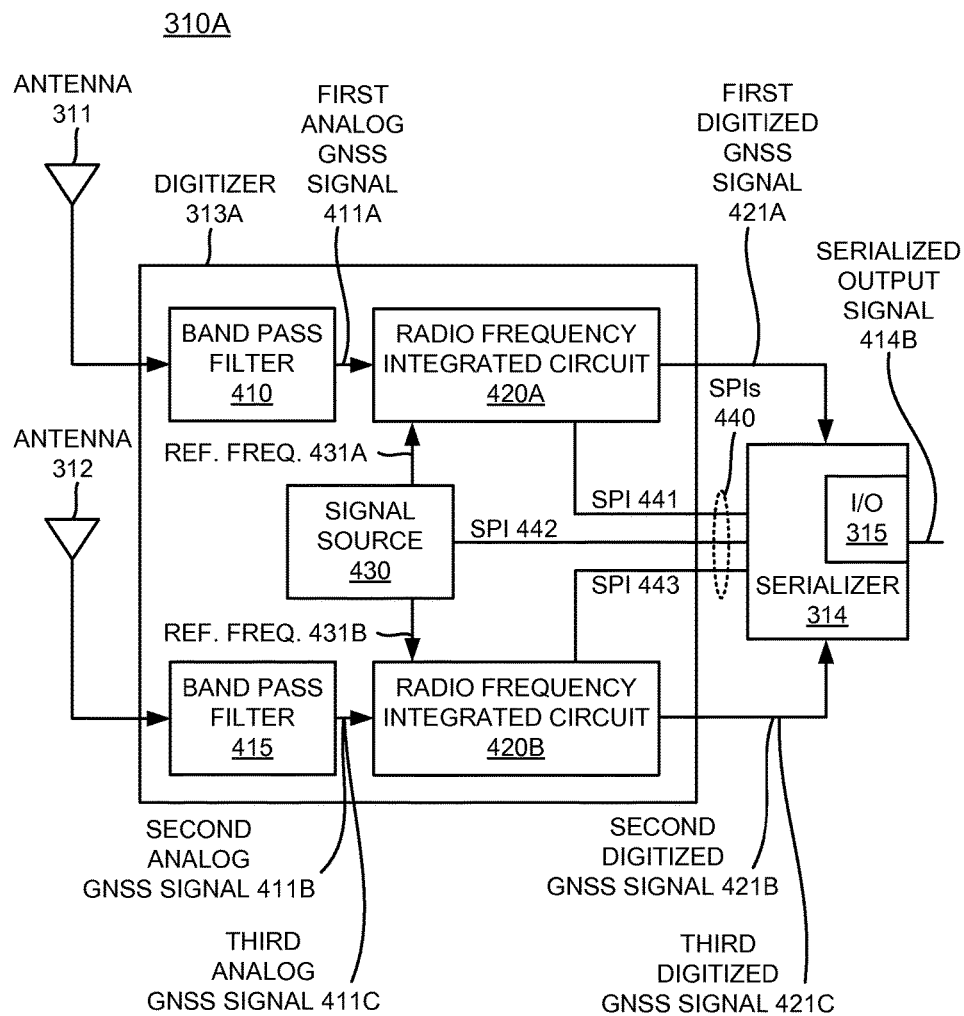
FIG. 4B is a block diagram of a radio frequency hardware component, according to various embodiments.

FIG. 4B is a block diagram of a radio frequency hardware component 310A, according to various embodiments. In operation, RF hardware component 310A of FIGS. 4A and 4B are identical similar except that antenna 312 receives additional L1 GNSS signals over-the-air, which are then filtered, digitized, and serialized. For example, band pass filter 415 operates to pass the band of the L1 signals. In some embodiments, band pass filter 415 is configurable to a particular frequency band and width of frequency passed. In many embodiments, band pass filter 415 is configured to have a frequency width that is similar to or the same as the same sampling rate used for analog-to-digital conversion by RFIC 420B. In radio frequency hardware component 310A, L1 GPS signals are sampled along with a second L1 GNSS signal (e.g., at least one of a Galileo L1 signal, a BeiDou L1 signal, a Glonass L1 signal, or a pseudolite L1 signal). As the chipping rate for the second GNSS signal is also 1.023 MHz, the sampling rate can be doubled to approximately 4 MHz when L1 signals from two disparate GNSS systems are sampled. In one embodiment, band pass filter 415 may thus be configured to pass a 4 MHz band (which may be adjusted upward to include Glonass signals in some embodiments). Band pass filter 415 outputs a second analog GNSS signal 411B (e.g., a filtered GPS L1 signal that has been received over-the-air) and a third analog GNSS signal 411C (e.g., a filtered Galileo L1 signal, and both are provided to RFIC 420B. RFIC 420B utilizes a reference frequency 431B supplied by signal source 430 to down-convert second analog GNSS signal 411B and third analog GNSS signal 411C. The down-converted versions of second analog GNSS signal 411B and third analog GNSS signal 411C are then sampled, digitized, and output as a second digitized GNSS signal 421B and third digitized GNSS signal 421C, respectively, to serializer 314.

Figure 4C:
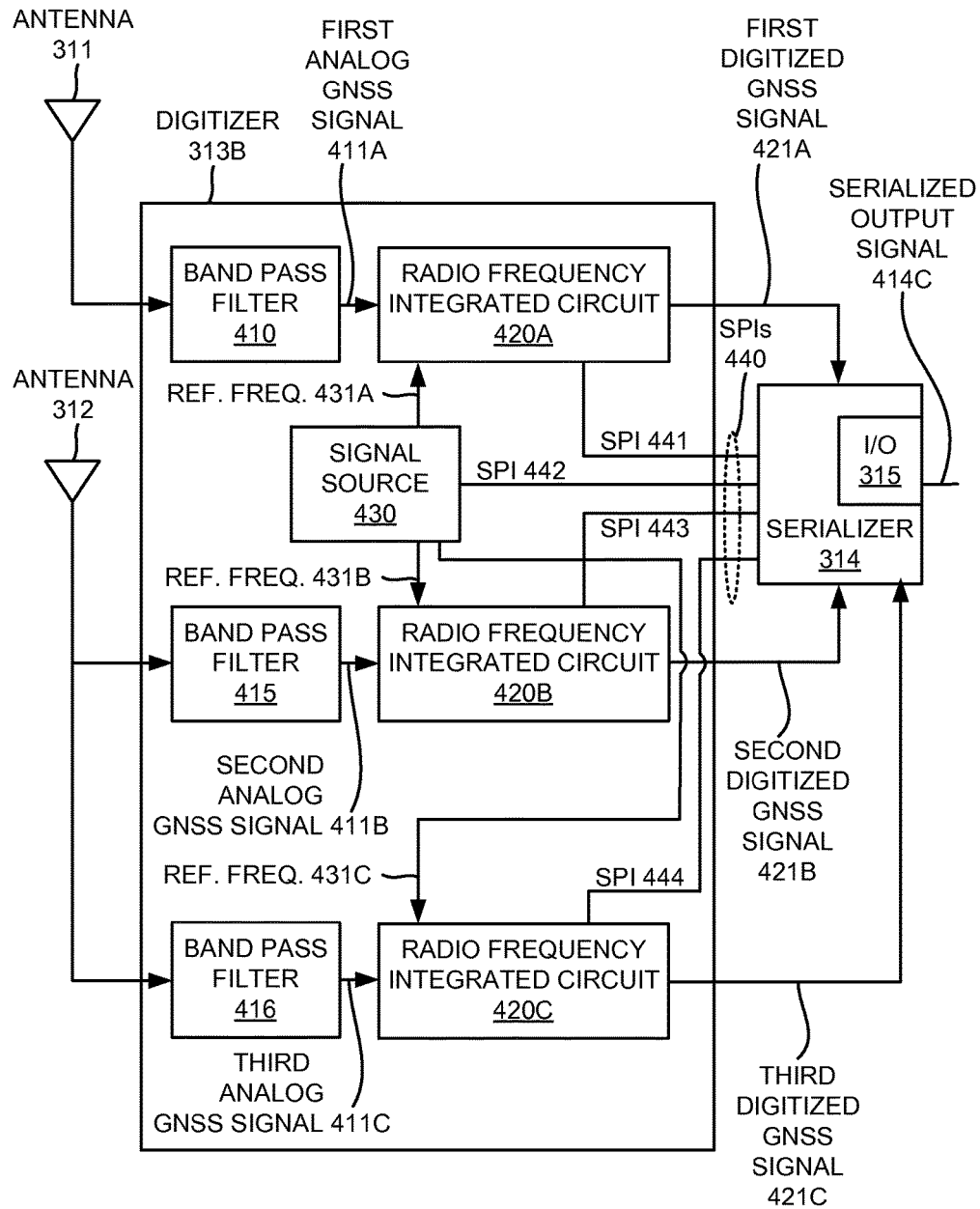
FIG. 4C is a block diagram of a radio frequency hardware component, according to various embodiments.

FIG. 4C is a block diagram of a radio frequency hardware component 310A, according to various embodiments. In operation, RF hardware component 310A of FIGS. 4A and 4C are identical similar except that antenna 312 receives additional L1 GNSS signals over-the-air, which are then filtered, digitized along a separate path. For example, band pass filter 416 operates to pass the band of the L1 signals similar to band pass filter 415 (and may be omitted in some embodiments. In some embodiments, band pass filter 416 is configurable to a particular frequency band and width of frequency passed. In many embodiments, band pass filter 416 is configured to have a frequency width that is similar to or the same as the same sampling rate used for analog-to-digital conversion by RFIC 420C. In radio frequency hardware component 310A of FIG. 4C, L1 GPS signals are sampled in RFIC 420B along with additional L1 GNSS signals being sampled by RFIC 420C (e.g., at least one of a conventional BeiDou L1 signal, a conventional Glonass L1 signal, or a pseudolite FDMA L1 signal). Band pass filter 416 outputs a third analog GNSS signal 411C (e.g., a filtered conventional Glonass L1 signal) which is then provided to RFIC 420C. RFIC 420C utilizes a reference frequency 431C supplied by signal source 430 to down-convert third analog GNSS signal 411C. The down-converted version third analog GNSS signal 411C is then sampled, digitized, and output as third digitized GNSS signal 421C to serializer 314.

Figure 4D:
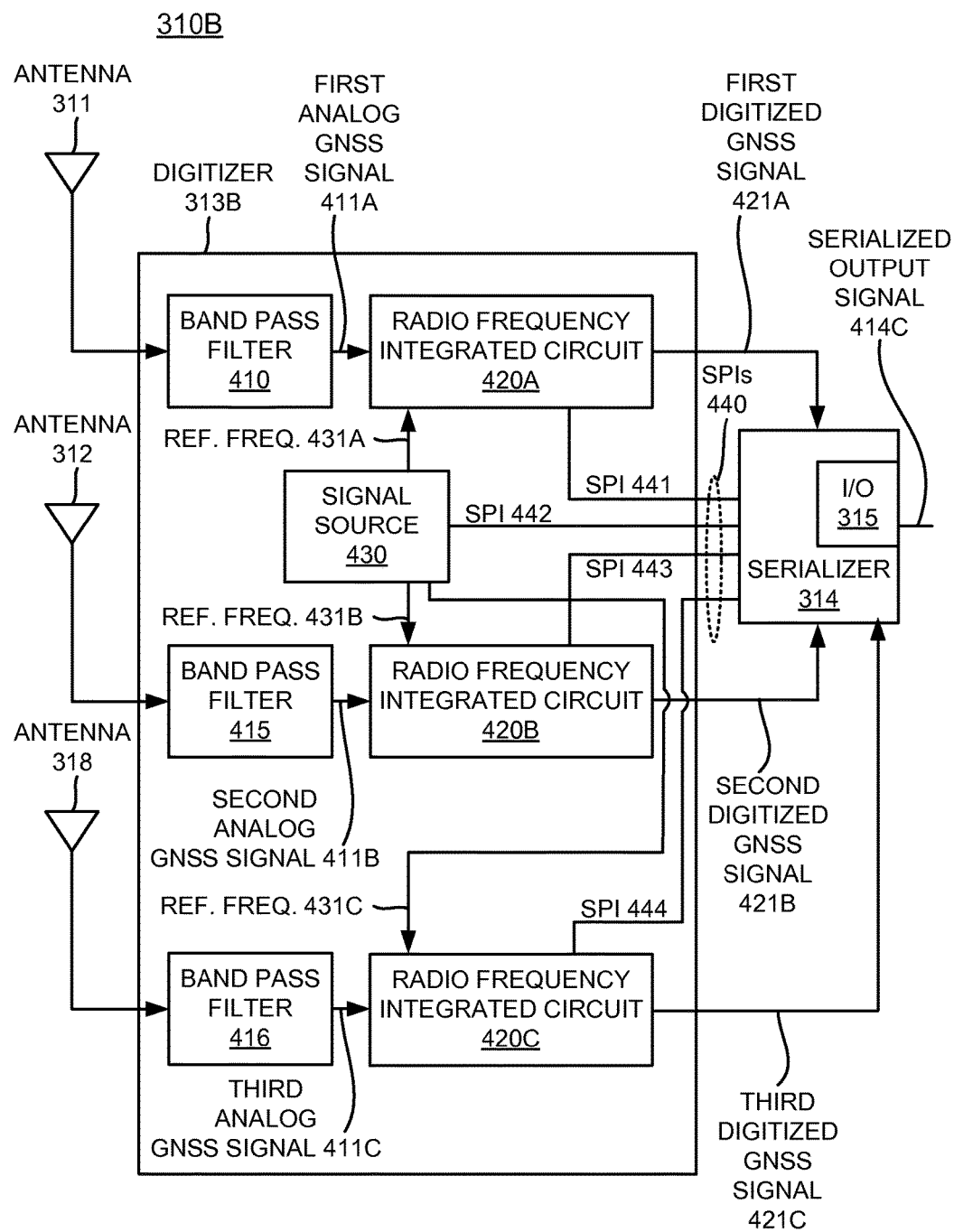
FIG. 4D is a block diagram of a radio frequency hardware component, according to various embodiments.

FIG. 4D is a block diagram of a radio frequency hardware component, according to various embodiments. In operation, RF hardware component 310A and 310B are similar except that additional components: antenna 318, band pass filter 416, and RFIC 420C are included. In one embodiment, antenna 318 receives an L5 GNSS signal over-the-air, which is then filtered, digitized, and serialized. For example, band pass filter 416 operates to pass the band of the L5 signal. In some embodiments, band pass filter 416 is configurable to a particular frequency band and width of frequency passed. In many embodiments, band pass filter 416 is configured to have a frequency width that is similar to or the same as the same sampling rate used for analog-to-digital conversion by RFIC 420C. As the chipping rate for an L5 GNSS signal is 10.23 MHz, the sampling rate can be approximately 10 MHz. In one embodiment, band pass filter 415 may thus be configured to pass a 10 MHz band centered on the L5 GNSS frequency of 1,176.45 MHz Band pass filter 415 outputs a third analog GNSS signal 411C (e.g., a filtered GPS L5 signal that has been received over-the-air). RFIC 420C, may be configured utilizing SPI 444, and utilizes a reference frequency 431C supplied by signal source 430 to down convert third analog GNSS signal 411C. The down-converted version of third analog GNSS signal 411C is then sampled, digitized, and output as a third digitized GNSS signal 421C to serializer 314. In one embodiment, antenna 318 receives an analog Satellite Based Augmentation System (SBAS) signal (e.g., from an OmniSTAR satellite, or other satellite that provides GNSS corrections) over-the-air, which is then filtered, digitized, and serialized in a similar manner as described above with respect to the L5 signal. The digitized SBS signal is then provided to processor 331.

Figure 4E:
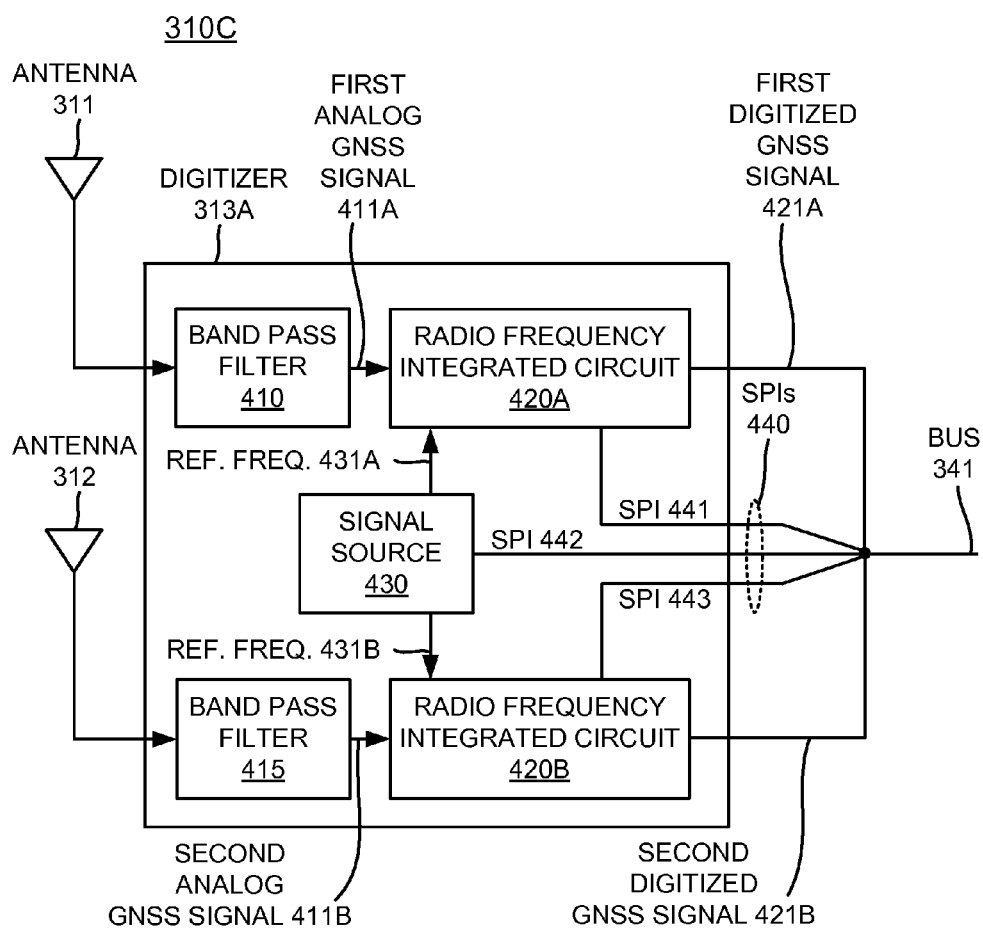
FIG. 4E is a block diagram of a radio frequency hardware component, according to various embodiments.

FIG. 4E is a block diagram of a radio frequency hardware component 310C, according to various embodiments. RF hardware component 310C is similar in operation to RF hardware component 310A of FIG. 4A except that the first digitized GNSS signal 421A and second digitized GNSS signal 421B are coupled over bus 341 or other similar line(s) that couple directly with processor 331 (as illustrated in FIG. 3C) while omitting serializer 314 from the communications path. Similarly, in some embodiments control signals such as SPIs 440 may be coupled received via bus 341 or other communicative coupling with processor 331 that omits serializer 314 from the communications path.

Figure 4F:
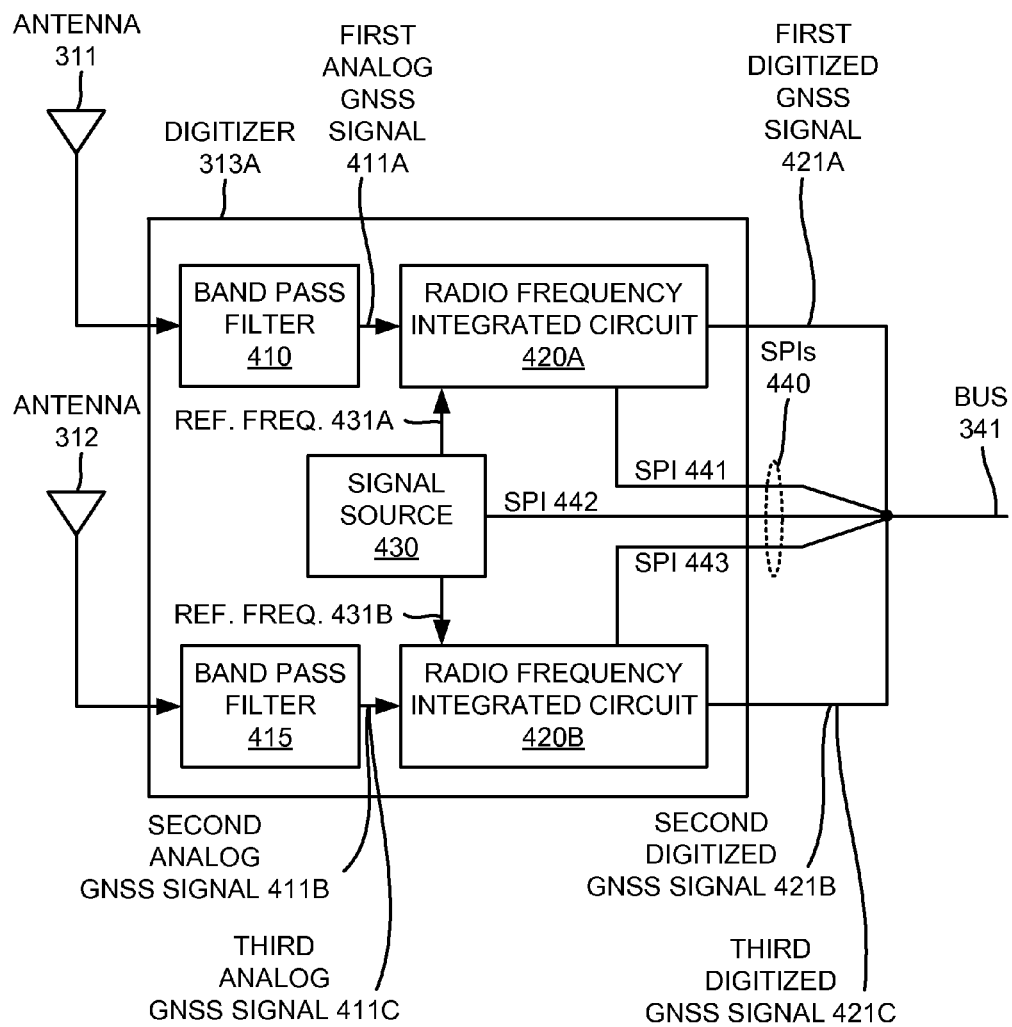
FIG. 4F is a block diagram of a radio frequency hardware component, according to various embodiments.

FIG. 4F is a block diagram of a radio frequency hardware component 310C, according to various embodiments. RF hardware component 310C is similar in operation to RF hardware component 310A of FIG. 4B except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 may be coupled received via bus 341 or other communicative coupling with processor 331 that omits serializer 314 from the communications path.

Figure 4G:
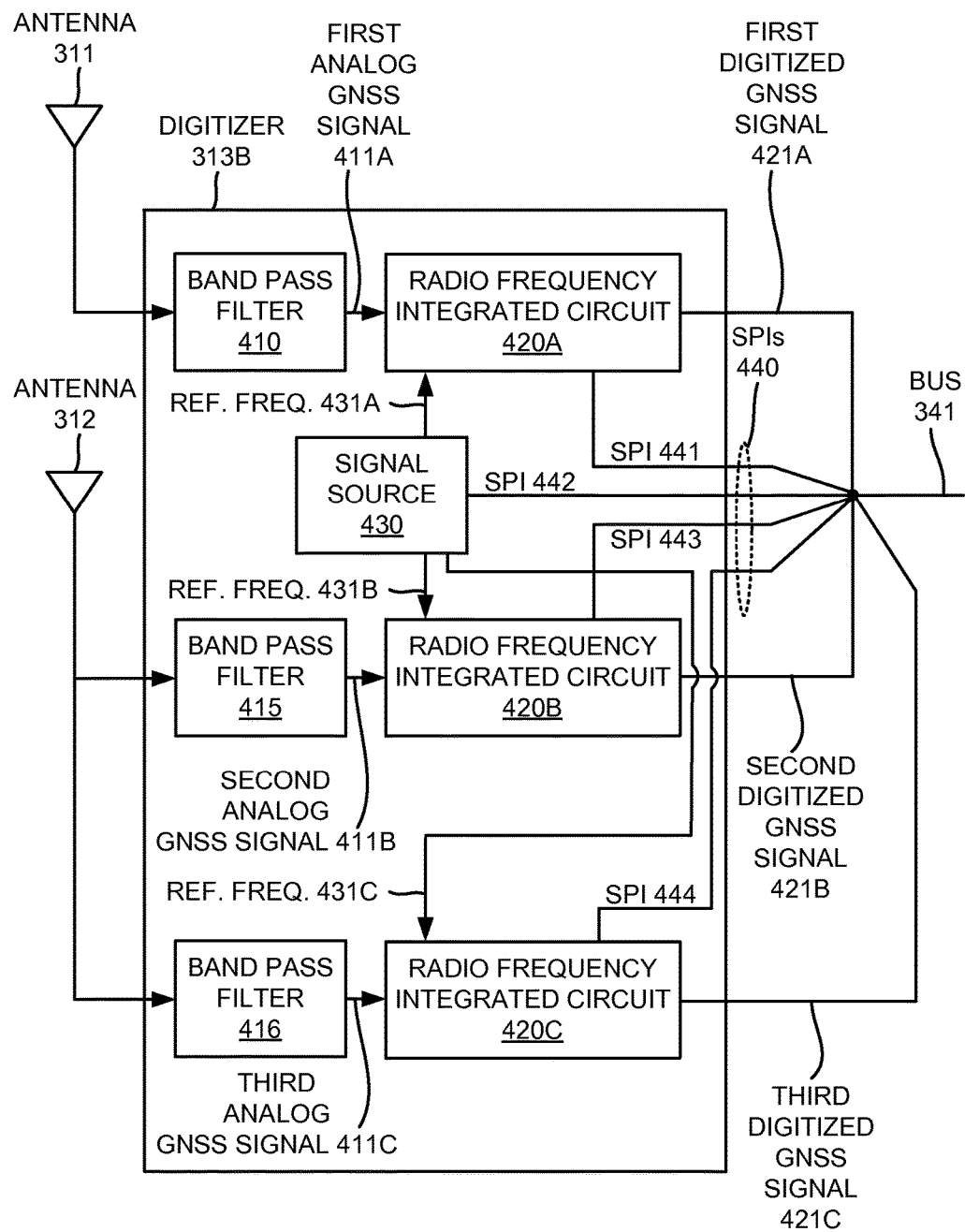
FIG. 4G is a block diagram of a radio frequency hardware component, according to various embodiments.

FIG. 4G is a block diagram of a radio frequency hardware component 310D, according to various embodiments. RF hardware component 310C is similar in operation to RF hardware component 310B of FIG. 4C except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 or their equivalents may be coupled via bus 341 or other communicative coupling with processor 331 that omits serializer 314 from the communications path.

Figure 4H:
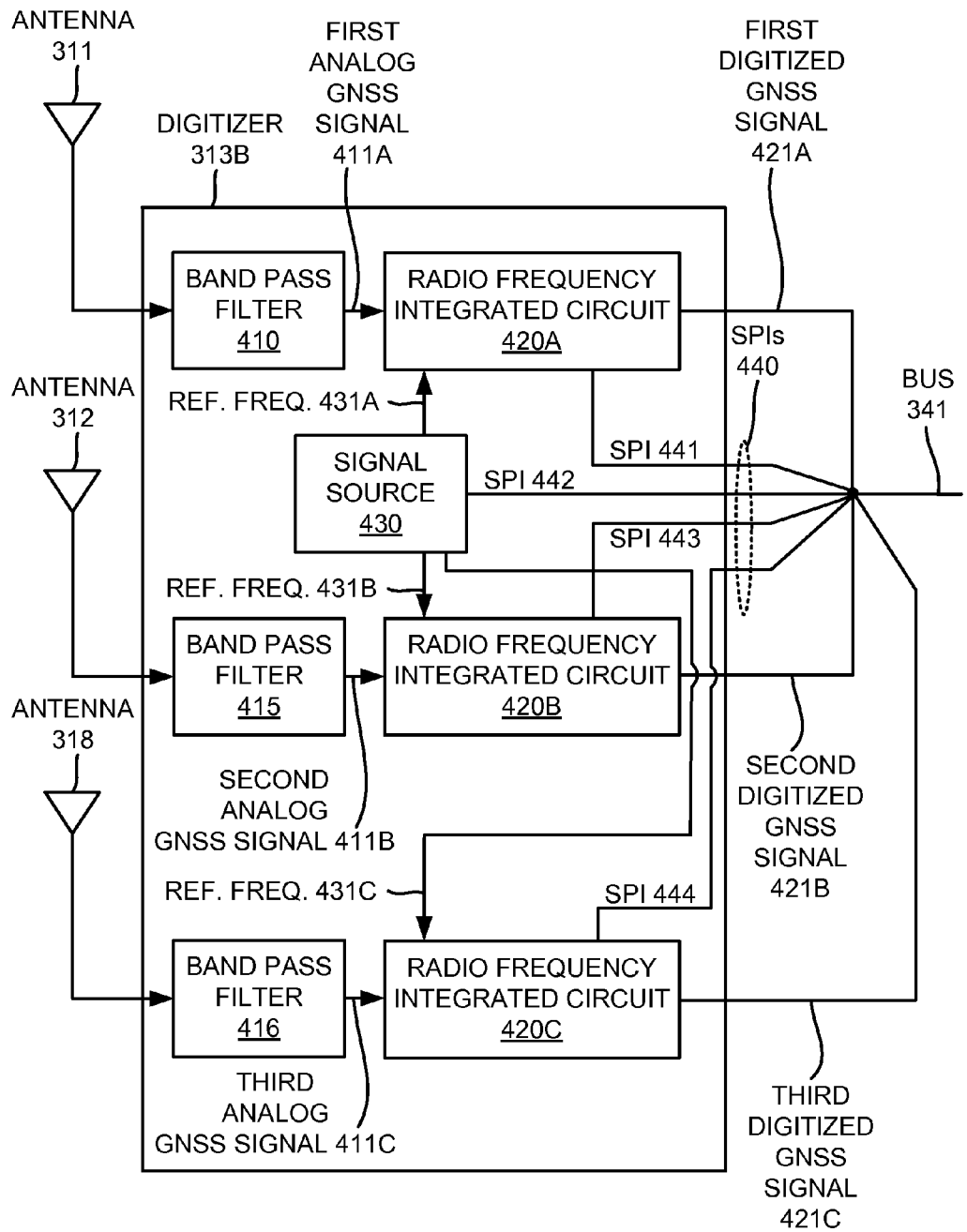
FIG. 4H is a block diagram of a radio frequency hardware component, according to various embodiments.

FIG. 4H is a block diagram of a radio frequency hardware component 310D, according to various embodiments. RF hardware component 310D is similar in operation to RF hardware component 310B of FIG. 4D except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 or their equivalents may be coupled via bus 341 or other communicative coupling with processor 331 that omits serializer 314 from the communications path. In an embodiment wherein an analog Satellite Based Augmentation System (SBAS) signal is received, filtered, and digitized, it is coupled over bus 341 or other similar means that couple directly with processor 331 while omitting serializer 314 from the communications path.

Figure 4I:
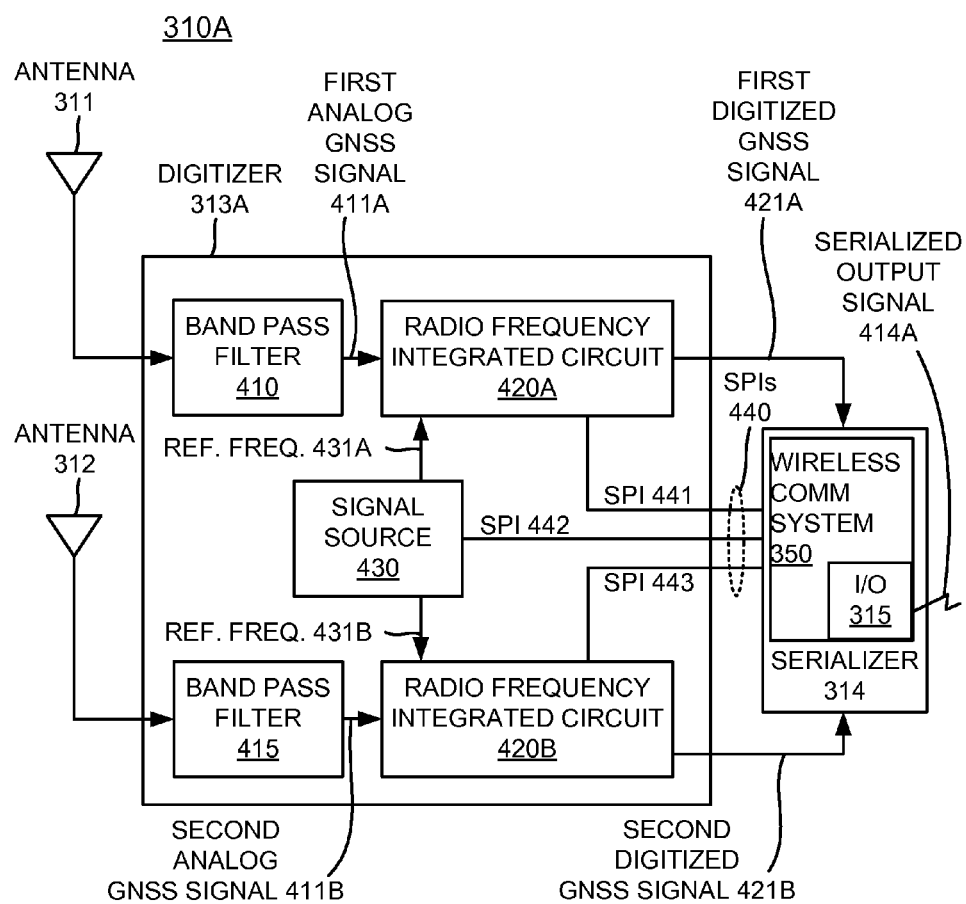
FIG. 4I is a block diagram of a radio frequency hardware component, according to various embodiments.

Referring now to FIG. 4I, it should be appreciated that FIG. 4I is similar to FIG. 4A. However, FIG. 4I illustrates the use of wireless communication system 350 instead of the wireline communication as illustrated in FIGS. 4A-D.

Figure 5:
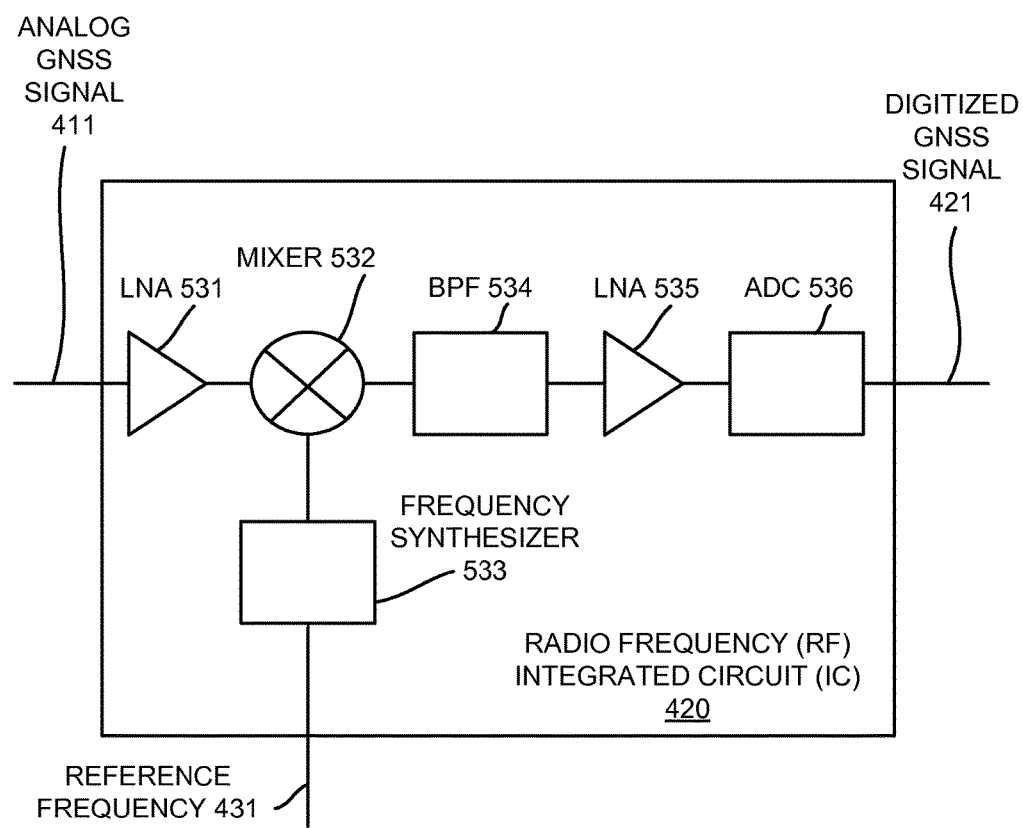
FIG. 5 is a block diagram of a radio frequency integrated circuit, according to various embodiments.

FIG. 5 is a block diagram of a radio frequency integrated circuit 420, according to various embodiments. The depiction in FIG. 5 is generic and may apply to any RFIC 420 (e.g., 420A, 420B, or 420C) described herein. As illustrated, an analog GNSS signal 411 is received as an input and then amplified by Low Noise Amplifier (LNA) 531. The amplified analog GNSS signal 411 is then received at mixer 532 where it is mixed with a reference frequency 431 to create an intermediate frequency. The reference frequency is produced by frequency synthesizer 533, and is a harmonic of a stable reference frequency 431 that it receives as an input. The output of mixer 532 is filtered by band pass filter 534 at the intermediate frequency to exclude other output produced by mixer 532. A second amplifier, LNA 535, then further amplifies the filtered intermediate frequency signal to provide gain control prior to sampling for analog-to-digital conversion by analog-to-digital convertor 536. Analog-to-digital convertor 536 outputs a digitized version of the intermediate frequency signal which is then coupled to the soft GNSS receiver 333 (either directly in an integrated embodiment or through serialization and transmission in other embodiments in which the RF hardware component 310 and the communication device 330A are not integrated).

Figure 6:
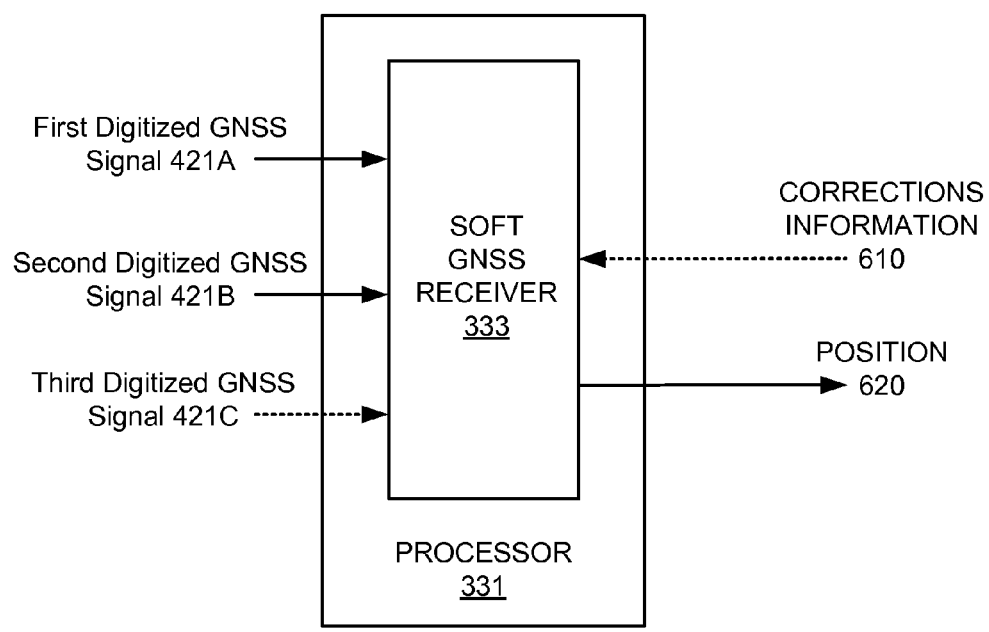
FIG. 6 is a block diagram of a software defined GNSS receiver, according to various embodiments.

FIG. 6 is a block diagram of a software defined GNSS receiver 333, according to various embodiments. Software defined GNSS receiver 333 is also referred to herein as a "soft GNSS receiver." Software defined GNSS receivers are a type of software defined radio in which correlating, dispreading, and other functions of a GNSS receiver are accomplished digitally by a program running on a processor. Software defined GNSS receivers and their implementation are well-known by those of skill in the art. As illustrated in FIG. 6, software defined GNSS receiver receives digitized GNSS signals (421A, 421B, and in some embodiments 421C) as inputs. Soft GNSS receiver 333 generates first information such as pseudorange, code, carrier phase, and/or Doppler shift information from the first digitized GNSS signal 421A. In some embodiments, the first information may be associated with L2C signals from GPS satellites. Soft GNSS receiver 333 generates second information such as pseudorange, code, carrier phase, and/or Doppler shift information from the second digitized GNSS signal 421B. In some embodiments, the second information may be associated with L1 signals from GPS satellites that at least include the GPS satellites that provide the L2C information and may include additional GPS satellites. In some embodiments when third digitized GNSS signal 421 is received, soft GNSS receiver 333 generates third information such as pseudorange, code, carrier phase, and/or Doppler shift information from the third digitized GNSS signal 421A. In some embodiments, the third information may be associated with L5 GNSS signals or L1 GNSS signals or SBAS signals. Soft GNSS receiver 333 may also receive one or more corrections 610 (e.g., one or more of WAAS, DGPS, PPP, RTX, RTK, SBAS and VRS) as digital inputs that are received over-the-air via wireless communication transceiver 336 of communication device 330A. Soft GNSS receiver 333 operates to determine a position based at least on a combination of the first information and the second information, but may also utilize the third information and/or corrections 610 when determining the position.

Figure 7A:
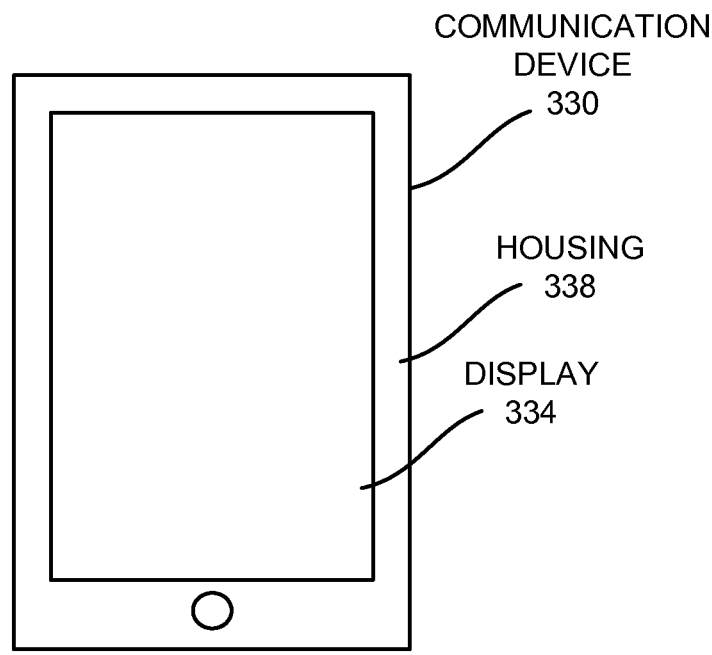
FIG. 7A is a front view of a communication device, according to various embodiments.

FIG. 7A is a front view of a communication device 330A, according to various embodiments. Communication device 330A includes display 334 and housing 338.

Figure 7B:
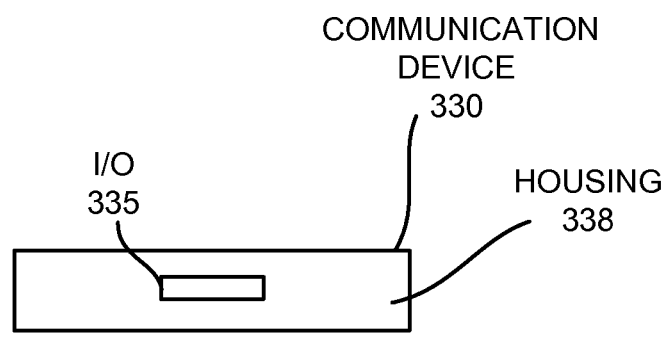
FIG. 7B is a bottom side view of a communication device, according to various embodiments.

FIG. 7B is a bottom side view of a communication device 330A, according to various embodiments. In one embodiment an I/O 335 is included in some portion of housing 338. Here it has been depicted on a bottom side edge; however, in other embodiments, female I/O 335 may be located in other portions of housing 338.

Figure 8A:
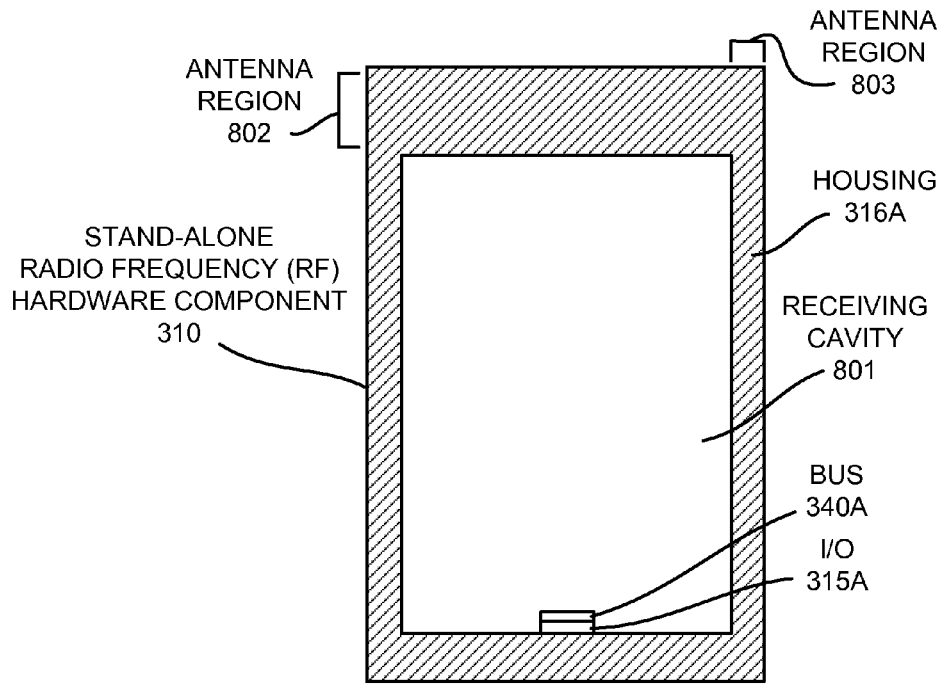
FIG. 8A is a front view of the outside of radio frequency hardware component, according to various embodiments.

FIG. 8A is a front view of the outside of a GNSS receiver system 300-1 in accordance with various embodiments. In FIG. 8A, GNSS receiver system 300-1 comprises a radio frequency hardware component 310, according to various embodiments. As depicted in FIG. 8A, radio frequency hardware component 310 is a stand-alone component which can operate as a sleeve or protective shell that the housing 338 of a separate communication device can be nestled within or otherwise conveniently and removably affixed by virtue of design. For example, as illustrated, housing 316A includes a receiving cavity 801 and a male I/O 315A which also includes a bus 340A. Antennas such as antennas 311, 312, and in some embodiments 318 may be embedded anywhere within housing 338, but in some embodiments are located upper edge antenna region 802 or a side edge antenna region 803.

Figure 8B:
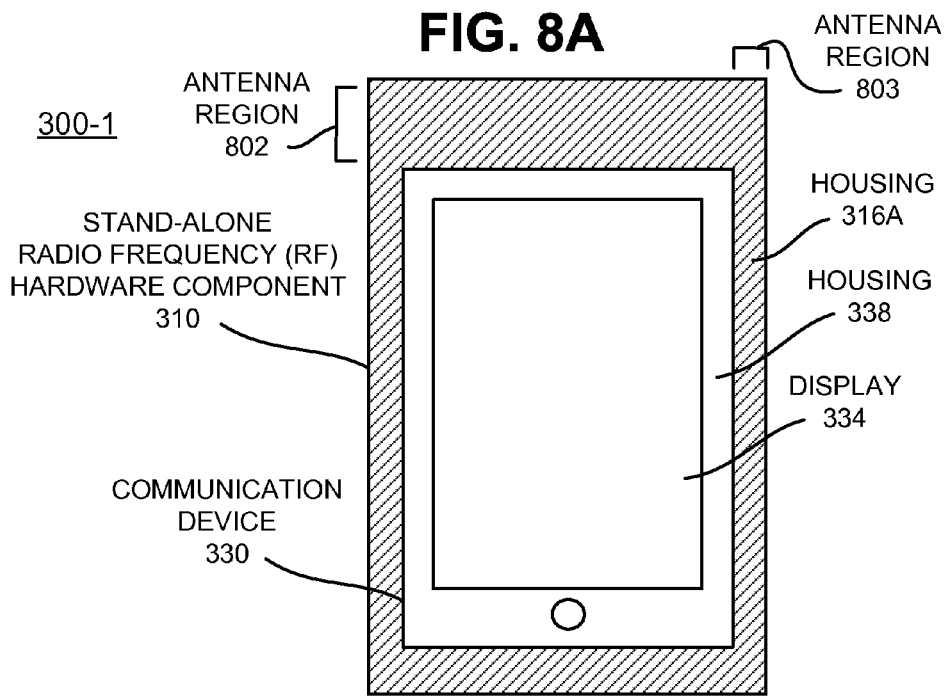
FIG. 8B is a front view of the outside of radio frequency hardware component coupled with a communication device to form a GNSS receiver, according to various embodiments.

FIG. 8B is a front view of a GNSS receiver system 300-1 in accordance with various embodiments in which radio frequency hardware component 310 is coupled with a communication device 330A to form GNSS receiver 300-1, according to various embodiments. Communication device 330A resides snugly within receiving cavity 801. As part of the coupling, bus 340A and I/O 315A have been inserted into the female I/O 335 of communication device 330A, thus engaging a removable communicative coupling between RF hardware component 310 and communication device 330A. It should be appreciated that an anticipated variation of this is a form factor which externally affixes (by virtue of design), housing-to-housing, to communication device 330A without enveloping it.

Figure 9A:
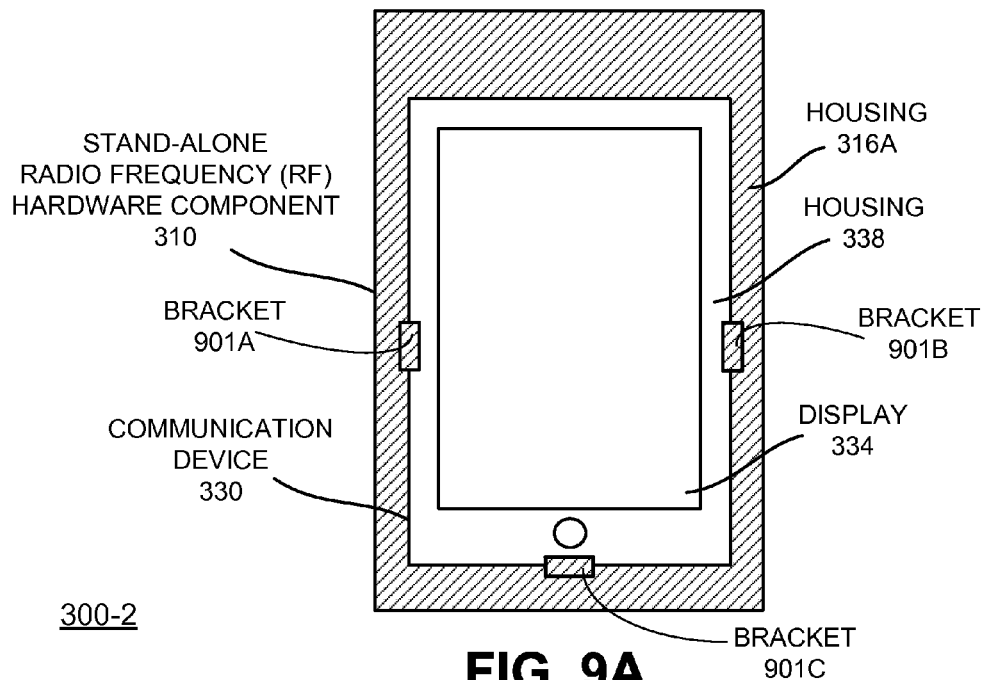
FIG. 9A is a front view of a GNSS receiver system in which a radio frequency hardware component is coupled with a communication device in accordance with one embodiment.

FIG. 9A is a front view of a GNSS receiver system 300-2 in accordance with various embodiments. In FIG. 9A, GNSS receiver system 300-2 comprises a radio frequency hardware component 310 that is coupled with a communication device 330A. In FIG. 9A, radio frequency component 310 further comprises brackets 901A, 901b, and 901C into which communication device 330A is inserted. Brackets 901A, 901b, and 901C then exert mechanical force which holds communication device 330 firmly against housing 316A. It is noted that in accordance with various embodiments, additional brackets, or bracket designs, may be used to couple communication device 330 securely to housing 316A of radio frequency hardware component 310. Additionally, other features, such as a partial receiving cavity 801 (not shown) may be configured such that communication device 330 is partially nestled within housing 316A. It is noted that in accordance with at least one embodiment, male I/O 315A is disposed within bracket 901C such that when communication device 330 is inserted into brackets 901A, 901b, and 901C it is also communicatively coupled with radio frequency hardware component 310 via bus 340A. In another embodiment, communication device 330 communicates wireless via wireless communication system 351 which wirelessly communicates with wireless communication system 350 of radio frequency hardware component 310 as shown in FIG. 3E.

Figure 9B:
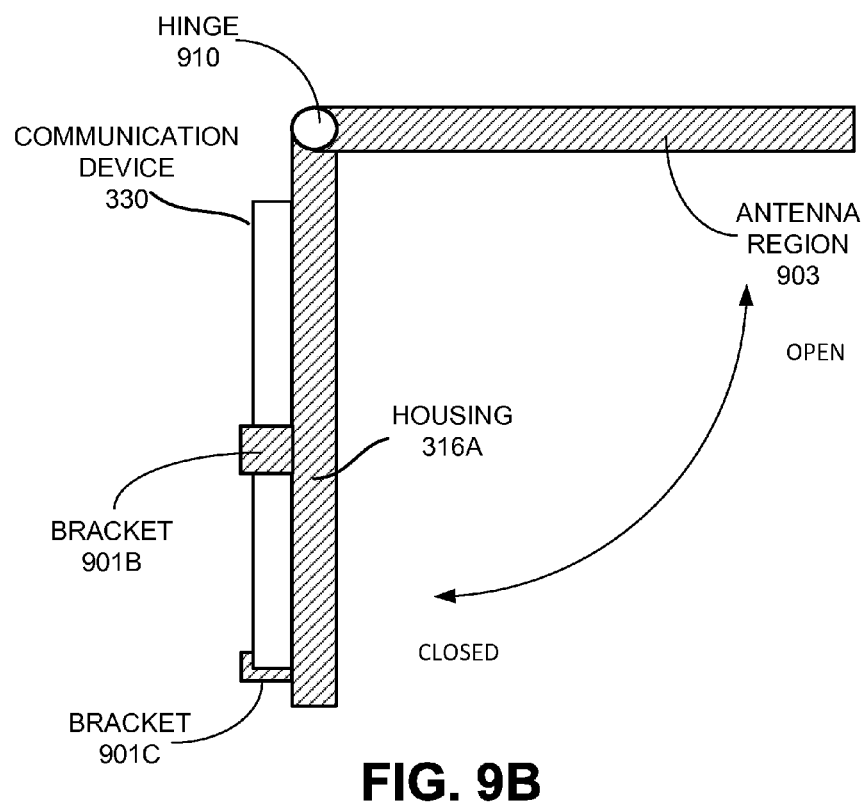
FIG. 9B is a side view of a GNSS receiver system in which a radio frequency hardware component is coupled with a communication device in accordance with one embodiment.

FIG. 9B is a side view GNSS receiver system 300-2 as described above in FIG. 9A. As shown in FIG. 9B, communication device 330 is inserted into brackets 901B and 901C which hold communication device 330 firmly against housing 316A. In FIG. 9B, radio frequency hardware component 310 further comprises antenna housing 903 which is coupled with housing 316A via a hinge 910 and can rotate freely from a close position in which antenna housing 903 lies along housing 316A to an open position. As shown in FIG. 9B, antenna housing 903 is disposed ninety degrees or more from housing 316A. It is noted that it is not necessary to rotate antenna housing 903 to the position shown in FIG. 9B in order to receive and process GNSS satellite signals. Thus, in accordance with various embodiments, GNSS receiver system 300-2 is still operable if a user rotates antenna housing 903 to a position of less than ninety degrees, or if the user does not rotate antenna housing 903 at all away from housing 316A. In accordance with various embodiments, antenna housing 903 comprises a housing for antenna 232 of GNSS receiver 200 of FIG. 2 and can comprise additional components of GNSS receiver 200 and/or radio frequency hardware components 310A, 310B, 310C, and 310D. In accordance with at least one embodiment, all of the components of GNSS receiver 200 and radio frequency hardware components 310A, 310B, 310C, and 310D are disposed with antenna housing 903. In operation, a user rotates antenna housing 903 from a closed position along housing 316A to an open position as shown in FIG. 9B. This is advantageous because in the open position shown in FIG. 9B, antenna 232 can be oriented such that the surfaces of antenna 232 are perpendicular to the surface of the Earth. This improves antenna gain and thus enhances the performance of GNSS receiver system 300-2. Additionally, in accordance with various embodiments, upon detecting that antenna housing 903 has been rotated from a closed position to the open position shown in FIG. 9B, processor 331 of communication device 330 is configured to automatically initiate various actions such as, but not limited to, automatically powering up communication device 330 and/or radio frequency hardware component 310, automatically establishing communications with wireless network 130; and automatically processing received GNSS signals.

Figure 10A:
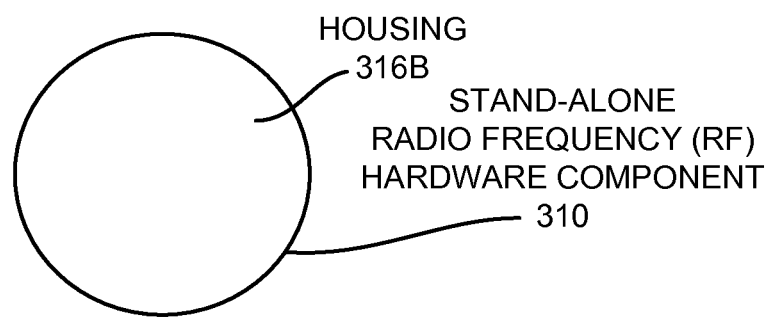
FIG. 10A is a front view of the outside of radio frequency hardware component, according to various embodiments.

FIG. 10A is a front view of the outside of radio frequency hardware component 310, according to various embodiments. In this embodiment, RF hardware component 310 is disposed within a housing 316B. Housing 316B is illustrated as being puck shaped, but may have other shapes which do not include a cavity into which communication device 330A can be inserted and/or do not externally affix (by virtue of design), housing-to-housing, to communication device 330A.

Figure 10B:
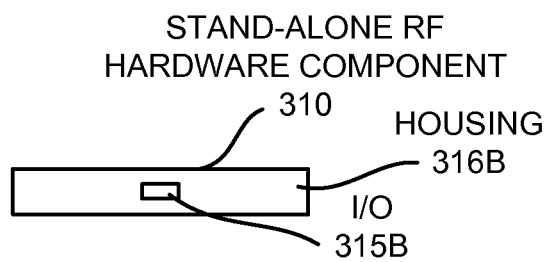
FIG. 10B is a side view of the outside of radio frequency hardware component, according to various embodiments.

FIG. 10B is a side view of the outside of radio frequency hardware component, according to various embodiments. In one embodiment an I/O 315 is included in some portion of housing 338. Here it has been depicted on a side edge; however, in other embodiments, I/O 315 may be located in other portions of housing 316B. All though depicted as a female I/O, I/O 315B may be a male I/O and may be integrated with a bus in some embodiments.

Figure 11A:
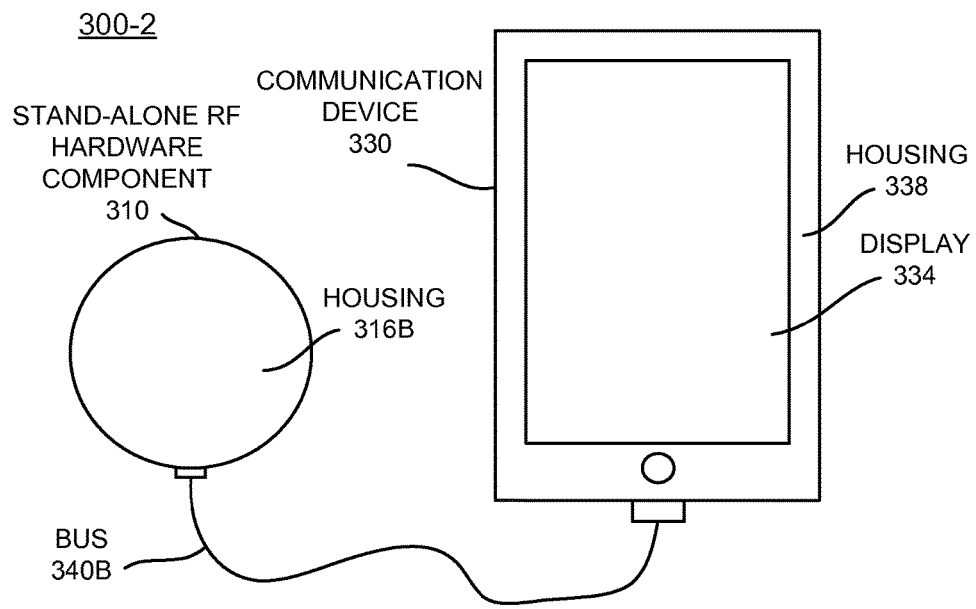
FIG. 11A is a front view of the outside of radio frequency hardware component coupled with a communication device to form a GNSS receiver, according to various embodiments.

FIG. 11A is a front view of the outside of radio frequency hardware component 310 that is coupled with a communication device to form GNSS receiver 300-2, according to various embodiments. Bus 340B couples I/O 315B to I/O 335 of communication device 330A, thus engaging a removable communicative coupling between RF hardware component 310 and communication device 330A.

Figure 11B:
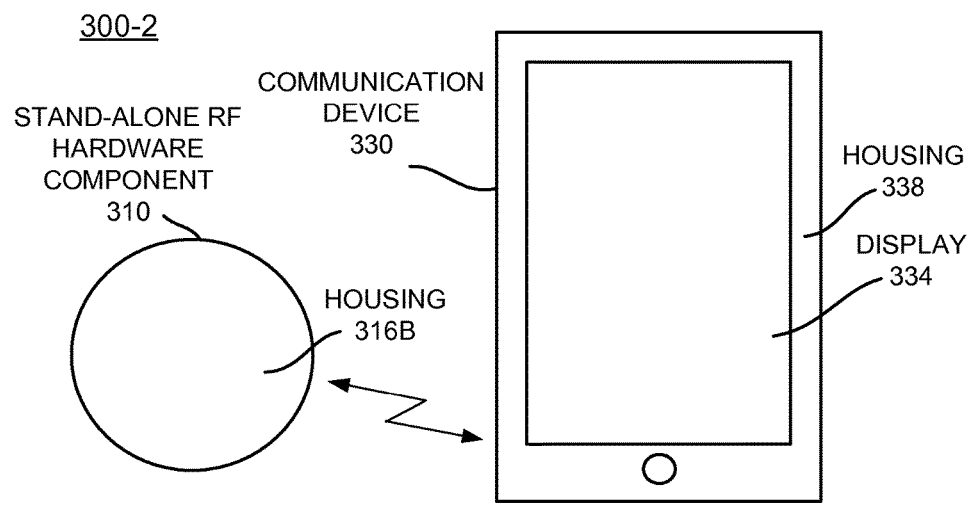
FIG. 11B is a front view of the outside of radio frequency hardware component wirelessly coupled with a communication device to form a GNSS receiver, according to various embodiments.

Referring now to FIG. 11B, FIG. 11B is a front view of the outside of radio frequency hardware component 310 that is wirelessly coupled with a communication device to form GNSS receiver 300-2, according to various embodiments. For example, wireless communication system 350 of RF hardware component 310 wirelessly communicates with wireless communication system 351 of communication device 330.

FIG. 12 is a flowchart of a method 1200 of implementing an electronic tape measure in accordance with one embodiment. In operation 1201 of FIG. 12, a first plurality of L1 Global Navigation Satellite System (GNSS) signals are received at a first location from a plurality of GNSS satellites during an epoch. As described above, antenna 312 of a radio frequency hardware component 310 of ETM 120 is configured to receive L1 GNSS signals from a plurality of GNSS satellites (e.g., 290 of FIG. 1B).

In operation 1202 of FIG. 12, a second plurality of L2C GNSS signals are received at the first location from the plurality of GNSS satellites during the epoch. As described above, antenna 311 of ETM 120 is configured to receive L2/L2C signals from a plurality of GNSS satellites (e.g., 290 of FIG. 1B). In accordance with various embodiments, the analog form L1 GNSS signals and the analog form L2C signals are digitized using a digitizer (e.g., 313 of FIGS. 3A-3E) and the digitized L1 and L2C signals are received at the communication device 330 of FIGS. 3A-3E. As described above with reference to FIGS. 4A-4H, digitizer 313 comprises at least a first RFIC configured for digitizing analog form L1 GNSS signals and a second RFIC configured for digitizing L2C GNSS signals in various embodiments. In accordance with various embodiments, the respective L1 and L2C digitized GNSS signals are serialized using serializer 314 of FIGS. 3A-3E before being sent as a serial transmission to communication device 330 which is proximate to radio frequency hardware component 310. In accordance with various embodiments, a third analog GNSS signal can be received by the radio frequency hardware component 310. This can be a GNSS signal such as an L1 Galileo signal, an L1 BeiDou signal, an L1 Glonass signal, an L5 GPS signal, and a pseudolite transmitted signal. As described above, ETM 120 is further configured to receive and process L1 Galileo signals, L1 BeiDou signals, L1 Glonass signals, L1 pseudolite signals, and L5 GPS signals. In accordance with various embodiments, a communication device at the base location also comprises a radio frequency hardware component located proximate to a cellular telephone (again, often referred to herein as a "cellphone"). Thus, as described above, the L1 and L2C GNSS signals are digitized and serialized at the radio frequency hardware component prior to being sent to the cellular telephone. In this instance, a software defined GNSS receiver operating on a processor of the other communication device derives carrier phase measurements of the first plurality of L1 GNSS signals and/or the second plurality of L2C GNSS signals. In accordance with various embodiments, the processor on which the software defined GNSS receiver is operating is located outside of a GNSS receiver chipset of the other communication device.

In operation 1203 of FIG. 12, a software defined GNSS receiver operating on a processor of a cellular telephone is used to derive carrier phase measurements from the first plurality of L1 GNSS signals and carrier phase measurements from the second plurality of L2C GNSS signals. As described above, soft GNSS receiver 333 of FIGS. 3A-3E operates on processor 331 and is configured to derive carrier phase measurements from L1 GNSS signals and from L2C GNSS signals. In accordance with various embodiments, the processor 331 upon which a soft GNSS receiver 333 is implemented can include, but is not limited to, a host processor of communication device 330, a microprocessor of communication device 330, a graphics processing unit (GPU) of communication device 330, and a digital signal processor (DSP) of communication device 330. In accordance with various embodiments, at least a portion of ETM 120 comprises a cellular telephone (e.g., communication device 330 of FIGS. 3A-3E) and the processor upon which soft GNSS receiver 333 is implemented is located outside of a GNSS receiver chipset (e.g., 337 of FIGS. 3A-3E) of communication device 330. However, it is noted that implementations of ETM 120 can utilize other communication device(s) 300 including, but not limited to, tablet computer system, two-way non-cellular radios, dedicated short range communication (DSRC) radios implementing IEEE 802.11p standards, and DSRC radios implemented as software defined radios in compliance with IEEE 802.11p standards.

In operation 1204 of FIG. 12, a wireless message is received from a communication device located at a base location conveying pseudorange estimates and carrier measurements derived from the first plurality of L1 GNSS signals from the plurality of GNSS satellites during the epoch. As described previously, in accordance with various embodiments carrier measurements conveyed from a reference source include, but are not limited to code and carrier phase measurements as well as pseudorange data for each GNSS satellite in view, or selected GNSS satellites identified by ETM 120. As described above, ETM 120 is configured to receive wireless Internet messages via wireless Internet connection 135 which convey L1 GNSS pseudorange estimates and carrier measurements (e.g., from ETM 110 of FIG. 1A). Additionally, ETM 120 can receive pseudorange and carrier phase measurements derived from the second plurality of L2C GNSS signal from the communication device located at the base location as well. In another embodiment, the communication device located at the base location only conveys pseudorange estimates derived from the second plurality of L2C GNSS signals. Furthermore, as described above, these L1 and/or L2C pseudorange estimates are derived from signals originating at the same GNSS satellites (e.g., 290 of FIG. 1B) which were used by ETM 120 to derive pseudorange and carrier phase estimates locally. Furthermore, these pseudorange and carrier phase estimates are derived on an epoch-by-epoch basis at both the base location (e.g., ETM 110 of FIG. 1A) and at ETM 120. As described above, ETM 110 and ETM 120 are configured to operate as an electronic tape measure units. In at least one embodiment, the communication device 330 of ETM 110 comprises a cellular telephone. Thus, in at least one embodiment, an antenna of ETM 110 (e.g., 312 of FIGS. 3A-3E) receives analog form L1 GNSS signals from a plurality of GNSS satellites (e.g., 290 of FIG. 1B) and an antenna (e.g., 311 of FIGS. 3A-3E) receives L2C signals from the plurality of GNSS satellites. A software defined GNSS receiver (e.g., 333 of FIGS. 3A-3E) operating on a processor 331 of ETM 110 is used to derive pseudorange and carrier phase estimates of the L1 and/or L2C signals received by ETM 110 for the same epoch as the epoch in which L1 and/or L2C pseudorange and carrier phase estimates were derived by ETM 120. The derived L1 and/or L2C pseudorange and carrier phase estimates are sent from ETM 110 to ETM 120.

In operation 1205 of FIG. 12, the cellular telephone determines a distance from the base location to the first location. As described above, in accordance with various embodiments, ETM 120 uses the pseudorange and carrier phase estimates received from a base location (e.g., 110 or 120 of FIG. 1A), in conjunction with locally derived pseudorange and carrier phase estimates, to determine a distance from the other communication device to ETM 120. Additional GNSS corrections can also be used by ETM 120 to refine the position determination process. In accordance with various embodiments, additional GNSS corrections used by ETM 120 include, but are not limited to, WAAS corrections, DGPS corrections, PPP corrections, RTX corrections, RTK corrections, SBAS corrections, and VRS corrections. In accordance with various embodiments, the ETM 120 and ETM 110 also comprise a digitizer (e.g., 313A and 313B of FIGS. 3A, 3B, 3C, 3D, and 3E) for digitizing received L1 and/or L2C GNSS signals and a serializer (e.g., 314 of FIGS. 3A and 3B) for serializing the digitized L1 and/or L2C GNSS signals. In accordance with various embodiments, ETM 120 can be moved to a second location and a second distance is determined from the other communication device to the cellular telephone (e.g., ETM 120). In accordance with various embodiments, the L2C GNSS signal is not continuously tracked by the processor of either of the cellular telephone (e.g., ETM 120) or the other communication device (e.g., ETM 110). In at least one embodiment, the frequency of the L2C signal is subtracted from the frequency of the L1 signal to create a third frequency which is used to resolve integer ambiguity of the L2C signal when re-acquisition is being attempted. Furthermore, as described above, in accordance with various embodiments, the distance from the base location to the first location is determined without the use of the geographical coordinates of the cellular telephone and/or the other communication device. In accordance with various embodiments, the cellular telephone can perform a single-differencing operation wherein pseudorange estimates of the first L1 GNSS signal from a first GNSS satellite received by the other communication device are subtracted from the pseudorange estimates of the first L1 GNSS signal from the first GNSS satellite received by the cellular telephone to derive a first residual value and to determine the distance from the other communication device to the cellular telephone. In accordance with various embodiments, the cellular telephone can perform a double-differencing operation wherein pseudorange estimates of the first L1 GNSS signal from a second GNSS satellite received by the other communication device are subtracted from the pseudorange estimates of the first L1 GNSS signal from the second GNSS satellite received by the cellular telephone to derive a second residual value which is then from the first residual value to determine the distance from the base location to the first location.

RTK Reference Station

Figure 13:
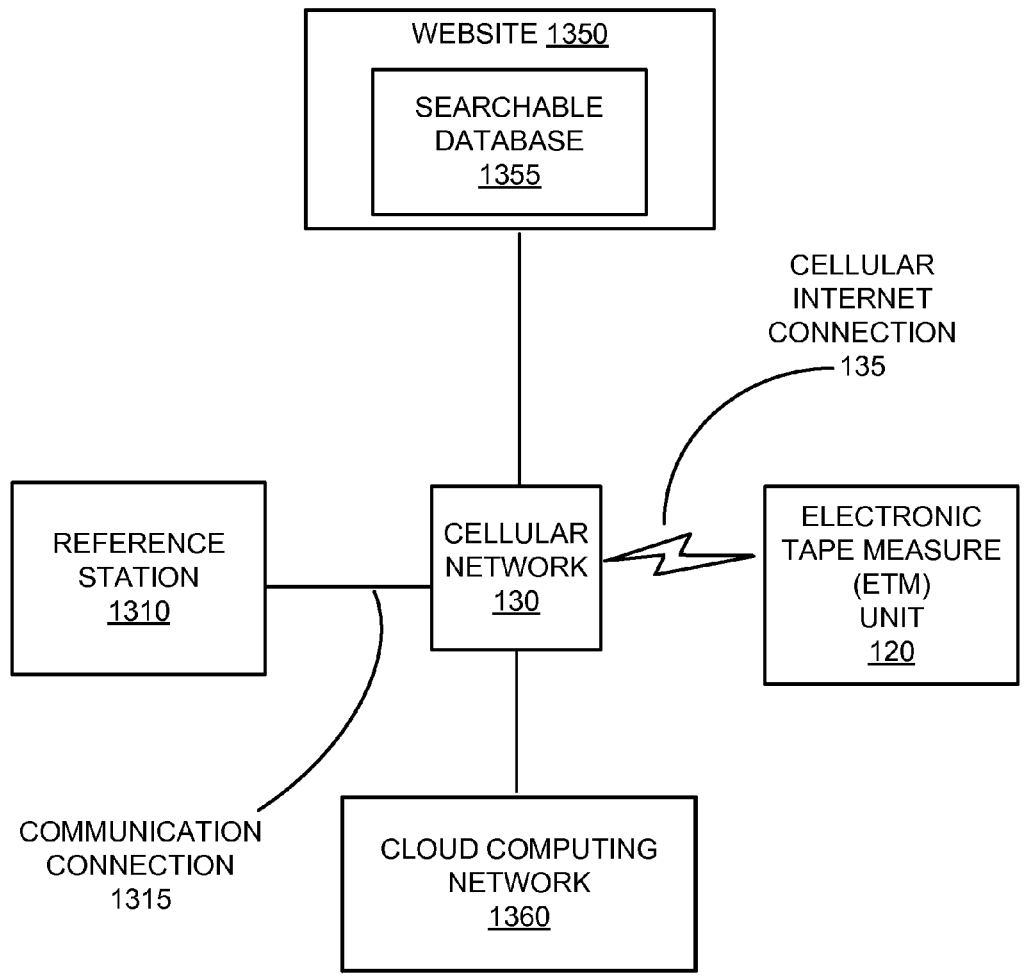
FIG. 13 shows components used in an electronic tape measure system in accordance with various embodiments.

FIG. 13 shows components used in an electronic tape measure system 100 in accordance with various embodiments. In FIG. 13, a reference station 1310 receives radio frequency signals from a plurality of GNSS satellites. In accordance with various embodiments, reference station 1310 is a dedicated Real-Time Kinematic (RTK) GNSS reference station. Typically, an RTK reference station is situated at a known, usually surveyed, position and transmits its location together with the pseudorange and carrier phase measurements at frequencies L1 and L2/L2C for all in-view satellites on an epoch-by-epoch basis. Typically, reference station 1310 will broadcast this information using UHF or spread spectrum radio transmitters, although other radio-frequency broadcast mediums are used in various embodiments. An example of a dedicated RTK reference station receiver is the NetR9 series of RTK reference station receivers which are commercially available from Trimble Navigation Ltd. located at 935 Stewart Drive, Sunnyvale, Calif. 94085. In FIG. 13, reference station 1310 communicates with wireless network 130 via a communication connection 1315. In accordance with various embodiments, communication connection 1315 is a wired or wireless communication connection. In FIG. 13, reference station 1310 conveys the pseudorange and carrier phase measurements to website 1350 comprising a searchable database 1355. In accordance with various embodiments, the pseudoranges and carrier phase measurements sent from reference station 1310 are timestamped so that ETM 120 can use pseudorange and carrier phase measurements which correlate with the epochs of the pseudorange and carrier phase measurements it makes locally. ETM 120 can then perform a single-differencing or double-differencing operation to derive distance 220 from reference station 1310 to ETM 120. In accordance with another embodiment, reference station 1310 conveys pseudorange and carrier phase measurements to a cloud computing network 1360. In accordance with various embodiments, reference station 1310 may only convey pseudorange and carrier phase measurements based upon received L1 signals only, L2 signals only, or both L1 and L2 signals. Additionally, reference station 1310 may additionally convey timestamped carrier phase and code phase measurements as well.

In FIG. 13, wireless network 130 conveys the pseudorange and carrier phase measurements for the L1 and L2/L2C signals of the respective GNSS satellites in view to ETM 120 via wireless Internet connection 135. In accordance with various embodiments, ETM 120 is configured to use the pseudorange and carrier phase measurements received via wireless Internet connection 135 with pseudorange and carrier phase measurements it has received from at least some of the satellites in view of reference station 1310 during the same epochs. Using this information, ETM 120 is configured to generate a distance from reference station 1310 to its current location (e.g., measurement location 205 of FIG. 1B), depending upon the reference station from which the pseudorange and carrier phase information was received. It is noted that in accordance with various embodiments, there is no requirement for reference station 1310 to send information such as a position fix of the location at which reference station 1310 is situated. Similarly, in accordance with various embodiments, there is no requirement for ETM 120 to generate a position fix when determining the distance to reference station 1310, or in selecting a given reference station from which to receive pseudorange and carrier phase measurements. In other words, the exchange of geographical coordinates of either of reference station 1310 and/or ETM 120 is not necessary in accordance with various embodiments.

It is noted that in accordance with various embodiments, ETM 120 derives a distance from one measurement location (e.g., 205 of FIG. 1B) to a second measurement location (not shown) as described in U.S. Pat. No. 6,100,842, to Drier et al., titled Chained Location Determination System. The system uses signals from a reference station to provide RTK information to a mobile station in order to determine its location, in one embodiment using a double-differencing operation. Once the location of the mobile station is determined, the location of a second mobile station is determined using double-differencing and the location of the first mobile station. This permits "chaining" a plurality of mobile stations without the necessity of all of them being in communication with a reference station.

Figure 14:
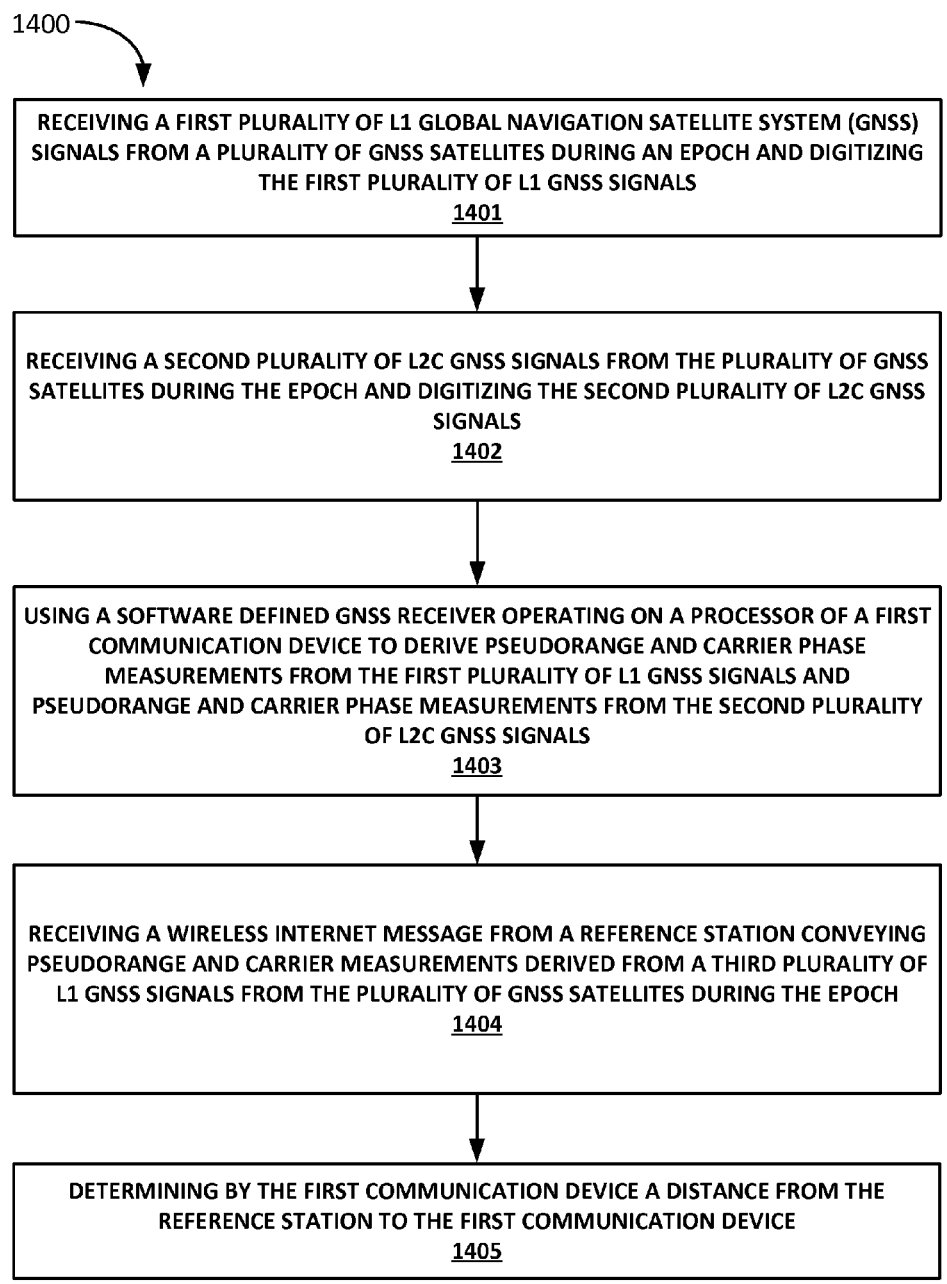
FIG. 14 is a flowchart of a method 1400 of implementing an electronic tape measure in accordance with one embodiment.

FIG. 14 is a flowchart of a method 1400 of implementing an electronic tape measure in accordance with one embodiment. In operation 1401 of FIG. 14, a first plurality of L1 GNSS signals from a plurality of GNSS satellites is received during an epoch and is digitized. As discussed above, in accordance with various embodiments L1 GNSS signals and L2C GNSS signals are digitized using a digitizer (e.g., 313A and 313B of FIGS. 3A, 3B, 3C, 3D, and 3E).

In operation 1402 of FIG. 14, a second plurality of L2C GNSS signals is received from the plurality of GNSS satellites and is digitized. In accordance with various embodiments, a serial transmission of the respective digitized L1 GNSS signals and L2C GNSS signals are received at a first communication device (e.g., 330A of FIGS. 3A and 3B) which is located proximate to and removably coupled with a radio frequency hardware component. In other words, the digitized L1 GNSS signals and L2C GNSS signals are serialized into serialized transmission by a serializer of the radio frequency hardware component. In accordance with various embodiments, the radio frequency hardware component and the first communication device comprise an electronic tape measure (ETM) unit.

In operation 1403 of FIG. 14, a software defined GNSS receiver operating on a processor of a first communication device is used to derive pseudorange and carrier phase measurement from the first plurality of L1 GNSS signals and pseudorange and carrier phase measurements from the second plurality of L2C GNSS signals. In accordance with various embodiments, the first communication device comprises a cellular telephone (e.g., 330A of FIGS. 3A and 3B) and a processor (e.g., 331 of FIGS. 3A and 3B) is disposed outside of a GNSS receiver chipset (e.g., 337 of FIGS. 3A and 3B) of the cellular telephone. In other implementations, other communication devices can be used as communication device 330A including, but not limited to a tablet computer; a two-way non-cellular radio, a dedicated short range communication (DSRC) radio which complies with Institute of Electrical and Electronics Engineers (IEEE) 802.11p standards, and a dedicated short range communication (DSRC) radio which is implemented as a software defined radio in compliance with IEEE 802.11p standards upon a processor. In accordance with various embodiments, GNSS corrections are received at the first communication device and used in the software defined GNSS receiver as a portion of a position determination of the ETM. Additionally, in accordance with various embodiment, a vector addition operation is performed to determine a vector from a first measurement location to a second measurement location.

In operation 1404 of FIG. 14, a wireless Internet message is received from a reference station conveying pseudorange and carrier measurements derived from the first plurality of L1 GNSS signals from the plurality of GNSS satellites during the epoch. As described previously, in accordance with various embodiments carrier measurements conveyed from a reference source include, but are not limited to code and carrier phase measurements as well as pseudorange data for each GNSS satellite in view, or selected GNSS satellites identified by ETM 120. In accordance with at least one embodiment, ETM 120 is configured to establish a VPN connection with website 1350 to receive pseudorange and carrier phase measurements send from reference station 1310. In accordance with various embodiments, reference station 1310 posts the pseudorange and carrier phase measurements on a website 1350. ETM 120 is configured to access website 1350 and to receive Internet messages via wireless Internet connection 135 the pseudorange and carrier phase measurements used as described above. In accordance with at least one embodiment, website 1350 comprises a searchable database 1355 which stores the pseudorange and carrier phase measurements sent from reference station 1310. In accordance with one embodiment, ETM 120 is configure to send the epochs for pseudorange and carrier phase measurements it will use as a search parameter for searchable database 1355. Additionally, ETM 120 can be configured to designate the satellites in view of ETM 120 as a search parameter of searchable database 1355.

In operation 1405 of FIG. 14, the first communication device determines a distance from the reference station to the first communication device. As described above, in accordance with various embodiments, ETM 120 uses the pseudorange and carrier phase measurements received from a reference station (e.g., 1310 of FIG. 13), in conjunction with locally derived pseudorange measurements, to determine a distance (e.g., 220 of FIG. 1B) from reference station 1310 to the location at which ETM 120 is currently located. Additional GNSS corrections can also be used by ETM 120 to refine the position determination process. In accordance with various embodiments, additional GNSS corrections used by ETM 120 include, but are not limited to, WAAS corrections, DGPS corrections, PPP corrections, RTX corrections, RTK corrections, SBAS corrections, and VRS corrections.

FIG. 15 is a flowchart of an example ambiguity resolution procedure 1500 in accordance with at least one embodiment. In operation 1510 of FIG. 15, a least squares estimation of the position of ETM unit(s) (e.g., 110 and/or 120) is performed. In accordance with at least one embodiment, the least squares estimation is performed to minimize the cost-Function and is performed according to the equation below:

$$costFunction = \sum_{obs} [obs - \text{model}(obs)]^2 \qquad \text{Equation 1}$$

In Equation 1, the term "model(obs)" refers to the modeled variables which affect determination of the distance between GNSS receiver(s) 110 and/or 120 and each observed satellite. These factors include, but are not limited to, a sum of the distance between the satellite and GNSS receiver(s) 110 and/or 120, tropospheric delay effects, ionospheric delay effects, clock error, ephemeris error, the wavelength of the received signal times the integer ambiguity of the carrier phase. In accordance with at least one embodiment, the model observations for each satellite in sight of GNSS receiver(s) 110 and/or 120 are subtracted from the signals received by GNSS receiver(s) 110 and/or 120 from each of the respective satellites and the difference is then squared. This facilitates resolving float values for the receiver position, tropospheric delay of satellite signals, ionospheric delay of satellite signals, as well as integer ambiguities to all satellites on all frequency bands. As a result of the least squares estimation of operation 1510, a float ambiguity vector and an ambiguity covariance matrix of an estimated solution is generated.

In operation 1520 of FIG. 15, an integer search is performed. In accordance with at least one embodiment, the float ambiguity vector and ambiguity covariance matrix of the estimated solution is operated upon to find the integer ambiguity vectors that result in the smallest costFunction value. As a result, a listing of the best, second best, third best, etc. integer ambiguity vector candidates is generated. As an example, an initial estimate of the number of carrier wavelengths (e.g., one hundred million, one hundred thousand wavelengths) between a given satellite and GNSS receiver(s) 110 and/or 120 is generated. A costFunction operation is performed to determine a costFunction value. The number of carrier wavelengths, and thus the distance, between the satellite and GNSS receiver(s) 110 and/or 120 can then be incremented (e.g., one hundred million, one hundred thousand and one wavelengths) and a costFunction is then performed to determine a costFunction value for this new number of wavelengths between the satellite and GNSS receiver(s) 110 and/or 120. If the costFunction value decreases, it indicates that incrementing the number of wavelengths between the satellite and GNSS receiver(s) 110 and/or 120 is resulting in a more accurate ambiguity vector candidate. If the number of carrier wavelengths between the satellite and GNSS receiver is incremented again, and the costFunction value increases, this indicates that the ambiguity vector candidate is less accurate than the previous iteration in which the costFunction value decreased and that the previous number of wavelengths between the satellite and GNSS receiver(s) 110 and/or 120 (e.g., one hundred million, one hundred thousand and one) is the most accurate number of whole wavelengths between the satellite and GNSS receiver(s) 110 and/or 120. As a result, a listing of integer ambiguity candidates is generated which ranks them as a best estimate of position, a second best estimate of position, etc.

In operation 1530 of FIG. 15, an integer validation or an integer averaging operation is performed. In accordance with one embodiment, an integer validation operation is performed when the best candidate of the listing of integer ambiguity candidates has a much smaller costFunction associated with it than the next best integer ambiguity candidate. For example, the best candidate may be accepted as the "correct" candidate if the value of the costFunction associated with second best candidate is twice as high as the costFunction associated with the best candidate (e.g., if the ratio of the costFunction associated with second best candidate to the costFunction associated with the best candidate is two). In accordance with at least one embodiment, in order to avoid defining a certain ratio threshold for accepting the best candidate, integer averaging is performed. In accordance with at least one embodiment, the integer averaging operation is performed according to the equation below:

$$\text{weighted mean integer ambiguity vector} = \sum_{candidates} \text{weight(candidate)} * \text{candidate} \quad \text{Equation 2}$$

In accordance with at least one embodiment, the covariance matrix is given by the scatter of the candidates around the weighted mean of the candidates (in the usual way as the covariance matrix C of a number of given vectors $v_i$, $i=1, \ldots, n$ is defined: $C(v_1, \ldots, v_n) := \Sigma_i p_i (v_i - \bar{v}) \cdot (v_i - \bar{v})^t$ with weighted mean $\bar{v}(v_1, \ldots, v_n) := \Sigma_i p_i v_i$, normalized weight $p_i := w_i / \Sigma_j w_j$ and weight $w_i$). As a result of either of the integer validation or integer averaging operation, a distance between GNSS receiver(s) 110 and/or 120 and a given satellite is derived.

Figure 16:
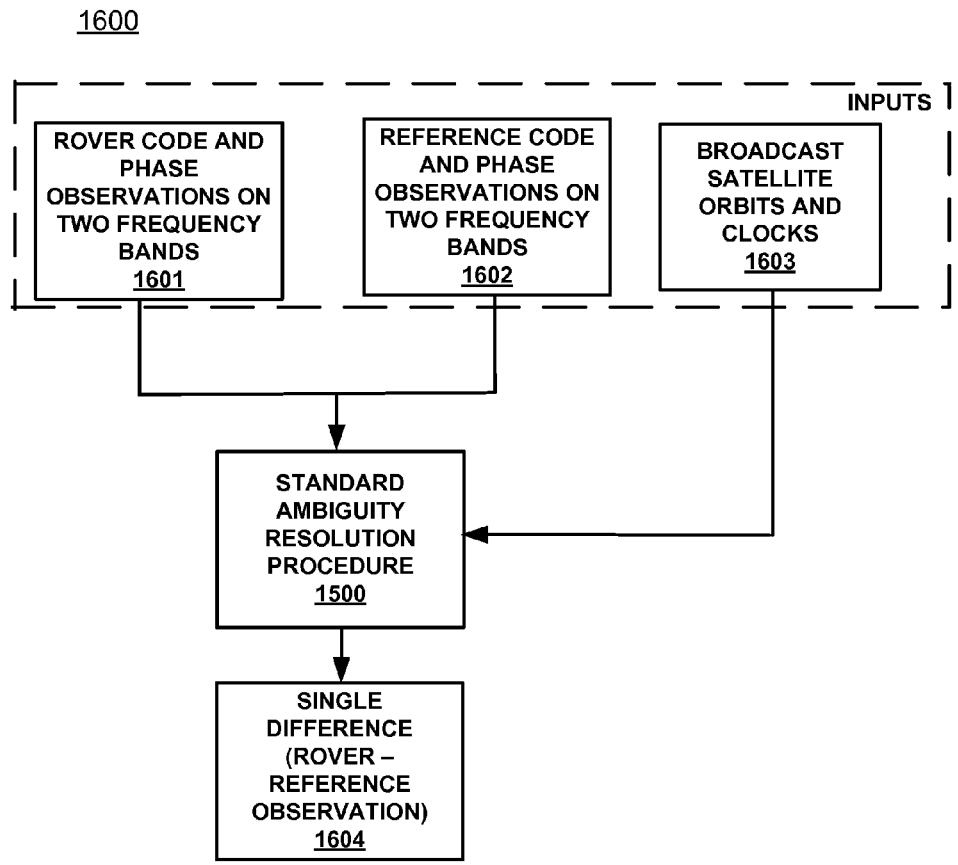
FIG. 16 is a flowchart of an example Real-time Kinematic (RTK) processing process in accordance with at least one embodiment.

FIG. 16 is a flowchart of an example Real-time Kinematic (RTK) processing process 1600 in accordance with at least one embodiment. It is noted that in accordance with various embodiments, the convergence selection operations described above are performed by a GNSS receiver (e.g., 110 and 120) which is operating in the Precise Positioning Mode and the operations described below with reference to FIG. 16 are not performed. In operation 1601 of FIG. 16, rover code and phase observations on 2 frequency bands are received. In accordance with various embodiments, the pseudorange observations are received by GNSS receiver(s) 110 and/or 120.

In operation 1602 of FIG. 16, reference code and phase observations on two frequency bands are received. In accordance with various embodiments, the reference code and carrier phase observations of operation 1602 are received at an RTK reference station (not shown) where accurate pseudoranges are determined and transmitted to a GNSS receiver.

In operation 1603 of FIG. 16, broadcast satellite orbits and clock information for each satellite in view are received. This satellite orbit and clock information is used later in the least squares estimation operation 1500 below.

In operation 1500 of FIG. 16, the standard ambiguity resolution procedure described above with reference to FIG. 15 is performed. Operation 1500 of FIG. 16 refers to the operations described above with reference to FIG. 15 to derive a distance from GNSS receiver(s) 110 and/or 120 and each given satellite in view of GNSS receiver(s) 110 and/or 120. In accordance with various embodiments, providing the satellite orbit and clock data from operation 1603 facilitates determining the most accurate pseudorange estimate to each satellite at the ETM unit(s) (e.g., 110 and/or 120).

In operation 1604 of FIG. 16, a single differencing operation is performed in which reference code and phase observations are subtracted from the rover's code and phase observations. This significantly reduces atmospheric error as atmospheric delay is typically the same, or similar, for both the rover and the reference station at normal operating distances (e.g., approximately ten kilometers). Additionally, the single differencing operation is used to reduce satellite clock error and orbit errors.

Figure 17:
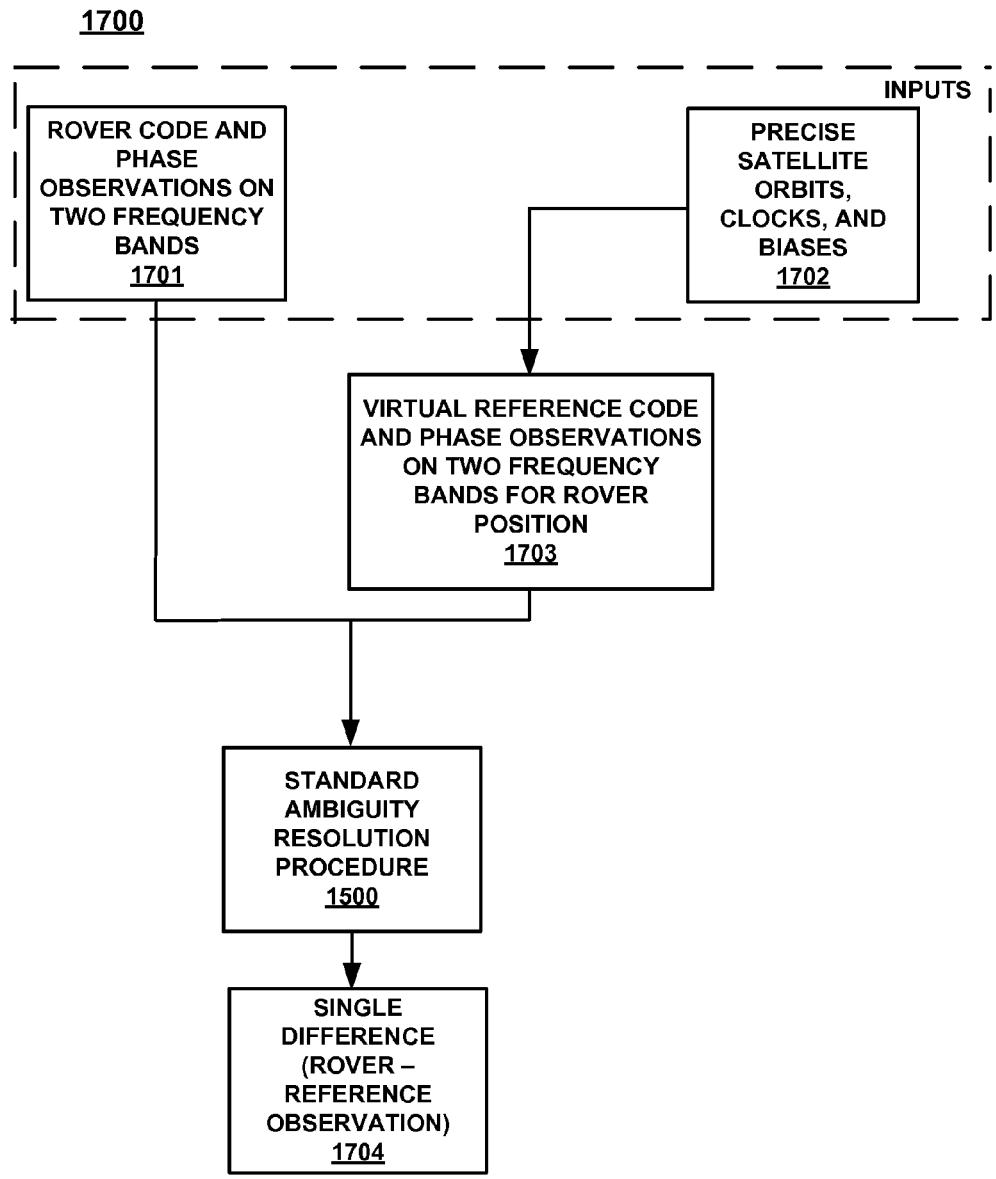
FIG. 17 is flowchart of operations performed in an example long convergence algorithm process in accordance with at least one embodiment.

FIG. 17 is flowchart of operations performed in an example long convergence algorithm process 1700 in accordance with at least one embodiment. In accordance with at least one embodiment, long convergence algorithm process 1700 is implemented as long convergence algorithm 112 described above. In operation 1701, rover code and phase observations on two frequency bands are received. In accordance with various embodiments, these code and phase observations are received by GNSS receiver(s) 110 and/or 120. It should be noted that the rover code and phase observations on two frequency bands is one example in accordance with various embodiments to achieve the highest precision results in the shortest time. Alternatively, various embodiments may utilize rover code and phase observations in a single frequency instead, and the operations described with reference to FIG. 17 can be performed in a similar manner.

In operation 1702 of FIG. 17, precise satellite orbits, clocks, and biases are derived. As described above in a PPP network, a worldwide network of GNSS reference receivers monitor the signals from each GNSS satellite. A central location then generates precise orbital, clock, and bias data for each satellite. This information is derived in operation 1702 and sent as a correction stream to GNSS receivers.

In operation 1703 a model of virtual reference code and phase observations on two frequency bands is derived. In accordance with at least one embodiment, the model of virtual reference code and phase observations is a description of the expected code and phase measurements at the location at which GNSS receiver(s) 110 and/or 120 are located. In accordance with at least one embodiment, this model is derived at least in part based upon the precise satellite orbits, clocks, and biases derived in operation 1702.

In operation 1500 of FIG. 17, the standard ambiguity resolution procedure described above with reference to FIG. 15 is performed. In the example of FIG. 17, the precise satellite orbits, clocks, and biases are used as inputs in the least squares estimation (e.g., operation 1510 of FIG. 15) to minimize the costFunction. Again, operation 1500 is used to derive a distance from GNSS receiver(s) 110 and/or 120 and each given satellite in view of GNSS receiver(s) 110 and/or 120.

In operation 1704 of FIG. 17, a single differencing operation is performed in which the modeled virtual reference pseudoranges are subtracted from the rover's pseudoranges. Typically, this operation will account for ionospheric error as well. In addition, the single differencing operation will also reduce satellite clock error and orbit errors.

Figure 18A:
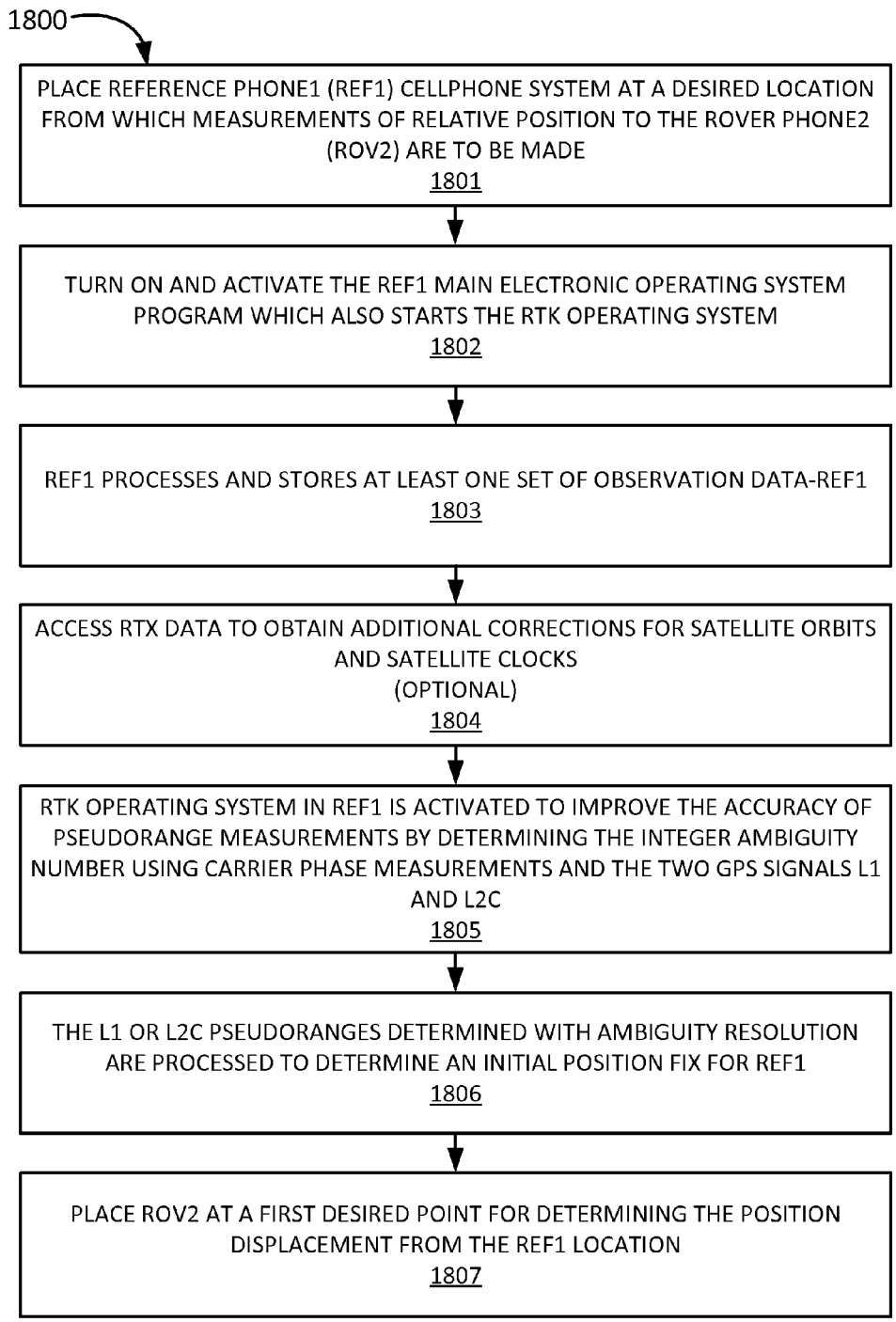
Figure 18B:
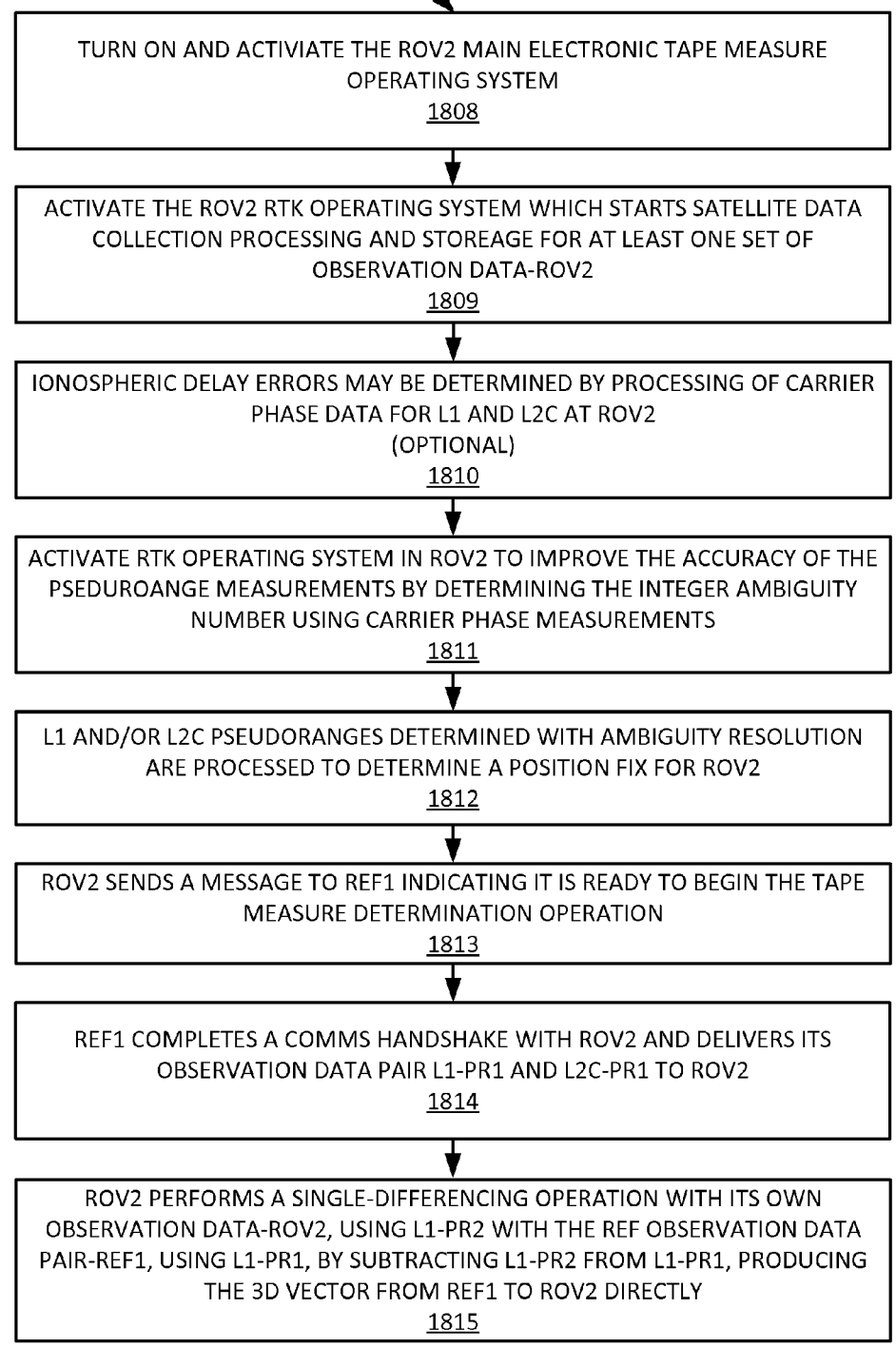

FIGS. 18A, 18B, and 18C are a flowchart 1800 of operations performed in a single-differencing electronic tape measure distance determination in accordance with at least one embodiment. It is noted that in the following description, as well as in FIGS. 20A and 20B, reference is made to a REF1 device and a ROV2 device. In accordance with various embodiments, the REF1 device refers to an ETM unit such as ETM 110 of FIGS. 1A and 1B. Similarly, the ROV2 device refers to an ETM unit such as ETM 120 of FIGS. 1A and 1B. In operation 1801 of FIG. 18A, a reference cellphone (e.g., REF1 of FIGS. 20A and 20B) is placed at a desired location from which measurements of relative position to a rover cellphone (e.g., ROV2 of FIGS. 20A and 20B) are to be made. As will be described in greater detail below, in one embodiment a pair of electronic tape measure units, such as ETM 110 and 120 of FIG. 1, are used to determine the relative distance between the ETM units. In the present discussion, REF1 is used to establish a base location similar to that of base location 201 of FIG. 1B.

In operation 1802 of FIG. 18A, the ETM 110 (e.g., REF1 of FIGS. 20A and 20B) is turned on and the electronic tape measure operating system (e.g., 345 of FIGS. 3A-3E) and the RTK operating system (e.g., 346 of FIGS. 3A-3E) are initiated.

In operation 1803 of FIG. 18A, REF1 processes and stores at least one set of observation data which, for the purpose of the present discussion, is labelled Observation Data-REF1. In accordance with various embodiments, the REF1 data is timestamped ranging data for pseudoranges from at least 4 satellites for L1 and/or L2C signals. In at least one embodiment, code phase and carrier phase ranging data from 5 satellites is used for faster acquisition. As described above, due to many error sources, true range distance (e.g., between REF1 and first satellite 2010 of FIG. 20A) is not known precisely. Thus, until these error sources are removed, the range distance from REF1 to first satellite 2010 comprises a pseudorange (e.g., shown as L1-PR1 2003 of FIG. 20A). In accordance with various embodiments, ionospheric delay errors may be determined by processing of carrier phase data for L1 and/or L2C signals at REF1, but for a first approximation, such corrections are not necessary if the separation distance between REF1 and ROV2 is less than 10 miles. This is because the single-differencing operation removes the ionospheric errors in each pseudorange, and for separation distances of 10 km on the ground, the ionosphere maintains a fairly constant electron cloud density.

In operation 1804 of FIG. 18A, RTX data (e.g., as described above with reference to operation 1702 of FIG. 17 above) is obtained to improve the precision of determining the true satellite-receiver range between first satellite 2010 and REF1. It is noted that operation 1804 is optional and that in accordance with various embodiments, flowchart 1800 can be performed without the use of precise satellite orbital data and clock data.

In operation 1805 of FIG. 18A, the RTK operating system in REF1 is activated to improve the accuracy of the pseudorange measurements by determining the integer ambiguity number using carrier phase measurements and the two GPS signals on the L1 and/or L2C frequencies. In accordance with various embodiments, this operation improves the accuracy of the pseudorange measurements by determining the integer ambiguity number using carrier phase measurements. The ambiguity number is on the order of 26 million integers, however, for practical purposes, this number can be cut down to approximately 100,000 as representing the most likely range to a given satellite. RTK algorithms are well known in the art, as found for example at the RTK software program that is part of the RTK library, found at www.RTKLIB.com. Another example is described in U.S. Pat. No. 5,519,620 titled "Centimeter Accurate Global Position System Receiver for On-the-fly Real-time Kinematic Measurement and Control," to Talbot et al. Further examples are described above with reference to FIGS. 15, 16, and 17. In accordance with various embodiments, the L1 and/or L2C receiver system tracking two phase-related frequencies also provides a way to speed resolution of the integer ambiguities, thus speeding up the setup process.

In operation 1806 of FIG. 18A, the L1 or L2c pseudoranges determined with ambiguity resolution (e.g., operation 1805 above) are processed to determine an initial position fix for REF1. This operation determines a more precise estimate of the distance to each of the satellites in view of REF1 and being tracked. While there are still errors which can be accounted for, subsequent operations described below can compensate for these other error sources.

In operation 1807 of FIG. 18A, a second ETM 120 (e.g., ROV2 of FIGS. 20A and 20B) is placed at a first desired point for determining the position displacement from the REF1 location.

In operation 1808 of FIG. 18B, the ETM 120 (e.g., ROV2 of FIGS. 20A and 20B) is turned on and the tape measure operating system (e.g., 345 of FIGS. 3A-3E) is initiated.

In operation 1809 of FIG. 18B, the RTK operating system (e.g., 346 of FIGS. 3A-3E) is initiated and begins satellite data collection processing and storage for at least one set of observation data which, for the purpose of the present discussion, is labelled Observation Data-ROV2. It is noted that while listed as separate operations in the present discussion, operations 1807, 1808, and 1809 can be performed as a single operation.

In operation 1810 of FIG. 18B, ionospheric delay errors may be optionally determined by processing of carrier phase data for L1 and/or L2C signals at ROV2. As with operation 1804 above, it is again noted that operation 1810 is optional and that in accordance with various embodiments, flowchart 1800 can be performed without the use of precise satellite orbital data and clock data.

In operation 1811 of FIG. 18B, the RTK operating system (e.g., 346 of FIGS. 3A-3E) is activated to improve the accuracy of the pseudorange measurements by determining the integer ambiguity number using carrier phase measurements.

In operation 1812 of FIG. 18B, the L1 or L2C pseudoranges determined with ambiguity resolution (e.g., operation 1811 above) are processed to determine a position fix for ROV2.

In operation 1813 of FIG. 18B, ROV2 sends a message to REF1 indicating it is ready to begin the tape measure distance determination operation. In accordance with various embodiments, this can be via any of the wireless communication protocols discussed above including, but not limited to, a direct cellular telephone call or a Short Message Service (SMS) message.

In operation 1814 of FIG. 18B, REF1 completes a communications handshake with ROV2 and delivers its observation data pair (e.g., L1-PR1 and L2C-PR1 labelled 2003 in FIG. 20A) to ROV2. In accordance with various embodiments, this observation pair is for a particular satellite (e.g., first satellite 2010 of FIG. 20A) which will be the same satellite for ROV2's observation pair.

In operation 1815 of FIG. 18B, ROV2 performs a single-differencing operation with its own observation data. As an example, in accordance with various embodiments, ROV2 subtracts the L1-PR1 data received from REF1 from its own L1-PR2 observations to derive a 3-D vector (e.g., a relative position vector RP1 2005 of FIG. 20A) from the position of REF1 (e.g., base location 201 of FIG. 1A) to the position of REV 2 (e.g., measurement location 205 of FIG. 1A). In accordance with various embodiments, observation pairs are for data from the same satellite (e.g., first satellite 2010 of FIG. 20A). As an example, L1-PR1 data from REF1 and L1-PR2 data from ROV1 comprise an observation pair regarding first satellite 2010 of FIG. 20A. In accordance with various embodiments, the single-differencing operation operates on X, Y, and Z components of L1-PR1 and L1-PR2 and determines the 3-D vector from REF1 to ROV2. Alternatively, ROV2 may use the L2C pseudorange data (e.g., L2C-PR1 and L2C-PR2 labelled 2003 and 2004 respectively in FIG. 20A) to derive the 3-D vector from REF1 to ROV2. In accordance with various embodiments, single-differencing removes satellite clock error (e.g., originating with first satellite 2010 of FIG. 20A) which can introduce errors in determining the satellite-receiver distance. Furthermore, ionospheric errors are reduced or cancelled because the ionospheric effects will be essentially the same for a reference device and rover device which are located nearby.

In operation 1816 of FIG. 18C, ROV2 displays the distance from REF1 to its current position using the electronic tape measure operating system (e.g., tape measure operating system 345 of FIGS. 3A-3E).

In operation 1817 of FIG. 18C, ROV2 may optionally calculate its position from the single-differencing operation to determine its location relative to the position of REF1. In accordance with various embodiments, REF1 may also send data conveying its position to ROV2.

Figure 19:
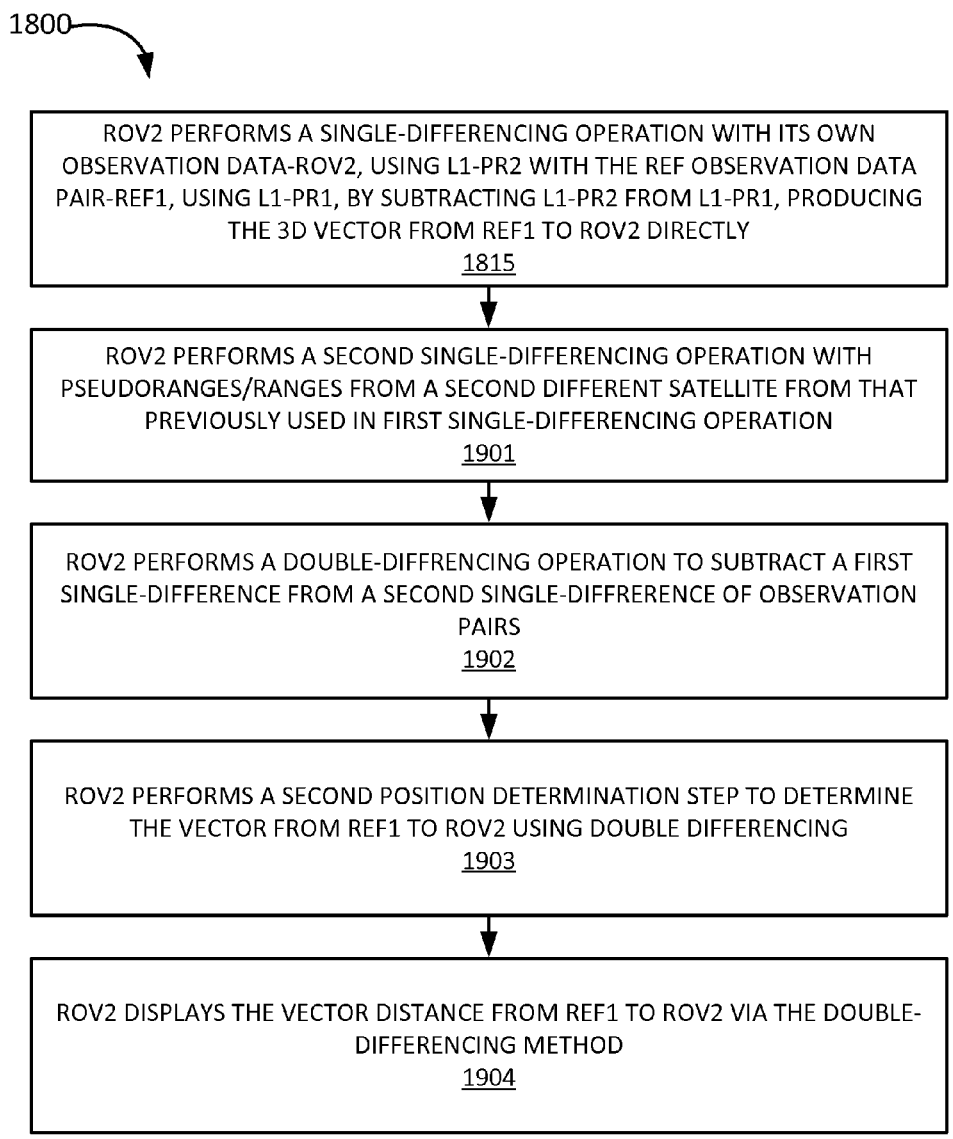
FIG. 19 is a flowchart of operations performed in a double-differencing electronic tape measure distance determination in accordance with at least one embodiment.

FIG. 19 is a flowchart 1900 of operations performed in a double-differencing electronic tape measure distance determination in accordance with at least one embodiment. In operation 1815, ROV2 performs a single-differencing operation with its own observation data. In other words, after completing a single-differencing described above with reference to operation 1815 of FIG. 18B, ETM 120 performs additional processing to derive a double-difference solution which is known in the art to remove receiver clock error and is used in conjunction with other geometric features to calculate the desired distance.

Figure 20A:
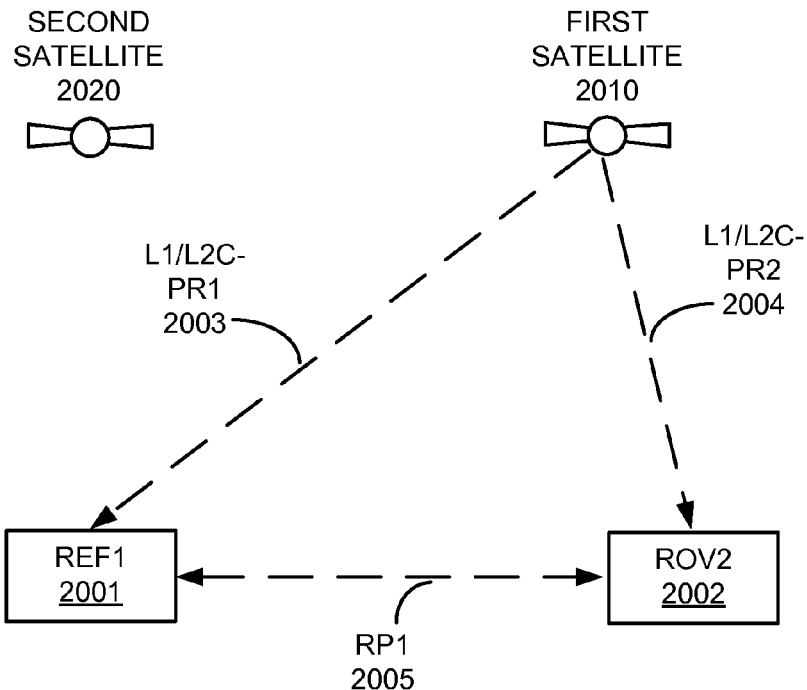
FIGS. 20A and 20B show pseudorange measurements between positioning satellites and electronic tape measure devices in accordance with various embodiments.
Figure 20B:
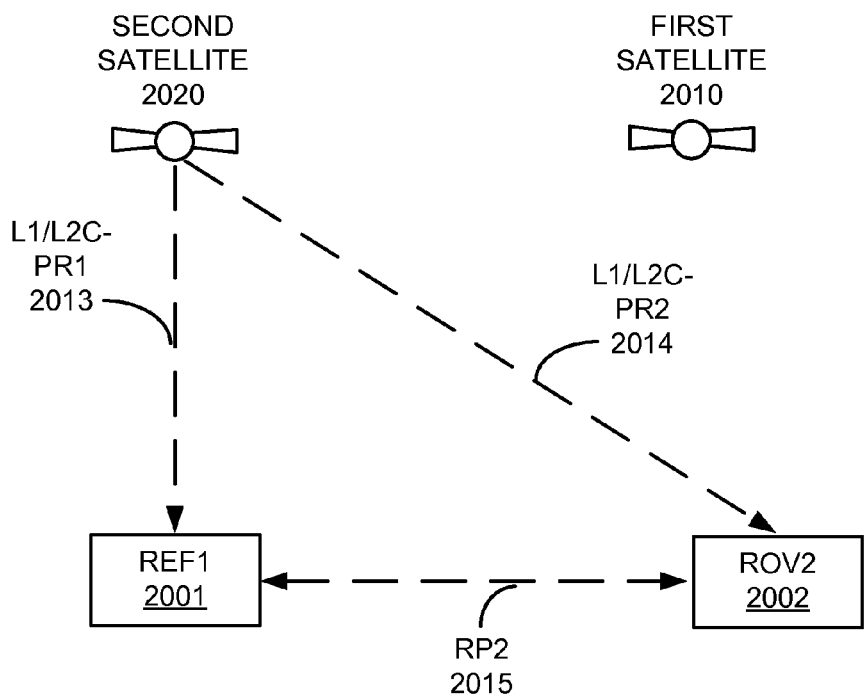

In operation 1901 of FIG. 19, ROV2 performs a second single-differencing operation with pseudoranges from a second, different satellite (e.g., second satellite 2020 of FIGS. 20A and 20B) from that used in the first single-differencing operation (e.g., 2010 of FIGS. 20A and 20B). The double-difference operation relies upon two separate single-differencing operations from two different satellites. The second single-differencing operation of operation 1901 additionally removes the clock errors from the second satellite (e.g., 2020 of FIGS. 20A and 20B) which improves determining the satellite-receiver distance from satellite 202 to ROV2.

In operation 1902 of FIG. 19, ROV2 performs a double-differencing operation to subtract a first single difference (e.g., as derived from operation 1815 above) from a second single difference (e.g., as derived from operation 1901 above). In so doing, various embodiments are able to derive more precise measurements of the satellite-receiver distance between ROV2 and second satellite 2020, as well as first satellite 2010, as receiver clock error is removed by the double-differencing operation.

In operation 1903 of FIG. 19, ROV2 performs a second position determination operation to determine the vector (e.g., a relative position vector RP2 2015 of FIG. 20B) from REF1 to ROV2. The position determination method using double-differencing is well known in the art. One example used in accordance with various embodiments is published in Global Positioning System, by Pratap Misra and Per Enge, ISBN: 0-9709544-0-9, published in 2001, at pages 223-225. Another example is publicly available via open source programming packages such as is disclosed at the RTKLIB.com website documents section (e.g., GNSS Precise Positioning with RTKLIB: Part 2 IPNT-J Seminar, Tokyo, Apr. 26, 2011).

FIGS. 20A and 20B show pseudorange measurements between positioning satellites and electronic tape measure devices in accordance with various embodiments. As shown in FIGS. 20A and 20B, ETM unit REF1 determines a pseudorange 1 (e.g., PR1 2003) based upon carrier phase and code phase measurements of L1 and/or L2C signals from first satellite 2010. Similarly, ETM unit ROV2 determines a pseudorange (e.g., PR2 2004) based upon carrier phase and code phase measurements of L1 and/or L2C signals from first satellite 2010. By subtracting PR1 2003 from PR2 2004, a relative position vector (RP1 2005 of FIG. 20A) can be derived in a single-differencing operation as described above with reference to operation 1815. As shown in FIG. 20B, ETM unit REF1 determines a second pseudorange (e.g., PR1 2013) based upon carrier phase and code phase measurements of L1 and/or L2C signals from second satellite 2020. Similarly, ETM unit ROV2 determines a second pseudorange (e.g., PR2 2014) based upon carrier phase and code phase measurements of L1 and/or L2C signals from second satellite 2020. By subtracting PR1 2013 from PR2 2014, a second relative position vector (RP1 2015 of FIG. 20A) can be derived in a single-differencing operation as described above with reference to operation 1901 above.

Figure 21:
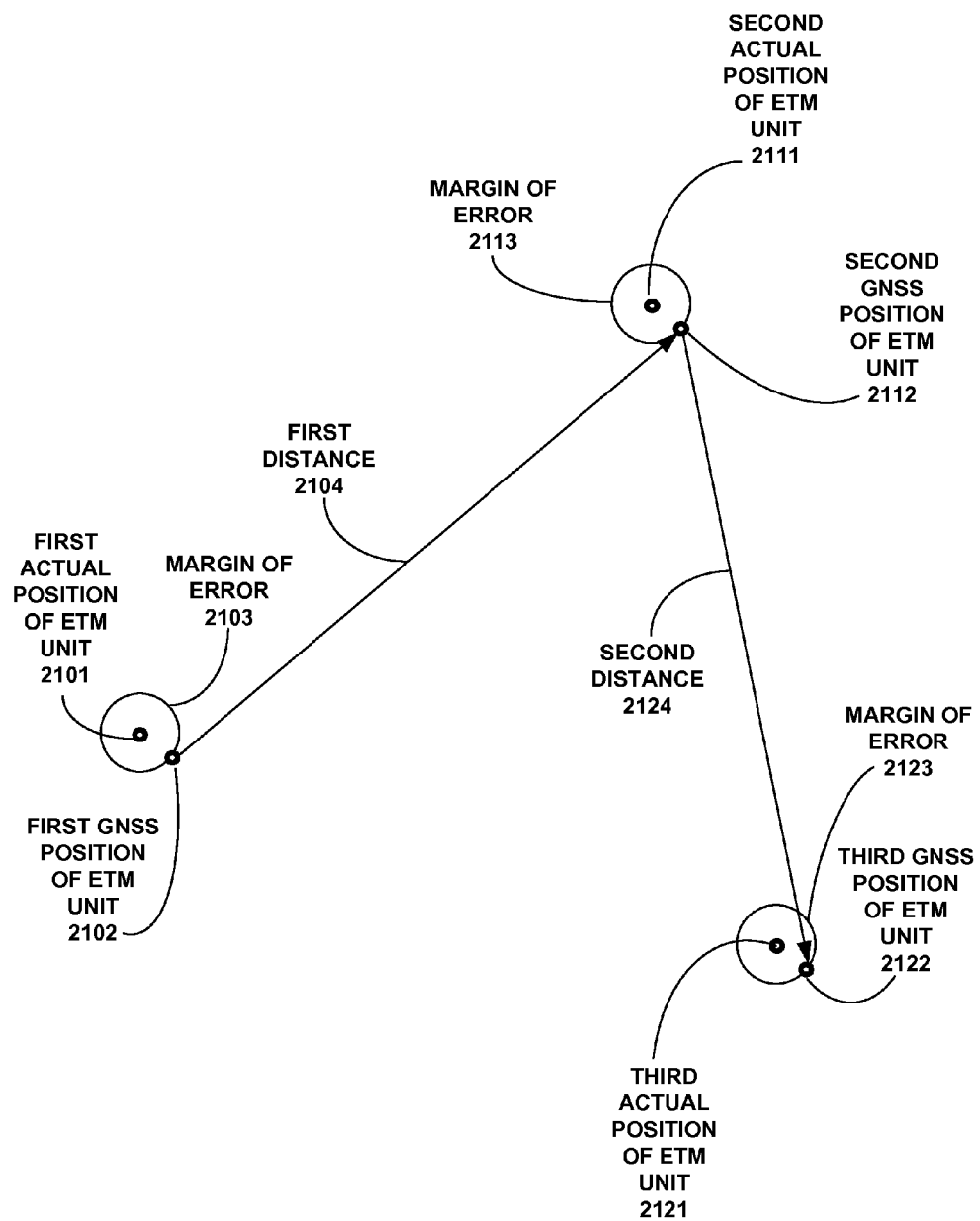
FIG. 21 shows the implementation of an electronic tape measure in accordance with various embodiments.

FIG. 21 shows the implementation of an electronic tape measure in accordance with various embodiments. In FIG. 21, an ETM unit (e.g., ETM 120 of FIG. 1A) is placed at a location at which an initial measurement is desired. In FIG. 21, ETM 120 is placed above first actual position 2101. A user can then utilize a user interface generated by tape measure operating system 345 to indicate that GNSS signals from a plurality of GNSS satellites are to be recorded at the current epoch and location at which ETM 120 is located. In accordance with various embodiments, tape measure operating system 345 will timestamp the received signals and store them (e.g., in storage 332 of FIGS. 3A-3E) for later processing. It is recognized, that due to the accumulation of errors in precisely determining the satellite-receiver distance, that the determination of the position of ETM 120 can still incorporate some error in spite of efforts to minimize or eliminate the error sources. However, within a given time period (e.g., up to one hour) and within a given distance from each other (e.g., within 10 km.) successive recorded GNSS signals will exhibit similar magnitudes of error.

As shown in FIG. 21, a margin of error 2103 shown as a circle which defines the area within which a GNSS processor (e.g., as shown in FIG. 2) will determine is the location of antenna 232. For the purpose of the present discussion, it will be assumed that margin of error 2103 comprises a circle with a diameter of 2 cm. As shown in FIG. 21, the first GNSS position of the ETM 2102 lies on the outer edge of the margin of error 2103 at approximately the four o'clock position. When a user then moves ETM 120 to a second position and initiates the electronic tape measure operating system 345, a second measurement of the signals from the same GNSS satellites previously recorded is timestamped and stored by tape measure operating system 345. Again, due to the accumulation of errors, a margin of error 2113 surrounds the second actual position of the ETM unit 2111. However, as discussed above, due to the fact that within a relatively short time and within a relatively short distance the errors in determining the position of antenna 232 will exhibit similar magnitudes of error, the radius of the margin of error 2113 is the same (e.g., a radius of 2 cm.) as the margin of error 2103 at the first position a recording of GNSS signals was made. As shown in FIG. 21, the second GNSS position of the ETM unit 2112 exhibits the same error relative to the second actual position of the ETM unit (e.g., 2111) as the first GNSS position of the ETM unit (e.g., 2102) shows relative to the first actual position of the ETM unit (e.g., 2101). In other words, both the magnitude (e.g., approximately 2 cm.) and the relative position (e.g., at the 4 o'clock position on the margin of error circles) are the same at both measurement locations, for some short period of time.

In accordance with various embodiments, RTK operating system 346 can derive a distance (e.g., first distance 2104 of FIG. 21) between the first location at which GNSS signals are recorded and the second location at which GNSS signals are recorded. It is noted that while the actual positions (e.g., 2101 and 2111 of FIG. 21) differ from the GNSS positions (e.g., 2102 and 2112 of FIG. 21), the distance 2104 accurately represents the distance between actual positions 2101 and 2111 because the offset, or margin of error, of the GNSS position 2102 and 2112 are essentially the same at both locations (e.g., 2 cm. and at the 4 o'clock position both times). As shown in FIG. 21, a user can move the ETM unit to a third position (e.g., third actual position of ETM unit 2121) and record and timestamp the GNSS signals received at that position. Again, the third GNSS position of the ETM unit 2122 exhibits the same margin of error (e.g., 2 cm. diameter and at the 4 o'clock position) as the other margins of error exhibited at the first and second positions. Again, the second distance 2124 between the second GNSS position of the ETM unit 2112 and the third GNSS position of the ETM unit 2122 will accurately represent the distance between the actual positions of the ETM unit (e.g., 2111 and 2121 of FIG. 21) because the offset, or margin of error, is essentially the same at both locations.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of implementing an electronic tape measure, said method comprising:
   receiving at a first location a first plurality of L1 Global Positioning System (GPS) signals from a plurality of GPS satellites during an epoch and digitizing said first plurality of L1 GPS signals;
   receiving at said first location a second plurality of L2C GPS signals from said plurality of GPS satellites during said epoch and digitizing said second plurality of L2C GPS signals;
   using a software defined GPS receiver operating on a processor of a cellular telephone to derive pseudorange and carrier phase measurements from said first plurality of L1 GPS signals and pseudorange and carrier phase measurements from said second plurality of L2C GPS signals;
   receiving a wireless message from a communication device located at a base location conveying pseudorange and carrier phase measurements derived from said first plurality of L1 GPS signals from said plurality of GPS satellites during said epoch; and
   determining by said cellular telephone a distance from said base location to said first location.

2. The method of claim 1 wherein said processor of said cellular telephone is located outside of a GPS receiver chipset of said cellular telephone.

3. The method of claim 1 wherein said cellular telephone further comprises a radio frequency hardware component which is located proximate to said cellular telephone, said method further comprising:
   digitizing said first plurality of L1 GPS signals from an analog form into a first plurality of respective digitized L1 GPS signals with a digitizer of said radio frequency hardware component;
   digitizing said second plurality of L2C GPS signals from an analog form into a second plurality of respective digitized L2C GPS signals with a said digitizer of said radio frequency hardware component; and
   receiving said first plurality of respective digitized L1 GPS signals and said second plurality of respective digitized L2C GPS signals at said cellular telephone, said cellular telephone comprising an internal GPS receiver chipset which is separate from said processor.

4. The method of claim 3, wherein said receiving said digitized GPS signals at said cellular telephone located proximate to said radio frequency hardware component comprises:
receiving a serial transmission of said first plurality of respective digitized L1 GPS signals and said second plurality of respective digitized L2C GPS signals at said cellular telephone located proximate to and removably coupled with said radio frequency hardware component, wherein said first plurality of respective digitized L1 GPS signals and said second plurality of respective digitized L2C GPS signals are serialized into said serialized transmission by a serializer of said radio frequency hardware component.

5. The method of claim 1 further comprising:
receiving said first plurality of L1 GPS signals from said plurality of GPS satellites and digitizing said first plurality of L1 GPS signals;
receiving said second plurality of L2C GPS signals from said plurality of GPS satellites and digitizing said second plurality of L2C GPS signals;
using a software defined GPS receiver operating on a second processor of said communication device at said base location to derive pseudorange and carrier phase measurements of said first plurality of L1 GPS signals for said epoch and pseudorange and carrier phase measurements of said second plurality of L2C GPS signals for said epoch; and
sending said wireless message conveying pseudorange and carrier phase measurements of said first plurality of L1 GPS signals from said plurality of GPS satellites in said epoch.

6. The method of claim 5 wherein said communication device comprises a cellular telephone and wherein said second processor of said communication device is located outside of a second GPS receiver chipset of said communication device.

7. The method of claim 5 wherein said communication device further comprises a second radio frequency hardware component which is located proximate to said communication device, said method further comprising:
digitizing said first plurality of L1 GPS signals from an analog form into a first plurality of respective digitized L1 GPS signals with a digitizer of said second radio frequency hardware component;
digitizing said second plurality of L2C GPS signals from an analog form into a second plurality of respective digitized L2C GPS signals with a said digitizer of said second radio frequency hardware component; and
receiving said first plurality of respective digitized L1 GPS signals and said second plurality of respective digitized L2C GPS signals at said communication device, said communication device comprising a second internal GPS receiver chipset which is separate from said second processor.

8. The method of claim 1 wherein said a second plurality of L2C GPS signals is not continuously tracked by said processor of said cellular telephone, said method further comprising:
subtracting the frequency of said L2C signal from the frequency of said L1 signal to create a third frequency; and
using said third frequency to resolve integer ambiguity of said L2C signal.

9. The method of claim 1 further comprising:
performing by said cellular telephone a single-differencing operation wherein pseudorange measurements of an L1 GPS signal from a first GPS satellite received by said communication device are subtracted from pseudorange measurements of said L1 GPS signal from said first GPS satellite received by said cellular telephone to derive a first residual value and determine said distance from said base location to said first location.

10. An electronic tape measure system comprising:
a first electronic tape measure (ETM) unit at a first location, comprising:
a first radio frequency hardware component comprising:
a first digitizer configured for digitizing a first plurality of L1 Global Positioning System GPS signals received from a plurality of GPS satellites during an epoch into a first plurality of respective digitized L1 GPS signals and for digitizing a second plurality of L2C GPS signals received from said plurality of GPS satellites during said epoch into a second plurality of respective digitized L2C GPS signals; and
a communication device configured to receive said first plurality of respective digitized L1 GPS signals and said second plurality of respective digitized L2C GPS signals, said communication device comprising:
a wireless communication transceiver configured to receive a wireless message from a second ETM unit at a second location conveying pseudorange and carrier phase measurements derived from said first plurality of L1 GPS signals from said plurality of GPS satellites in said epoch;
a processor configured for operating a software defined GPS receiver to determine a distance estimate from said first location to said second location; and said second ETM unit at said second location comprising:
a second radio frequency hardware component comprising:
a second digitizer configured for digitizing said first plurality of L1 GPS signals received from said plurality of GPS satellites during said epoch into a third plurality of respective digitized L1 GPS signals and for digitizing said second plurality of L2C GPS signals received from said plurality of GPS satellites during said epoch into a fourth plurality of respective digitized L2C GPS signals; and
a second communication device configured to receive said third plurality of respective digitized L1 GPS signals and said fourth plurality of respective digitized L2C GPS signals, said second communication device comprising:
a second wireless communication transceiver configured to send a wireless message to said first ETM unit, said wireless message conveying pseudorange and carrier phase measurements derived from said third plurality of respective digitized L1 GPS signals; and
a second processor configured for operating a second software defined GPS receiver to determine said geographical position of said second GPS antenna.

11. The electronic tape measure system of claim 10, wherein said first radio frequency hardware component further comprises:
a serializer configured for serializing said first plurality of respective digitized L1 GPS signals and said second plurality of respective digitized L2C GPS signals into a serialized output signal; and wherein said first radio frequency hardware component comprises a stand-alone radio frequency hardware component, disposed proximate to said communication device, and is configured for conveying said first plurality of respective digitized L1 GPS signals and said second plurality of respective digitized L2C GPS signals, as said serialized output signal, directly from said stand-alone radio frequency hardware component to said communication device.

12. The electronic tape measure system of claim 10, wherein said second radio frequency hardware component further comprises:

a second serializer configured for serializing said third plurality of respective digitized L1 GPS signals and said fourth plurality of respective digitized L2C GPS signals into a second serialized output signal; and wherein said second radio frequency hardware component comprises a second stand-alone radio frequency hardware component disposed proximate to said second communication device and is configured for conveying third plurality of respective digitized L1 GPS signals and said fourth plurality of respective digitized L2C GPS signals, as said second serialized output signal, directly from said second stand-alone radio frequency hardware component to said second communication device.

13. The electronic tape measure system of claim 10, wherein said first digitizer comprises:

a first Radio Frequency Integrated Circuit (RFIC) configured for digitizing said first plurality of L1 GPS signals into said first plurality of respective digitized L1 GPS signals; and a second RFIC configured for digitizing said second plurality of L2C GPS signals into said second plurality of respective digitized L2C GPS signals.

14. The electronic tape measure system of claim 10, wherein said second digitizer comprises:

a third Radio Frequency Integrated Circuit (RFIC) configured for digitizing said first plurality of L1 GPS signals into said third plurality of respective digitized L1 GPS signals; and a fourth RFIC configured for digitizing said second plurality of L2C GPS signals into said fourth plurality of respective digitized L2C GPS signals.

15. The electronic tape measure system of claim 10, wherein said processor and said second processor comprise processors selected from the group of processors consisting of: a host processor, a microprocessor, a graphics processing unit (GPU), and a digital signal processor (DSP).

16. The electronic tape measure system of claim 10, wherein said communication device and said second communication device are selected from the group of communication devices consisting of: a cellular telephone; a tablet computer; a two-way non-cellular radio, a dedicated short range communication (DSRC) radio which complies with Institute of Electrical and Electronics Engineers (IEEE) 802.11p standards, and a dedicated short range communication (DSRC) radio which is implemented as a software defined radio in compliance with IEEE 802.11p standards.

17. The electronic tape measure system of claim 10 wherein said processor of said communication device is configured to perform a single-differencing operation wherein pseudorange measurements of an L1 GPS signal from a first GPS satellite received by said second communication device are subtracted from pseudorange measurements of said L1 GPS signal from said first GPS satellite received by said first communication device to derive a first residual value and determine said distance from said first location to said second location.

18. The electronic tape measure system of claim 17 wherein said processor of said communication device is configured to perform a double-differencing operation wherein pseudorange measurements of an L1 GPS signal from a second GPS satellite received by said second communication device are subtracted from pseudorange measurements of said L1 GPS signal from said second GPS satellite received by said first communication device to derive a second residual value, and wherein said first communication device subtracts said first residual value from said second residual value to determine said distance from said first location to said second location.

19. The electronic tape measure system of claim 10 wherein said processor of said communication device is configured to generate a geographical position of a GPS antenna of said first radio frequency hardware component.

20. A method of implementing an electronic tape measure, said method comprising:

receiving at a first location a first plurality of Global Navigation Satellite System (GNSS) signals from a plurality of GNSS satellites at a first frequency during an epoch and digitizing said first plurality of GNSS signals;

receiving at said first location a second plurality of GNSS signals from said plurality of GNSS satellites at a second frequency different from said first frequency during said epoch and digitizing said second plurality of GNSS signals;

using a software defined GNSS receiver operating on a processor of a cellular telephone to derive pseudorange and carrier phase measurements from said first plurality of GNSS signals and pseudorange and carrier phase measurements from said second plurality of GNSS signals;

receiving a wireless message from a communication device located at a base location conveying pseudorange and carrier phase measurements derived from said first plurality of GNSS signals from said plurality of GNSS satellites during said epoch; and determining by said cellular telephone a distance from said base location to said first location.

* * * * *